US012708067B2

(12) United States Patent
Xu et al.

(10) Patent No.: US 12,708,067 B2
(45) Date of Patent: Aug. 18, 2026

(54) MOWER

(71) Applicant: Nanjing Chervon Industry Co., Ltd., Nanjing (CN)

(72) Inventors: Haishen Xu, Nanjing (CN); Mingyang Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 299 days.

(21) Appl. No.: 18/675,343

(22) Filed: May 28, 2024

(65) Prior Publication Data

US 2024/0306540 A1 Sep. 19, 2024

Related U.S. Application Data

(63) Continuation-in-part of application No. PCT/CN2022/134883, filed on Nov. 29, 2022.

(30) Foreign Application Priority Data

Dec. 15, 2021 (CN) ......................... 202111532098.1
Apr. 6, 2022 (CN) ......................... 202210355649.X
(Continued)

(51) Int. Cl.
*A01D 34/74* (2006.01)
*A01D 34/00* (2006.01)
(Continued)

(52) U.S. Cl.
CPC ........... *A01D 34/74* (2013.01); *A01D 34/006* (2013.01); *A01D 34/6806* (2013.01);
(Continued)

(58) Field of Classification Search
CPC .. A01D 34/00–34/905; A01D 2101/00; B62D 51/04; B62D 51/06
(Continued)

(56) References Cited

U.S. PATENT DOCUMENTS 5,442,901 A 8/1995 Niemela
5,946,893 A * 9/1999 Gordon .................. A01D 34/74 56/15.8
(Continued)

FOREIGN PATENT DOCUMENTS

CN 102581377 A 7/2012
CN 203537858 U 4/2014
(Continued)

OTHER PUBLICATIONS

International Search Report from application No. PCT/CN22/134883, dated Jun. 22, 2023, 6 pp.

*Primary Examiner* — Tara Schimpf
*Assistant Examiner* — Madeline I Runco
(74) *Attorney, Agent, or Firm* — Greenberg Traurig, LLP

(57) ABSTRACT

A mower includes a cutting assembly including a first motor for driving a cutter to rotate; a chassis supporting the cutting assembly; a walking assembly including walking wheels; and a second motor capable of driving at least the walking assembly to drive the mower to walk on the ground. The mower has a height adjustment mode, and when the mower is in the height adjustment mode, the second motor outputs power to adjust the height of the cutting assembly.

20 Claims, 45 Drawing Sheets

(30) Foreign Application Priority Data

| Date | Country | Application No. |
|---|---|---|
| Oct. 21, 2022 | (CN) | 202211292110.0 |
| Oct. 21, 2022 | (CN) | 202211292118.7 |
| Oct. 21, 2022 | (CN) | 202211292305.5 |
| Jun. 2, 2023 | (CN) | 202310677639.2 |
| Aug. 1, 2023 | (CN) | 202310964735.5 |

(51) Int. Cl.

| Class | Version |
|---|---|
| ***A01D 34/68*** | (2006.01) |
| ***A01D 34/69*** | (2006.01) |
| ***A01D 34/78*** | (2006.01) |
| ***A01D 34/82*** | (2006.01) |
| ***A01D 101/00*** | (2006.01) |

(52) U.S. Cl.
CPC ............. *A01D 34/69* (2013.01); *A01D 34/78* (2013.01); *A01D 34/824* (2013.01); *A01D 2101/00* (2013.01)

(58) Field of Classification Search
USPC ............................................ 701/50; 280/6.15
See application file for complete search history.

(56) References Cited

U.S. PATENT DOCUMENTS

| | | | | |
|---|---|---|---|---|
| 10,939,616 | B2 * | 3/2021 | Bartel | A01D 34/64 |
| 11,553,644 | B2 * | 1/2023 | Foster | A01D 34/74 |
| 2005/0257512 | A1 | 11/2005 | Derby | |
| 2006/0010846 | A1 * | 1/2006 | Koehn | A01D 34/74 56/14.7 |
| 2008/0141640 | A1 * | 6/2008 | Wehler | A01D 34/74 56/14.9 |
| 2012/0222395 | A1 * | 9/2012 | Grewe | A01D 34/74 56/17.2 |
| 2013/0046448 | A1 | 2/2013 | Fan | |
| 2014/0083072 | A1 | 3/2014 | Edholm | |
| 2016/0324065 | A1 | 11/2016 | Smith et al. | |
| 2017/0265395 | A1 * | 9/2017 | Kuriyagawa | A01D 34/74 |
| 2020/0146213 | A1 | 5/2020 | Goman | |
| 2021/0015038 | A1 | 1/2021 | Yamaoka | |
| 2021/0345542 | A1 * | 11/2021 | Conard | A01D 34/67 |
| 2023/0034760 | A1 | 2/2023 | Fu | |
| 2023/0189702 | A1 * | 6/2023 | Prinzo | B60L 15/2045 56/10.2 A |

FOREIGN PATENT DOCUMENTS

| | | | |
|---|---|---|---|
| CN | 203622381 | U | 6/2014 |
| CN | 203896745 | U | 10/2014 |
| CN | 205249808 | U | 5/2016 |
| CN | 208572752 | U | 3/2019 |
| CN | 210183900 | U | 3/2020 |
| CN | 107529721 | A | 8/2020 |
| CN | 112238421 | A | 1/2021 |
| CN | 112238422 | A | 1/2021 |
| CN | 212910811 | U | 4/2021 |
| CN | 113115628 | A | 7/2021 |
| CN | 214628144 | U | 11/2021 |
| CN | 115669357 | A | 2/2023 |
| CN | 218526803 | U | 2/2023 |
| CN | 219046740 | U | 5/2023 |
| JP | 2012029592 | A | 2/2012 |
| JP | 2014143984 | A | 8/2014 |
| WO | 2016165755 | A1 | 10/2016 |

* cited by examiner

A
1210
1211
1 2
1230

MOWER

RELATED APPLICATION INFORMATION

This application is a continuation-in-part of International Application Number PCT/CN2022/134883, filed on Nov. 29, 2022, through which this application also claims the benefit under 35 U.S.C. § 119(a) of Chinese Patent Application No. 202111532098.1, filed on Dec. 15, 2021, Chinese Patent Application No. 202210355649.X, filed on Apr. 6, 2022, Chinese Patent Application No. 202211292118.7, filed on Oct. 21, 2022, Chinese Patent Application No. 202211292110.0, filed on Oct. 21, 2022, and Chinese Patent Application No. 202211292305.5, filed on Oct. 21, 2022, which applications are incorporated herein by reference in their entireties.

This application also claims the benefit under 35 U.S.C. § 119(a) of Chinese Patent Application No. 202310677639.2, filed on Jun. 2, 2023, and Chinese Patent Application No. 202310964735.5, filed on Aug. 1, 2023, which applications are incorporated herein by reference in their entireties.

BACKGROUND

A mower is also referred to as a lawn mower, a lawn trimmer, etc. The mower is a mechanical tool for trimming lawns, vegetation, etc. and includes a chassis, an engine, a walking mechanism, a cutter and an operating device. The engine is installed on the chassis, the cutter is installed on an output shaft of the engine, and the cutter increases greatly in speed by use of the high-speed rotation of the engine, saving the operation time of a weeding worker and a lot of human resources.

In the related art, to adjust the mowing height of the mower, the mower is provided with a cutting height adjustment device including, for example, a height adjustment handle and a connecting rod assembly. When the mowing height of the mower needs to be adjusted, a user needs to manually adjust the height adjustment handle, and then the height adjustment handle drives the connecting rod assembly. Only when the user applies a relatively large force when operating the height adjustment handle, can the chassis be driven to change in height. The operation is time-consuming and labor-consuming. Moreover, the height adjustment handle in the related art is generally disposed on the chassis, and the user needs to bend down to operate the height adjustment handle, reducing working efficiency.

SUMMARY

A mower includes a cutting assembly including a first motor for driving a cutter to rotate; a chassis supporting the cutting assembly; a walking assembly including walking wheels; and a second motor capable of driving at least the walking assembly to drive the mower to walk on the ground. The mower has a height adjustment mode, and when the mower is in the height adjustment mode, the second motor outputs power to adjust the height of the cutting assembly.

A mower includes a cutting assembly including a first motor for driving a cutter to rotate; a chassis supporting the cutting assembly; a walking assembly including walking wheels; and a second motor capable of driving at least the walking assembly to drive the mower to walk on the ground. The mower has a height adjustment mode, and when the mower is in the height adjustment mode, the second motor outputs power to adjust the height of the cutter.

A mower includes a cutting assembly including a first motor for driving a cutter to rotate; a chassis supporting the cutting assembly; a walking assembly including walking wheels; and a second motor capable of driving at least the walking wheels to rotate. When the second motor starts and an external motion of the mower is prevented, the second motor drives a change in a relative position between a support assembly and the walking assembly, and the mower is in a height adjustment mode.

A mower includes a cutting assembly including a first motor for driving a cutter to rotate; a chassis supporting the cutting assembly; a walking assembly including walking wheels; and a second motor capable of driving at least the walking wheels to rotate. When the second motor starts and an external motion of the mower is prevented, the second motor drives a change in a relative position between the chassis and the walking assembly, and the mower is in a height adjustment mode.

A walk-behind power tool includes a working assembly including a working member and a first motor configured to drive the working member to move; and a chassis for accommodating at least part of the working assembly. The walk-behind power tool further includes an adjustment device configured to adjust the height of the chassis relative to the ground; and a second motor. The walk-behind power tool has a manual height adjustment mode and an electric height adjustment mode for adjusting the height of the chassis relative to the ground. The walk-behind power tool further includes a first operating member for a user to operate to make the walk-behind power tool in the manual height adjustment mode. In the electric height adjustment mode, the second motor drives the adjustment device to adjust the height of the chassis relative to the ground.

A walk-behind power tool includes a working assembly including a working member and a first motor configured to drive the working member to move; and a chassis for accommodating at least part of the working assembly. The walk-behind power tool further includes an adjustment device configured to adjust the height of the chassis relative to the ground; and an operating device including a first operating member for a user to mechanically adjust the height of the chassis relative to the ground and a second operating member for the user to electrically adjust the height of the chassis relative to the ground.

A walk-behind power tool includes a working assembly including a working member and a first motor configured to drive the working member to move; and a chassis for accommodating at least part of the working assembly. The walk-behind power tool further includes an adjustment device configured to adjust the height of the chassis relative to the ground, where the adjustment device is configured to be selectively driven by manpower or electric power.

A walk-behind power tool includes a working assembly including a working member and a first motor configured to drive the working member to move; a body configured to accommodate at least part of the working assembly; and a handle device connected to the body. The walk-behind power tool has a moving state in which the body and at least part of the handle device move relatively. The walk-behind power tool further includes an operating device for a user to operate to switch the walk-behind power tool to the moving state.

DETAILED DESCRIPTION

Figure 1:
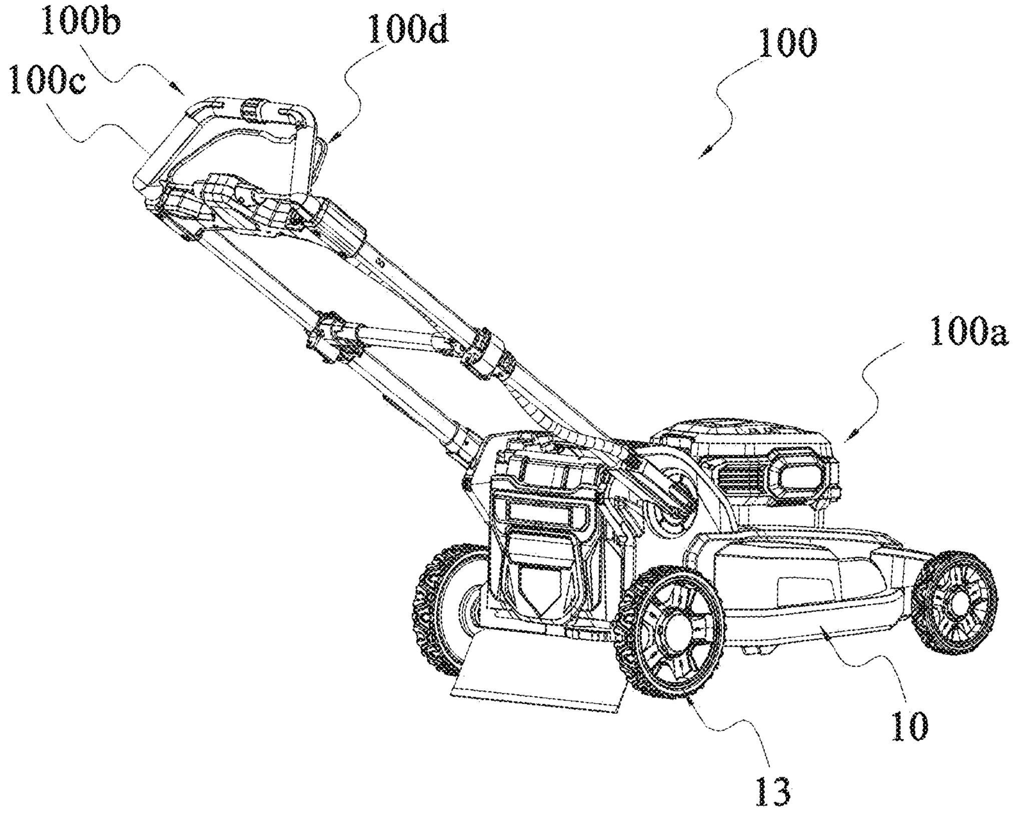
FIG. 1 is a perspective view of a mower according to an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

To clearly illustrate the technical solutions of the present application, up, down, left, right, front, and rear are defined in the drawings of the specification.

A mower 100 shown in FIG. 1 is configured for a user to cut grass in a lawn, such as a lawn of a garden or a golf course. The grass in the lawn requires regular care and thus needs to be often cut with the mower 100. In this example, the mower 100 is a walk-behind working machine. When the user operates the mower 100, the user stands behind the mower 100 and pushes the mower 100 to walk on the ground.

Figure 2:
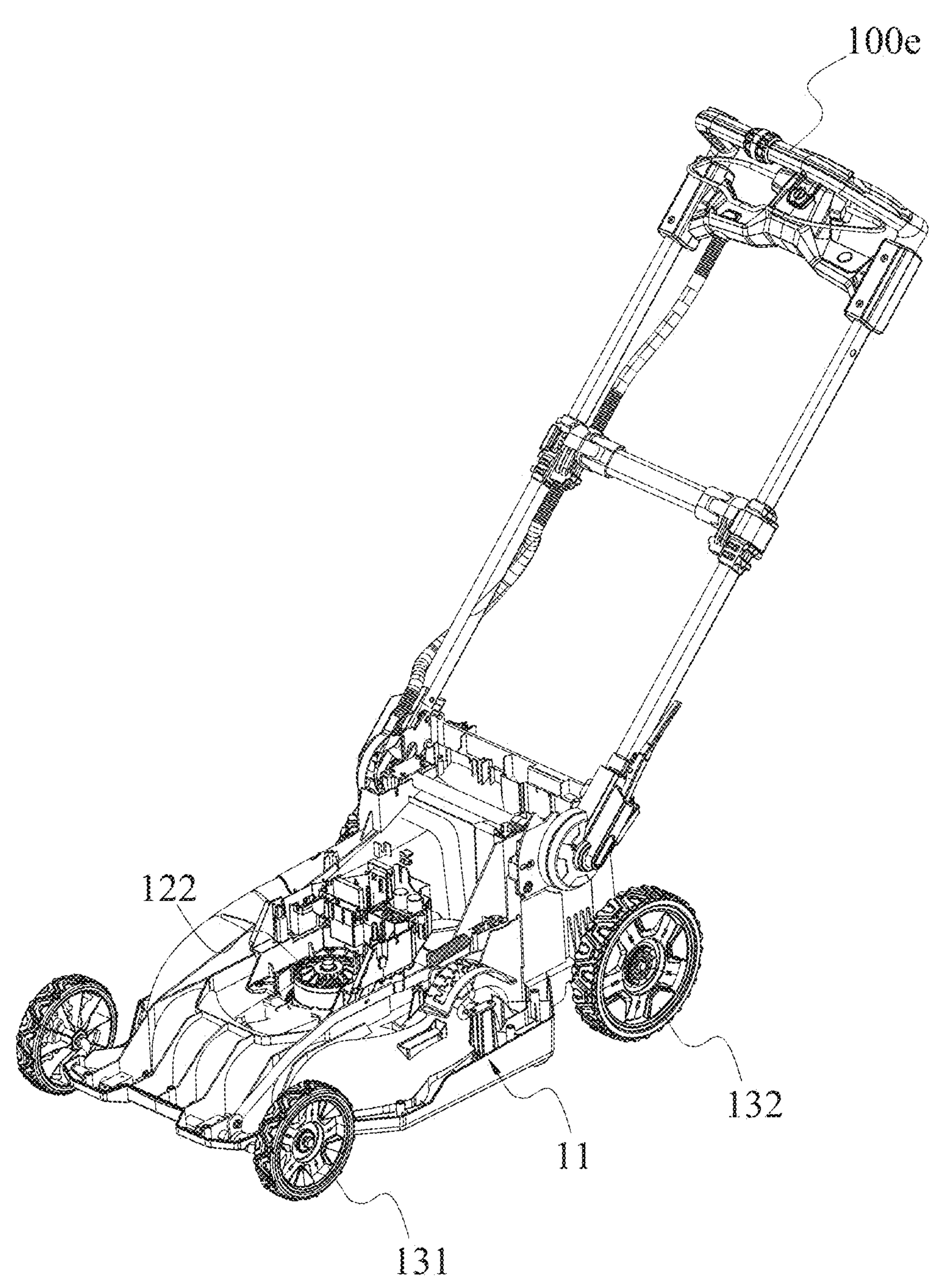
FIG. 2 is a perspective view of the mower of FIG. 1 with part of the structure removed.

As shown in FIGS. 1 and 2, the mower 100 includes a main machine 100*a* and an operating device 100*b*, where the operating device 100*b* is connected on the rear side of the main machine 100*a* and configured for the user to operate. The operating device 100*b* includes an operating handle 100*c* and a trigger switch 100*d*, the operating handle 100*c* is configured for the user to hold, and the trigger switch 100*d* is configured to control the mower 100 to mow the grass.

Figure 3:
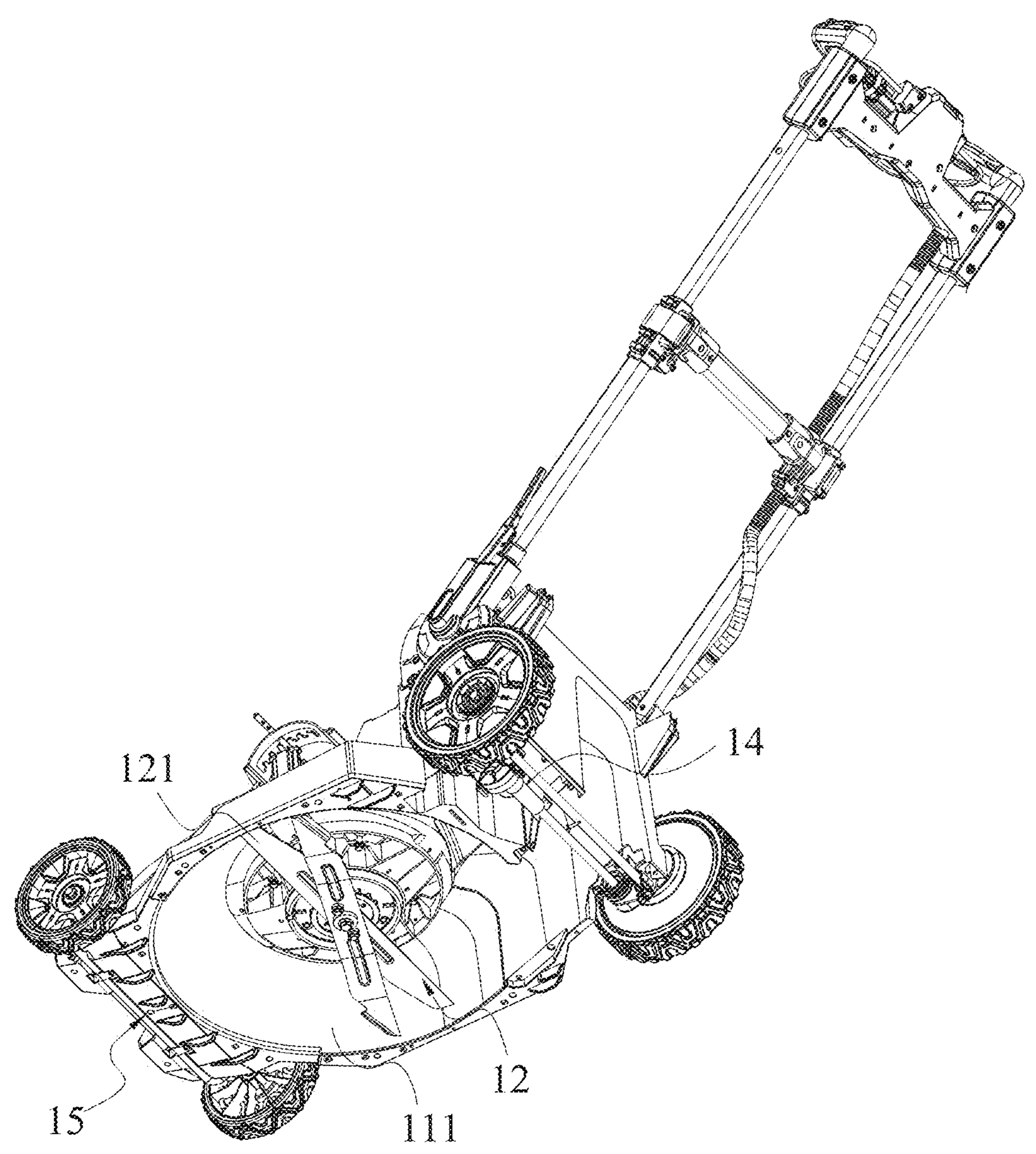
FIG. 3 is a perspective view of the mower of FIG. 2 from another angle.
Figure 4:
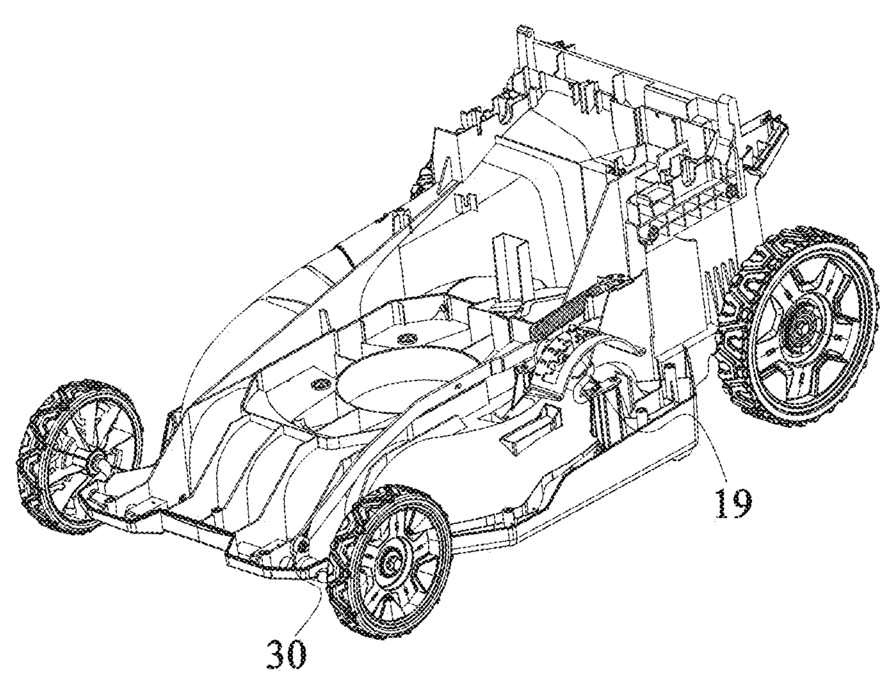
FIG. 4 is a perspective view of the mower of FIG. 2 with an operating device removed.
Figure 5:
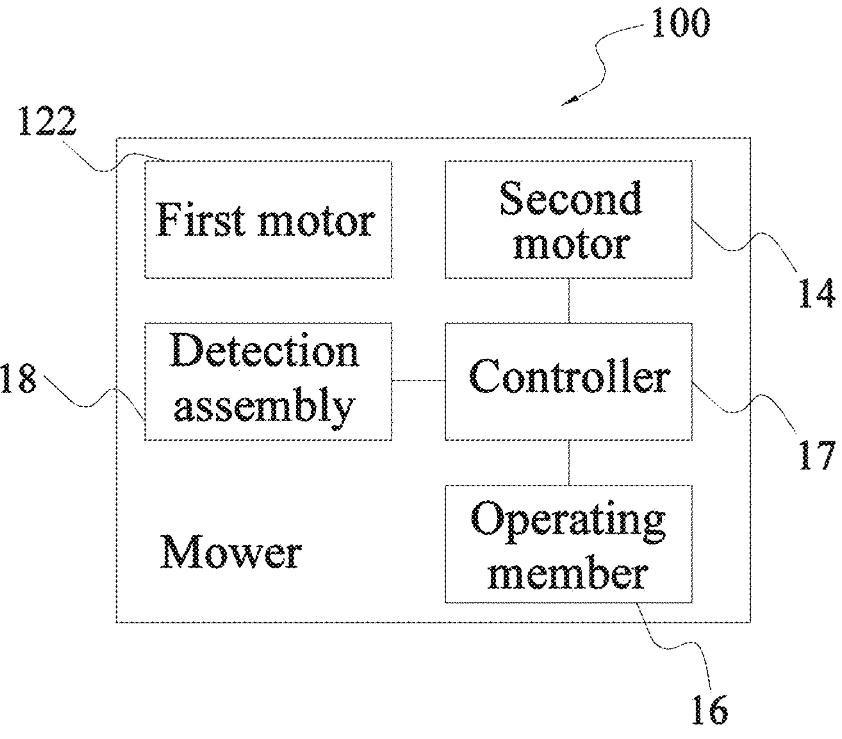
FIG. 5 is a diagram of a connection relationship between some electrical components in the mower of FIG. 1.
Figure 6:
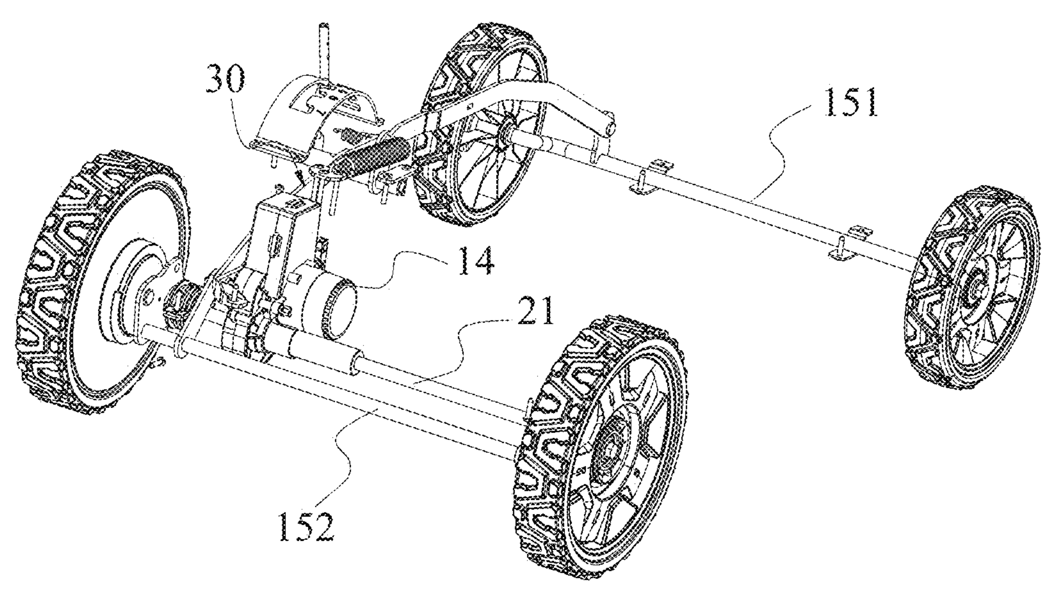
FIG. 6 is a perspective view of the structure shown in FIG. 4 with a chassis removed.
Figure 7:
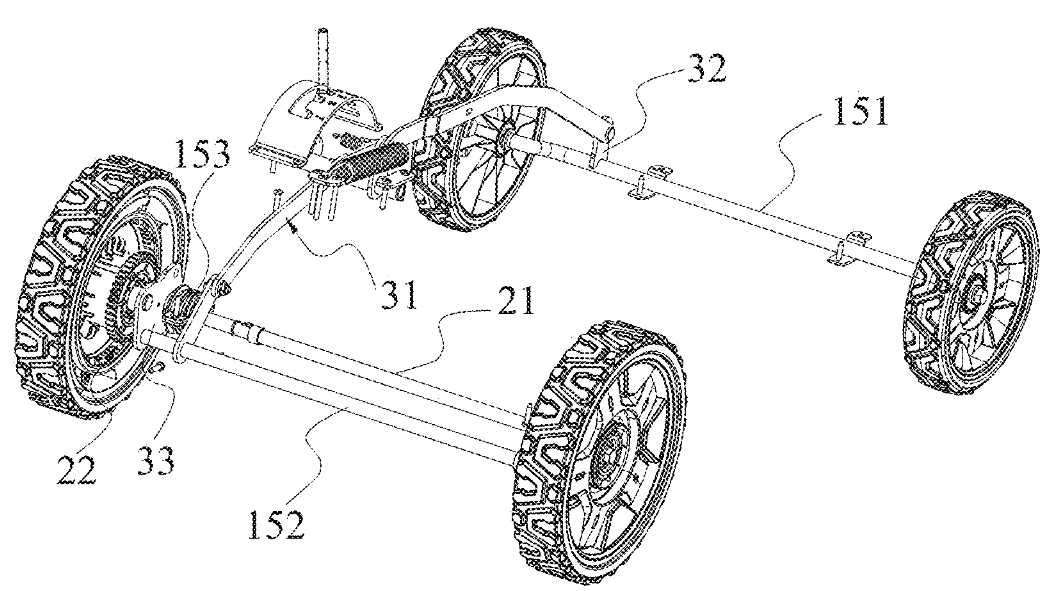
FIG. 7 is a perspective view of the structure shown in FIG. 6 with a second motor removed.

As shown in FIGS. 1 to 3, the main machine 100*a* includes a chassis 11, a cutting assembly 12 and a walking assembly 13, the cutting assembly 12 includes a cutter 121 and a first motor 122, and the walking assembly 13 includes multiple walking wheels 131 and 132. In this example, the walking assembly 13 includes two front walking wheels 131 and two rear walking wheels 132. The chassis 11 is configured to support the cutting assembly 12 and the walking assembly 13. The chassis 11 is also connected to the operating device 100*b*. The chassis 11 connects the operating device 100*b*, the cutting assembly 12 and the walking assembly 13 into a whole. The cutting assembly 12 is configured to implement a cutting function, an accommodation space 111 is formed on the lower side of the chassis 11, and the cutter 121 is disposed in the accommodation space 111. In this example, the cutter 121 is a blade disposed in the accommodation space 111. The first motor 122 is mounted to the chassis 11, the cutter 121 is mounted to the first motor 122, and the first motor 122 drives the cutter 121 to rotate at a high speed to cut the grass in the lawn. The walking assembly 13 can drive the mower 100 to walk on the ground, and the walking assembly 13 can at least drive the mower 100 to advance, retreat and turn on the ground. The mower 100 further includes a second motor 14 for driving the walking assembly 13 to move. In this example, the second motor 14 is configured to drive the rear walking wheels 132 to rotate so that the mower 100 walks on the ground. In other examples, the second motor 14 may be configured to drive the front walking wheels 131 to rotate. Alternatively, the mower 100 includes a front motor and a rear motor, the front motor drives the front walking wheels 131, and the rear motor drives the rear walking wheels 132.

The mower 100 has a self-propelled mode. When the mower 100 is in the self-propelled mode, the second motor 14 is started, and the second motor 14 drives the walking assembly 13 to rotate to drive the mower 100 to walk on the ground. In this manner, when the user needs to mow the grass, the user just needs to stand on the rear side of the mower 100 and follow the mower 100 to walk. The mower 100 is driven by the second motor 14 to advance automatically, and the user does not need to manually push the mower 100 to walk on the ground. Such an operation manner saves the labor of the user and improves the working efficiency.

During the mowing of the mower 100, the grass in the lawn may be required to have a particular height after being cut, and thus the height of the cutter 121 relative to the ground needs to be adjusted. When the height of the cutter 121 relative to the ground is relatively low, the grass in the lawn is relatively low after being cut. Thus, the user may need to mow the lawn in a longer time. When the height of the cutter 121 relative to the ground is relatively high, the grass in the lawn is relatively high after being cut. Thus, the lawn better meets an aesthetic requirement of the user. Alternatively, the user may require grass in different regions of the lawn to have different heights. Thus, the user needs to frequently adjust the height of the cutter 121 relative to the ground.

As shown in FIGS. 1 to 4, the mower 100 further includes an adjustment assembly 30, the adjustment assembly 30 connects the chassis 11 to the walking assembly 13, and the adjustment assembly 30 can adjust a relative position between the chassis 11 and the walking assembly 13 to adjust the height of the cutter 121. In this example, the cutting assembly 12 is mounted on the chassis 11, and the height of the walking assembly 13 relative to the ground is substantially unchanged. Therefore, when the adjustment assembly 30 changes the relative position between the chassis 11 and the walking assembly 13, the position of the cutting assembly 12 mounted on the chassis 11 relative to the walking assembly 13 also changes, and the height of the cutting assembly 12 relative to the ground changes. In this manner, the adjustment assembly 30 can adjust the height of the cutter 121 relative to the ground. It is to be noted that the relative position reflects a position change of the chassis 11 relative to the walking assembly 13 in a vertical direction. In this manner, the height of the walking assembly 13 relative to the ground is fixed, but the height of the chassis 11 relative to the ground changes. Alternatively, the relative position includes at least a position change of the chassis 11 relative to the walking assembly 13 in the vertical direction and may also include a position change of the chassis 11 relative to the walking assembly 13 in another direction. Alternatively, the relative position reflects a relative rotation between the chassis 11 and the walking assembly 13, and the relative rotation causes a position change of the chassis 11 relative to the walking assembly 13 in the vertical direction.

In this example, the mower 100 further has a height adjustment mode. When the mower 100 is in the height adjustment mode, the second motor 14 drives the adjustment assembly 30 to adjust the height of the cutter 121. For example, when the mower 100 is in the height adjustment mode, the second motor 14 outputs power to adjust the height of the cutting assembly. The second motor 14 drives the adjustment assembly 30 or the support assembly 15, and the adjustment assembly 30 or the support assembly 15 adjusts the relative position between the chassis 11 and the walking assembly 13 so that the height of the cutting assembly 12 mounted on the chassis 11 relative to the ground changes. The second motor 14 drives the adjustment assembly 30 or the support assembly 15, and the user does not need to manually operate the adjustment assembly 30. In this manner, the user can quickly and effortlessly adjust the height of the cutter 121, greatly improving the working efficiency. Moreover, the second motor 14 may drive the walking assembly 13 to drive the mower 100 to walk on the ground. That is to say, the second motor 14 can not only implement a function of driving the mower 100 to walk on the ground but also implement a function of driving the adjustment assembly 30 to move to adjust the height of the cutter 121. The mower 100 utilizes the second motor 14 that drives the walking assembly 13, and an additional drive mechanism for driving the adjustment assembly 30 is not required, achieving a simpler structure and a lower cost and saving space on the chassis 11 of the mower 100.

When the height of the cutter 121 needs to be adjusted, the user starts the second motor 14 and prevents an external motion of the mower 100. At this time, the second motor 14 can drive the adjustment assembly 30 to move, and the adjustment assembly 30 adjusts the relative position between the chassis 11 and the walking assembly 13. The mower 100 is in the height adjustment mode, and the height of the cutter 121 relative to the ground changes. In this manner, when the second motor 14 electrically drives the adjustment assembly 30 to perform height adjustment, the external motion of the mower 100 relative to the ground is prevented so that the mower 100 can more stably perform height adjustment and be prevented from a danger in the height adjustment process. Additionally, relative to a height adjustment mechanism of a mower in the related art, the height adjustment of the cutter 121 is implemented by using the second motor 14, and the user does not need to leave the operating device 100*b* and bend down to operate the height adjustment mechanism, thereby improving the working efficiency.

It is to be noted that the external motion of the mower 100 refers to a motion of a whole or a mass point relative to the ground when the mower 100 is considered as the whole or the mass point. For example, an advance, retreat or turn of the mower 100 on the ground may be considered as an external motion of the mower 100. A motion of the chassis 11 relative to the walking assembly 13 is considered as an internal motion of the mower 100, the idle rotation of the walking wheels 131 and 132 is also considered as an internal motion of the mower 100, and a motion of the adjustment assembly 30 relative to the walking assembly 13 is also considered as an internal motion of the mower 100.

The mower 100 further includes the support assembly 15, the support assembly 15 is configured to support the chassis 11, and the adjustment assembly 30 connects the support assembly 15 to the walking assembly 13. When driven by the second motor 14, the adjustment assembly 30 can adjust a relative position between the support assembly 15 and the walking assembly 13 to implement a position change of the chassis 11 relative to the walking assembly 13.

In this example, when the mower 100 is in the self-propelled mode, the second motor 14 drives the walking assembly 13 to rotate to drive the mower 100 to walk on the ground. That is to say, the walking wheels 131 and 132 can not only rotate around their own axis of rotation but also move relative to the ground. When the mower 100 is in the height adjustment mode, the second motor 14 also drives the walking assembly 13. However, the external motion of the mower 100 relative to the ground is prevented, and therefore, the walking wheels 131 and 132 cannot move relative to the ground. In this manner, if the user needs to adjust the height of the cutter 121 when the mower 100 is in the self-propelled mode, the user just needs to switch the mower 100 to the height adjustment mode and prevent the external motion of the mower 100, and the second motor 14 can drive the adjustment assembly 30 to change the position of the chassis 11 relative to the walking assembly 13. After the height of the cutter 121 is adjusted, the user just needs to switch the mower 100 to the self-propelled mode and release the mower 100 to allow the walking wheels 131 and 132 to move relative to the ground. At this time, the user can use the self-walking function of the mower 100. Thus, when the user uses the mower 100, the user may switch to the height adjustment mode at any time to adjust the height of the cutter 121 so that the mower 100 can be freely switched between the self-propelled mode and the height adjustment mode, thereby greatly improving the working efficiency.

The mower 100 further includes an operating member 16 configured for the user to operate. When the mower 100 is not started, the mower 100 is stopped and kept in a still state. At this time, the user operates the operating member 16, the operating member 16 controls the second motor 14 to start, and the external motion of the mower 100 is basically prevented. The started second motor 14 drives the adjustment assembly 30 to adjust the relative position between the support assembly 15 and the walking assembly 13, and the mower 100 enters the height adjustment mode. When the mower 100 is in the height adjustment mode, a rotational speed of the second motor 14 is less than or equal to 2000 rpm so that the height of the cutter 121 can be more stably adjusted. The rotational speed of the second motor 14 in the height adjustment mode is less than a rotational speed of the second motor 14 in the self-propelled mode. In this manner, the rotational speed of the second motor 14 is reduced, and the height can be more stably adjusted.

In this example, the operating member 16 is disposed on the operating device 100*b* to facilitate an operation of the user. The user can touch the operating member 16 by hand without leaving the operating device 100*b* and can operate without bending down, thereby improving operation convenience. Further, the operating member 16 is disposed on the operating handle 100*c* so that a hand of the user holding the operating handle 100*c* can touch the operating member 16 without leaving the operating handle 100*c*. In other examples, the operating member 16 may be disposed at another position for the user to touch conveniently. The distance between the operating member 16 and the operating handle 100*c* may be configured to be relatively small to facilitate the operation of the user. For example, the operating handle 100*c* includes a grip 100*e* extending along a direction parallel to an axis of rotation of the rear walking wheels 132, and a minimum distance between the operating member 16 and the grip 100*e* may be configured to be less than or equal to 50 cm to facilitate the operation of the user. Alternatively, in other examples, the operating member may be disposed on the main machine.

When the mower 100 is in the self-propelled mode, the user operates the operating member 16 to exit the self-propelled mode and basically prevents the external motion of the mower 100. At this time, the operating member 16 controls the second motor 14 to change in speed, the second motor 14 drives the adjustment assembly 30 to adjust the relative position between the support assembly 15 and the walking assembly 13, and the mower 100 enters the height adjustment mode.

Alternatively, when the mower 100 is in the self-propelled mode and the mower 100 walks on the ground, the user prevents the external motion of the mower 100, the walking wheels 131 and 132 start the idle rotation, the second motor 14 may drive the adjustment assembly 30 to adjust the relative position between the support assembly 15 and the walking assembly 13, and the mower 100 enters the height adjustment mode. When the mower 100 is in the height adjustment mode, a rotational speed of the walking wheels 131 and 132 is less than or equal to 50 rpm so that the mower 100 can slowly and stably implement height adjustment. Alternatively, in other examples, when the mower 100 is in the height adjustment mode, the rotational speed of the walking wheels 131 and 132 is less than or equal to 30 rpm. Alternatively, in other examples, when the mower 100 is in the height adjustment mode, the rotational speed of the walking wheels 131 and 132 is less than or equal to 20 rpm.

Alternatively, when the mower 100 is in the self-propelled mode and the mower 100 walks on the ground, the user prevents the external motion of the mower 100, and the walking wheels 131 and 132 start the idle rotation. When detecting that the external motion of the mower 100 is prevented, the second motor 14 may change in speed to drive the adjustment assembly 30 to adjust the relative position between the support assembly 15 and the walking assembly 13, and the mower 100 enters the height adjustment mode. In this example, the mower 100 further includes a controller 17. When the operating member 16 is operated to cause the mower 100 to enter the height adjustment mode from the self-propelled mode, the controller 17 controls the rotational speed of the second motor 14 to change. For example, the controller 17 may control the rotational speed of the second motor 14 to decrease so that the mower 100 is more stable in the height adjustment mode.

In this example, no matter whether the mower 100 is in the self-propelled mode or the height adjustment mode, the second motor 14 drives the walking assembly 13, and the difference lies only in whether a motion of the walking assembly 13 relative to the ground is prevented. The adjustment assembly 30 connects the support assembly 15 to the walking assembly 13, and the adjustment assembly 30 changes the relative position between the support assembly 15 and the walking assembly 13. In fact, in this example, when the mower 100 is in the height adjustment mode, the power of the second motor 14 is transmitted to the adjustment assembly 30 via the walking assembly 13 to drive the adjustment assembly 30 to move, and the adjustment assembly 30 in motion drives a change in the relative position between the support assembly 15 and the walking assembly 13. That is to say, a power source of the adjustment assembly 30 in this example is transmitted from the walking assembly 13. A transmission path is power transmission from the second motor 14 to the walking assembly 13 and power transmission from the walking assembly 13 to the adjustment assembly 30. In this manner, an additional transmission mechanism for transmitting power from the second motor 14 to the adjustment assembly 30 is not required so that the mower 100 has the simpler structure and the lower cost, and space near the chassis 11 is not occupied.

The mower 100 further includes a detection assembly 18 and a locking assembly 19. The detection assembly 18 is configured to detect the height of the cutter 121 so that the height of the cutter 121 can be adjusted more accurately. The detection assembly 18 may detect the height of the cutter 121 directly.

In other examples, the detection assembly 18 may detect the height of the cutter 121 indirectly. For example, the detection assembly 18 may detect the height of the chassis 11 relative to the ground to detect the height of the cutter 121. Alternatively, the detection assembly 18 may detect the position of the support assembly 15 relative to the walking assembly 13 to detect the height of the cutter 121. In fact, the detection assembly 18 may detect a position of any part that can reflect a change in the height of the cutter 121 to detect the height of the cutter 121 indirectly.

The locking assembly 19 is configured to lock a motion of the support assembly 15 relative to the walking assembly 13 so that the position of the support assembly 15 is fixed. When the detection assembly 18 detects that the height of the cutter 121 reaches a set height, the mower 100 exits the height adjustment mode, and the locking assembly 19 locks the position of the support assembly 15 relative to the walking assembly 13. In this manner, the cutter 121 can be more stably maintained at the set height.

In other examples, the mower 100 may further include a limiting device configured to prevent the external motion of the mower 100 when the mower 100 enters the height adjustment mode. The limiting device may be a limiting pin disposed on the chassis 11 of the mower 100. When the limiting pin moves downward and touches the ground, a relatively large resistance may be generated to prevent the external motion of the mower 100 relative to the ground.

For example, as shown in FIGS. 4 to 8, the support assembly 15 includes a front crankshaft 151 and a rear crankshaft 152, the front end of the chassis 11 is supported by the front crankshaft 151, and the front crankshaft 151 is connected to the front end of the chassis 11. The support assembly 15 further includes a support member 153 that supports the rear end of the chassis 11. The mower 100 further includes a drive shaft 21 configured to drive the walking assembly 13 to rotate, the drive shaft 21 is connected to the second motor 14, and the drive shaft 21 is also connected to the walking assembly 13. The second motor 14 drives the drive shaft 21 to rotate, and the drive shaft 21 transmits power to the walking assembly 13. The drive shaft 21 is parallel to the rear crankshaft 152, and the drive shaft 21 is also parallel to the front crankshaft 151. The support member 153 is rotatably mounted onto the drive shaft 21 through a bearing.

The mower 100 further includes a gear assembly 22 that transmits power output from the drive shaft 21 to a rear walking wheel 132, and the gear assembly 22 is at least partially disposed in the rear walking wheel 132. When the mower 100 is in the self-propelled mode, the second motor 14 drives the drive shaft 21 to rotate, the drive shaft 21 drives the gear assembly 22 to rotate, the gear assembly 22 drives the rear walking wheel 132 to rotate, and the mower 100 may walk on the ground.

Figure 8:
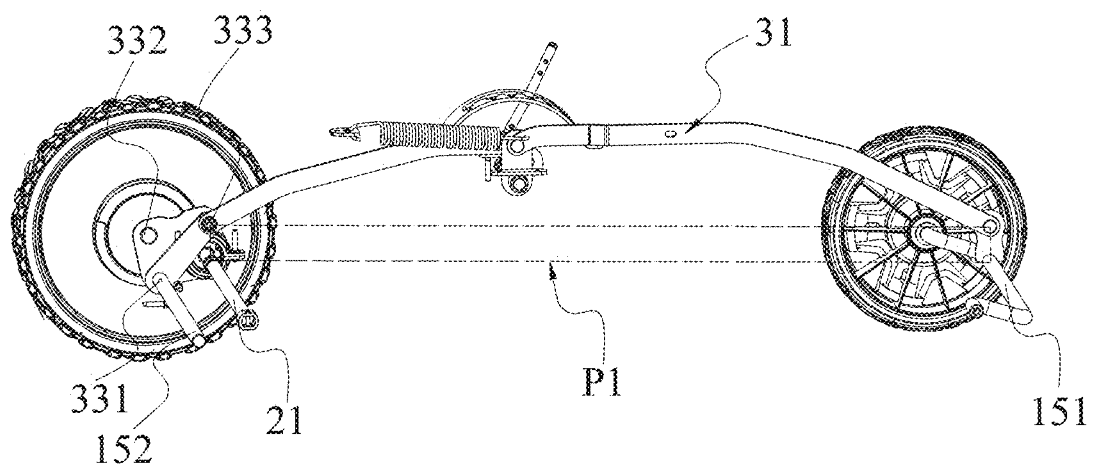
FIG. 8 is a perspective view of a walking assembly, an adjustment assembly and a support assembly in the mower of FIG. 1.

The adjustment assembly 30 includes a connecting rod assembly 31, a front connector 32 and a rear connector 33, where the connecting rod assembly 31 connects the front connector 32 to the rear connector 33. As shown in FIG. 8, when the connecting rod assembly 31 is considered as a whole, the connecting rod assembly 31, the front connector 32, the rear connector 33 and the chassis 11 constitute four sides of a parallelogram P1, where a line between the support member 153 and the front crankshaft 151 in a front and rear direction is equivalent to the chassis 11. The rear connector 33 has a first connection point 331, a second connection point 332 and a third connection point 333. The first connection point 331 is connected to the rear crankshaft 152, the second connection point 332 is connected to the rear walking wheel 132, and the third connection point 333 is connected to the support member 153.

When the mower 100 is in the height adjustment mode, the second motor 14 transmits power to the walking assembly 13 via the drive shaft 21. However, the external motion of the mower 100 is prevented, that is, the motion of the walking assembly 13 on the ground is prevented. Thus, the walking assembly 13 generates a reverse torque, and the reverse torque is transmitted to the rear connector 33 and drives the rear connector 33 to rotate about the second connection point 332. In this manner, the position of the parallelogram P1 changes, and a side of the parallelogram P1 formed by the rear connector 33 also changes in inclination so that a relative position of the chassis 11 relative to the walking assembly 13 changes. In this case, since the height of the walking assembly 13 relative to the ground is actually unchanged, a change in the relative position reflects a change in the position of the chassis 11 relative to the ground, and finally the height of the cutter 121 is adjusted.

In this example, the walking assembly 13 generates the reverse torque to implement the height adjustment of the cutter 121, and the additional drive mechanism and transmission mechanism are not required, achieving the simpler structure, the lower cost and more operation convenience.

When the mower 100 is in the height adjustment mode, the height of the chassis 11 may be increased through a forward rotation of the second motor 14, and the height of the chassis 11 may be decreased through a reverse rotation of the second motor 14. Alternatively, in other examples, when the mower 100 is in the height adjustment mode, the height of the chassis 11 may be decreased through a forward rotation of the second motor 14, and the height of the chassis 11 may be increased through a reverse rotation of the second motor 14.

Figure 9:
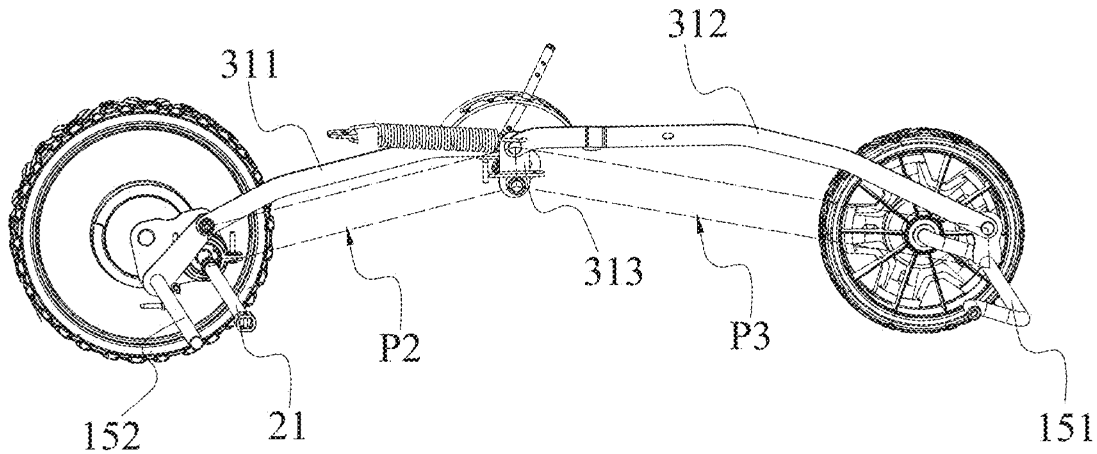
FIG. 9 is another perspective view of the structure shown in FIG. 8.

As shown in FIG. 9, the connecting rod assembly 31 may include a first connecting rod 311, a second connecting rod 312 and an intermediate connector 313. The intermediate connector 313 is connected to the chassis 11, and the locking assembly 19 may lock the chassis 11 at a proper height through the intermediate connector 313. The first connecting rod 311 connects the intermediate connector 313 to the rear connector 33, and the second connecting rod 312 connects the intermediate connector 313 to the front connector 32. In this manner, the first connecting rod 311, the intermediate connector 313, the rear connector 33 and the chassis 11 constitute a parallelogram P2, and the second connecting rod 312, the intermediate connector 313, the front connector 32 and the chassis 11 constitute another parallelogram P3. Similarly, the height adjustment of the chassis 11 is implemented through changes in positions and shapes of the two parallelograms P2 and P3, and the principle is the same as that through changes in the position and shape of the parallelogram P1.

Figure 10:
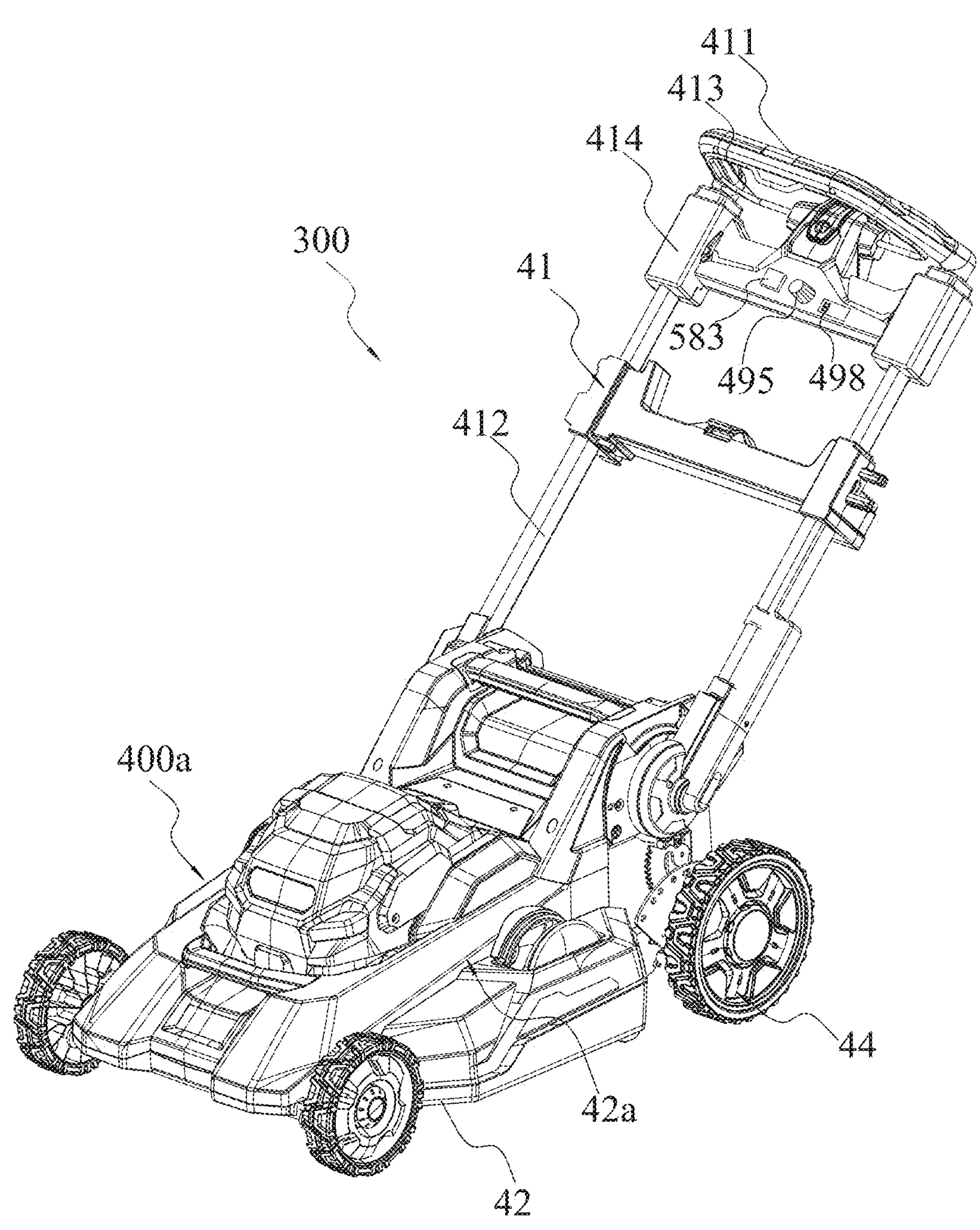
FIG. 10 is a perspective view of a mower according to a second example of the present application.

The present application further provides a mower in a second example. A mower 300 shown in FIG. 10 is configured for a user to cut grass in a lawn, such as a lawn of a garden, a park or a golf course. The grass in the lawn requires regular care and thus needs to be often cut with the mower 300. In this example, the mower 300 is a walk-behind mower. When the user operates the mower 300, the user stands behind the mower 300 and pushes or supports the mower 300 to walk on the ground.

Figure 11:
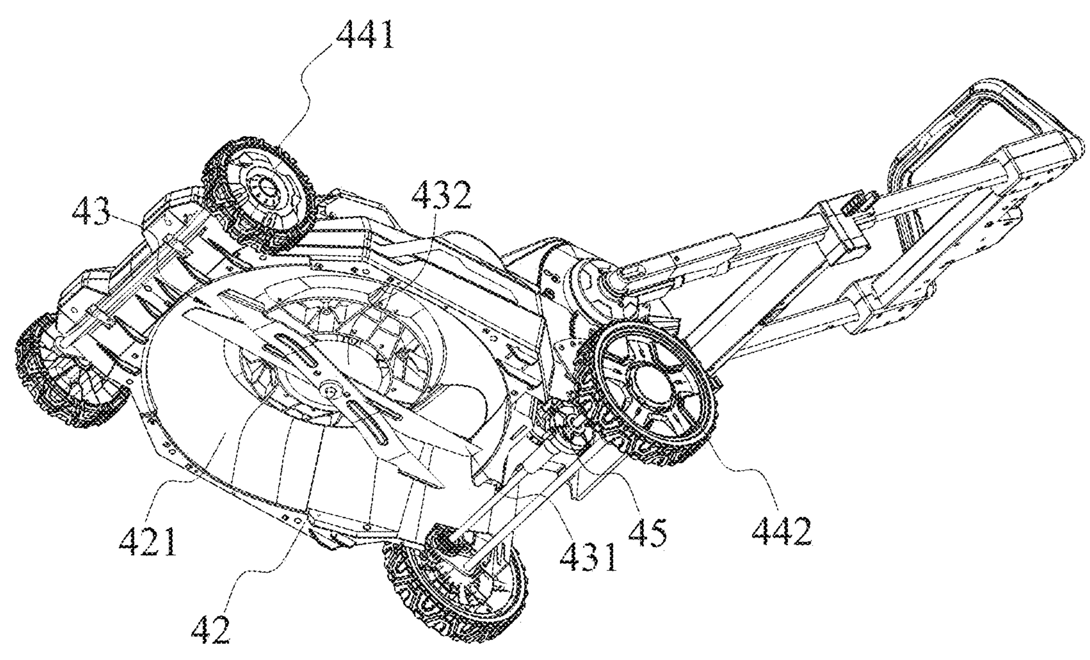
FIG. 11 is a perspective view of the mower of FIG. 10 from another angle.

As shown in FIGS. 10 and 11, the mower 300 includes a main machine 400*a* and a handle device 41, where the handle device 41 is connected to the rear end of the main machine 400*a* and configured for the user to operate. The handle device 41 includes a grip 411 and connecting rods 412, the grip 411 is configured for the user to hold to push or support the mower 300, and the connecting rods 412 connect the grip 411 to the main machine 400*a*.

The main machine 400*a* includes a main housing 42*a*, a cutting assembly 43 and a walking assembly 44. The connecting rods 412 connect the main housing 42*a* to the handle device 41. The cutting assembly 43 is configured to implement a mowing function, and the cutting assembly 43 includes a cutter 431 and a first motor 432 for driving the cutter 431 to rotate. The main housing 42*a* includes a chassis 42 formed with an accommodation space 421 for accommodating at least part of the cutter 431. The accommodation space 421 is at least open downward, and the cutter 431 is disposed in the accommodation space 421 and can cut grass when the cutter 431 rotates at a high speed. The first motor 432 is mounted to the main housing 42*a*, and the cutter 431 is connected to the first motor 432. The cutter 431 is, for example, a blade disposed in the accommodation space 421. In this example, the first motor 432 is an electric motor. The walking assembly 44 can drive the mower 300 to walk on the ground, and the walking assembly 44 can at least drive the mower 300 to advance, retreat and turn on the ground. The walking assembly 44 includes multiple walking wheels. In this example, the walking assembly 44 includes two front walking wheels 441 and two rear walking wheels 442. The chassis 42 is configured to support the cutting assembly 43 and the walking assembly 44. The main housing 42*a* connects the handle device 41, the cutting assembly 43 and the walking assembly 44 into a whole.

Figure 12:
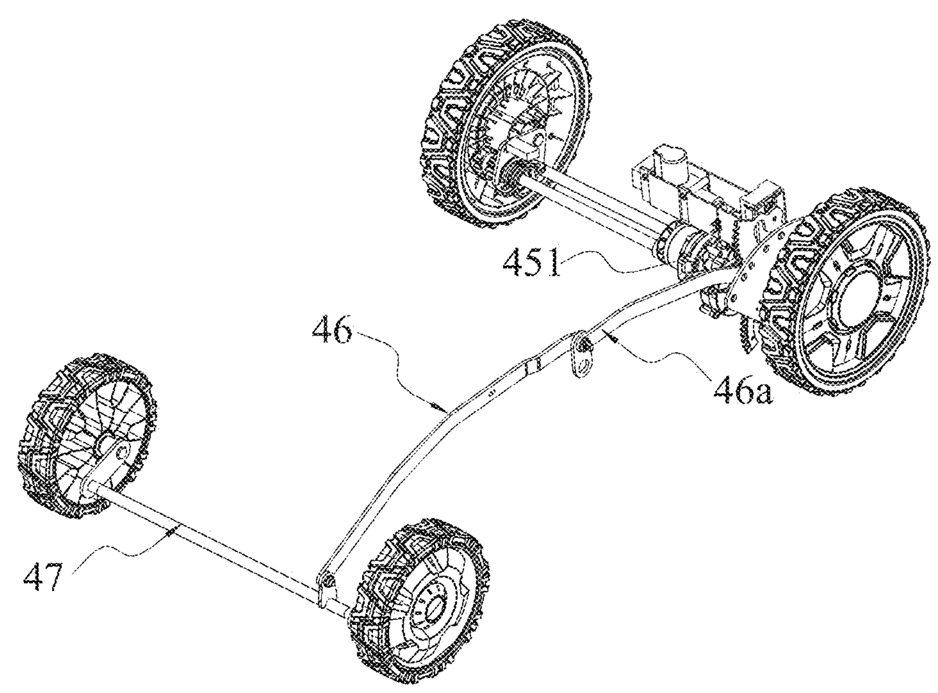
FIG. 12 is a perspective view of a walking assembly, an adjustment assembly, a support assembly and a locking assembly in the mower of FIG. 10.

As shown in FIGS. 10 to 12, the mower 300 further includes a drive assembly 45 for driving the walking assembly 44 to move, and the drive assembly 45 includes a second motor 451. In this example, the second motor 451 is configured to drive the rear walking wheels 442 to rotate so that the mower 300 walks on the ground. In other examples, the second motor 451 may be configured to drive the front walking wheels 441 to rotate. Alternatively, the mower 300 includes a front motor and a rear motor, the front motor drives the front walking wheels 441, and the rear motor drives the rear walking wheels 442.

The mower 300 has a self-propelled mode. When the mower 300 is in the self-propelled mode, the drive assembly 45 is in a first driving state, the second motor 451 is started, and the second motor 451 drives the walking assembly 44 to rotate to drive the mower 300 to walk on the ground. In this manner, when the user needs to mow the grass, the user just needs to stand on the rear side of the mower 300 and follow the mower 300 to walk. The mower 300 is driven by the second motor 451 to advance automatically, and the user does not need to manually push the mower 300 to walk on the ground. Such an operation manner saves the labor of the user and improves the working efficiency.

During the mowing of the mower 300, the grass in the lawn may be required to have a particular height after being cut, and thus the height of the cutter 431 relative to the ground needs to be adjusted. When the height of the cutter 431 relative to the ground is relatively low, the grass in the lawn is relatively low after being cut. Thus, the user may need to mow the lawn in a longer time. When the height of the cutter 431 relative to the ground is relatively high, the grass in the lawn is relatively high after being cut. Thus, the lawn better meets an aesthetic requirement of the user. Alternatively, the user may require grass in different regions of the lawn to have different heights. Thus, the user needs to frequently adjust the height of the cutter 431 relative to the ground.

Figure 13:
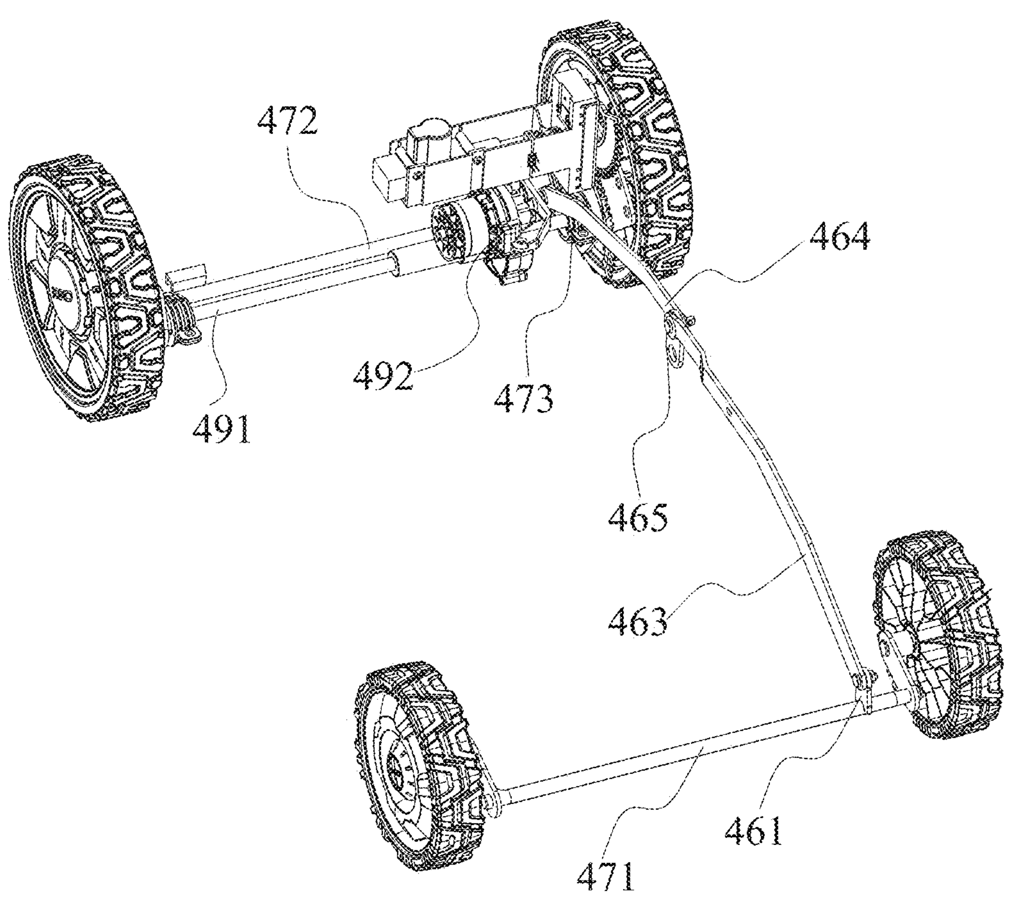
FIG. 13 is a perspective view of the structure shown in FIG. 12 from another angle.

As shown in FIGS. 11 to 13, the mower 300 further includes an adjustment assembly 46, the adjustment assembly 46 connects the chassis 42 to the walking assembly 44, and the adjustment assembly 46 can adjust a relative position between the chassis 42 and the walking assembly 44 to adjust the height of the main housing 42*a* relative to the ground. In this example, the cutting assembly 43 is mounted on the chassis 42, and the height of the walking assembly 44 relative to the ground is substantially unchanged. Therefore, when the adjustment assembly 46 changes the relative position between the chassis 42 and the walking assembly 44, the height of the main housing 42*a* relative to the ground changes, and the height of the cutter 431 is adjusted. In this manner, the adjustment assembly 46 can adjust the height of the cutter 431 relative to the ground. It is to be noted that the relative position reflects a position change of the chassis 42 relative to the walking assembly 44 in a vertical direction. In this manner, the height of the walking assembly 44 relative to the ground is fixed, but the height of the chassis 42 relative to the ground changes so that the height of a whole formed by the main housing 42*a* and the cutting assembly 43 changes. Alternatively, the relative position includes at least a position change of the chassis 42 relative to the walking assembly 44 in the vertical direction and may also include a position change of the chassis 42 relative to the walking assembly 44 in another direction. Alternatively, the relative position reflects a relative rotation between the chassis 42 and the walking assembly 44, and the relative rotation causes a position change of the chassis 42 relative to the walking assembly 44 in the vertical direction.

In this example, the mower 300 further has a height adjustment mode. When the mower 300 is in the height adjustment mode, the drive assembly 45 is in a second driving state and the second motor 451 drives the adjustment assembly 46 to adjust the height of the main housing 42*a*. For example, when the mower 300 is in the height adjustment mode, the second motor 451 drives the adjustment assembly 46, and the adjustment assembly 46 adjusts the relative position between the chassis 42 and the walking assembly 44 so that the height of the cutting assembly 43 mounted on the chassis 42 relative to the ground changes.

The second motor 451 drives the adjustment assembly 46, and the user does not need to manually operate the adjustment assembly 46. In this manner, the user can quickly and effortlessly adjust the height of the cutter 431, greatly improving the working efficiency. Moreover, the second motor 451 may drive the walking assembly 44 to drive the mower 300 to walk on the ground. That is to say, the second motor 451 can not only implement a function of driving the mower 300 to walk on the ground but also implement a function of driving the adjustment assembly 46 to move to adjust the height of the cutter 431. The mower 300 utilizes the second motor 451 that drives the walking assembly 44, and an additional drive mechanism for driving the adjustment assembly 46 is not required, achieving a simpler structure and a lower cost and saving space on the chassis 42 of the mower 300.

When the second motor 451 is in the first driving state, the second motor 451 has a first rotational speed. When the second motor 451 is in the second driving state, the second motor 451 has a second rotational speed. The second rotational speed is less than the first rotational speed so that the mower 300 can perform height adjustment stably.

When the height of the cutter 431 needs to be adjusted, the user starts the second motor 451 and prevents an external motion of the mower 300. At this time, the second motor 451 can drive the adjustment assembly 46 to move, and the adjustment assembly 46 adjusts the relative position between the chassis 42 and the walking assembly 44. The mower 300 is in the height adjustment mode, and the height of the main housing **42*a* and the cutter 431 relative to the ground changes. In this manner, when the second motor 451 electrically drives the adjustment assembly 46 to perform height adjustment, the external motion of the mower 300 relative to the ground is prevented so that the mower 300 can more stably perform height adjustment and be prevented from a danger in the height adjustment process. Additionally, relative to a height adjustment mechanism of the mower 300 in the related art, the height adjustment of the cutter 431 is implemented by using the second motor 451, and the user does not need to leave the handle device 41** and bend down to operate the height adjustment mechanism, thereby improving the working efficiency.

It is to be noted that the external motion of the mower 300 refers to a motion of a whole or a mass point relative to the ground when the mower 300 is considered as the whole or the mass point. For example, an advance, retreat or turn of the mower 300 on the ground may be considered as an external motion of the mower 300. A motion of the chassis 42 relative to the walking assembly 44 is considered as an internal motion of the mower 300, the idle rotation of the walking wheels is also considered as an internal motion of the mower 300, and a motion of the adjustment assembly 46 relative to the walking assembly 44 is also considered as an internal motion of the mower 300.

In this example, no matter whether the mower 300 is in the self-propelled mode or the height adjustment mode, the second motor 451 drives the walking assembly 44, and the difference lies only in whether a motion of the walking assembly 44 relative to the ground is prevented. The mower 300 further includes a support assembly 47 configured to support the chassis 42. The adjustment assembly 46 connects the support assembly 47 to the walking assembly 44, and the adjustment assembly 46 changes a relative position between the support assembly 47 and the walking assembly 44. In fact, in this example, when the mower 300 is in the height adjustment mode, the power of the second motor 451 is transmitted to the adjustment assembly 46 via the walking assembly 44 to drive the adjustment assembly 46 to move, and the adjustment assembly 46 in motion drives a change in the relative position between the support assembly 47 and the walking assembly 44. That is to say, a power source of the adjustment assembly 46 in this example is transmitted from the walking assembly 44. A transmission path is power transmission from the second motor 451 to the walking assembly 44 and power transmission from the walking assembly 44 to the adjustment assembly 46. In this manner, an additional transmission mechanism for transmitting power from the second motor 451 to the adjustment assembly 46 is not required so that the mower 300 has the simpler structure and the lower cost, and space near the chassis 42 is not occupied.

Figure 14:
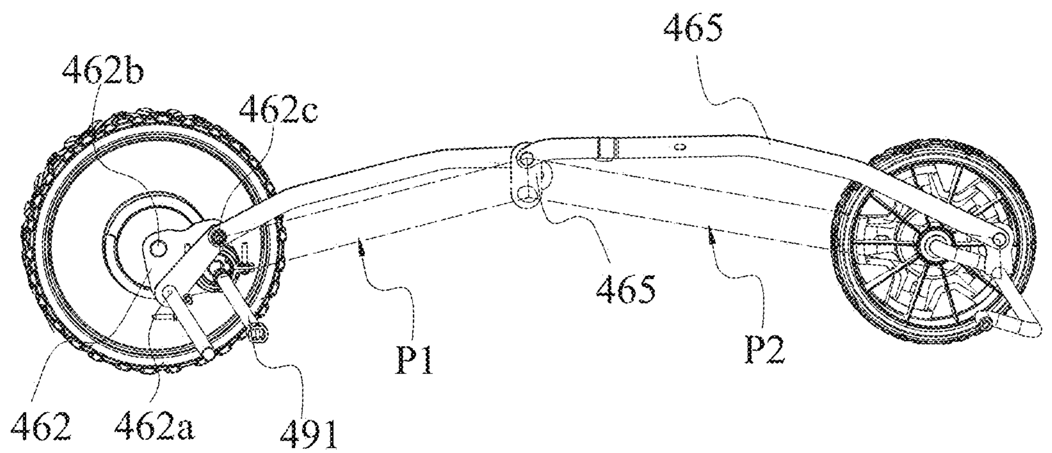
FIG. 14 is a plan view of a walking assembly, an adjustment assembly and a support assembly in the mower of FIG. 10.

For example, as shown in FIGS. 12 to 14, the support assembly 47 includes a front crankshaft 471 and a rear crankshaft 472, the front end of the chassis 42 is supported by the front crankshaft 471, and the front crankshaft 471 is connected to the front end of the chassis 42. The support assembly 47 further includes a support member 473 that supports the rear end of the chassis 42. The mower 300 further includes a drive shaft 491 configured to drive the walking assembly 44 to rotate, the drive shaft 491 is connected to the second motor 451, and the drive shaft 491 is also connected to the walking assembly 44. The second motor 451 drives the drive shaft 491 to rotate, and the drive shaft 491 transmits power to the walking assembly 44. The drive shaft 491 is parallel to the rear crankshaft 472, and the drive shaft 491 is also parallel to the front crankshaft 471. The support member 473 is rotatably mounted onto the drive shaft 491 through a bearing.

The mower 300 further includes a gear assembly 492 that transmits power output from the drive shaft 491 to a rear walking wheel 442, and the gear assembly 492 is at least partially disposed in the rear walking wheel 442. When the mower 300 is in the self-propelled mode, the second motor 451 drives the drive shaft 491 to rotate, the drive shaft 491 drives the gear assembly 492 to rotate, the gear assembly 492 drives the rear walking wheel 442 to rotate, and the mower 300 may walk on the ground.

The adjustment assembly 46 includes a connecting rod assembly **46*a*, a front connector 461 and a rear connector 462, where the connecting rod assembly 46*a* connects the front connector 461 to the rear connector 462. The connecting rod assembly 46*a* includes a first connecting rod 464, a second connecting rod 463 and an intermediate connector 465. The first connecting rod 464 connects the intermediate connector 465 to the rear connector 462, the second connecting rod 463 connects the intermediate connector 465 to the front connector 461, and the intermediate connector 465 is connected to the chassis 42. The chassis 42 is connected to the support member 473 and the front crankshaft 471**.

The first connecting rod 464, the intermediate connector 465, the rear connector 462 and the chassis 42 constitute a parallelogram P1, and the second connecting rod 463, the intermediate connector 465, the front connector 461 and the chassis 42 constitute another parallelogram P2. The rear connector 462 has a first connection point **462*a*, a second connection point 462*b* and a third connection point 462*c*. The first connection point 462*a* is connected to the rear crankshaft 472, the second connection point 462*b* is connected to the rear walking wheel 442, and the third connection point 462*c* is connected to the support member 473**.

When the mower 300 is in the height adjustment mode, the second motor 451 transmits power to the walking assembly 44 via the drive shaft 491. However, the external motion of the mower 300 is prevented, that is, the motion of the walking assembly 44 on the ground is prevented. Thus, the walking assembly 44 generates a reverse torque, and the reverse torque is transmitted to the rear connector 462 and drives the rear connector 462 to rotate about the second connection point 462*b*. In this manner, the positions of the parallelograms P1 and P2 change, and a side of the parallelogram P1 formed by the rear connector 462 also changes in inclination so that a relative position of the chassis 42 relative to the walking assembly 44 changes. In this case, since the height of the walking assembly 44 relative to the ground is actually unchanged, a change in the relative position reflects a change in the position of the chassis 42 relative to the ground, and finally the height of the cutter 431 is adjusted.

Figure 15:
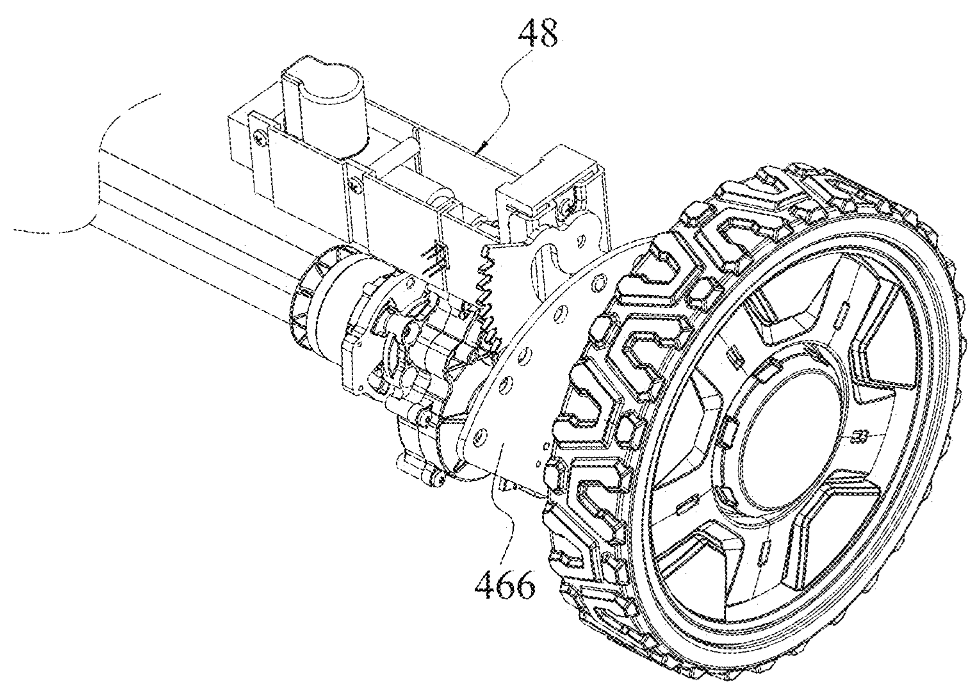
FIG. 15 is an enlarged view of part of the structure in FIG. 12.
Figure 16:
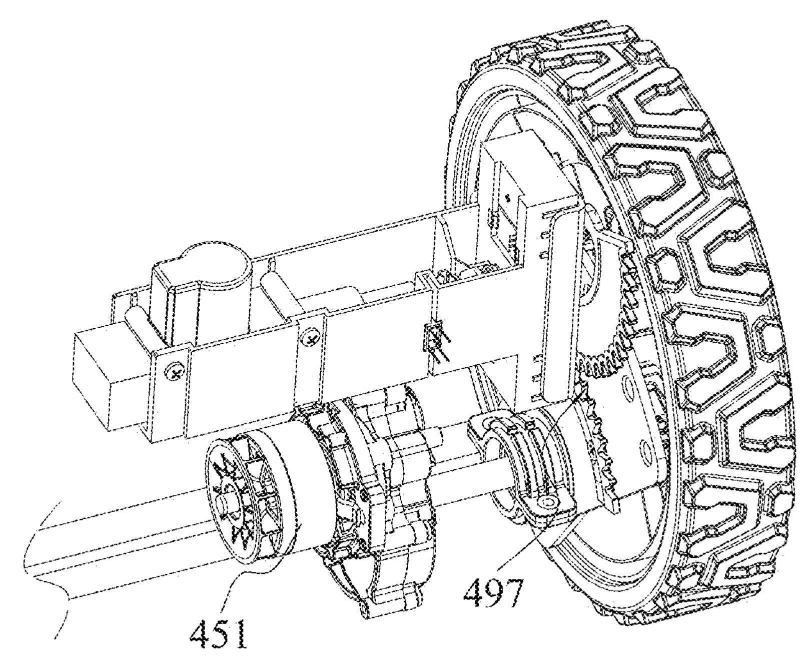
FIG. 16 is an enlarged view of part of the structure in FIG. 13.

As shown in FIGS. 15 and 16, the mower 300 further includes a locking assembly 48 for locking the height of the main housing 42*a* relative to the ground, and the locking assembly 48 is mounted to the main housing 42*a*. For example, the locking assembly 48 is configured to lock the relative rotation between the chassis 42 and the walking assembly 44. The locking assembly 48 includes a locking state and an unlocking state. When the locking assembly 48 is in the locking state, the locking assembly 48 locks the height of the main housing 42*a* relative to the ground. In this case, the position of the chassis 42 relative to the walking assembly 44 is fixed, and the mower 300 enters the self-propelled mode. When the locking assembly 48 is in the locking state and the mower 300 is in the self-propelled mode, the second motor 451 enters the first driving state after started, and the drive assembly 45 drives the walking assembly 44 to walk on the ground. When the locking assembly 48 is in the unlocking state, the locking assembly 48 allows a change in the height of the main housing 42*a*. In this case, the position of the chassis 42 relative to the walking assembly 44 may change, and the mower 300 enters the height adjustment mode. When the locking assembly 48 is in the unlocking state and the mower 300 is in the height adjustment mode, the drive assembly 45 may drive the adjustment assembly 46 to adjust the relative position between the chassis 42 and the walking assembly 44 to adjust the height of the main housing 42*a*, thereby changing the mowing height of the cutter 431.

Figure 17:
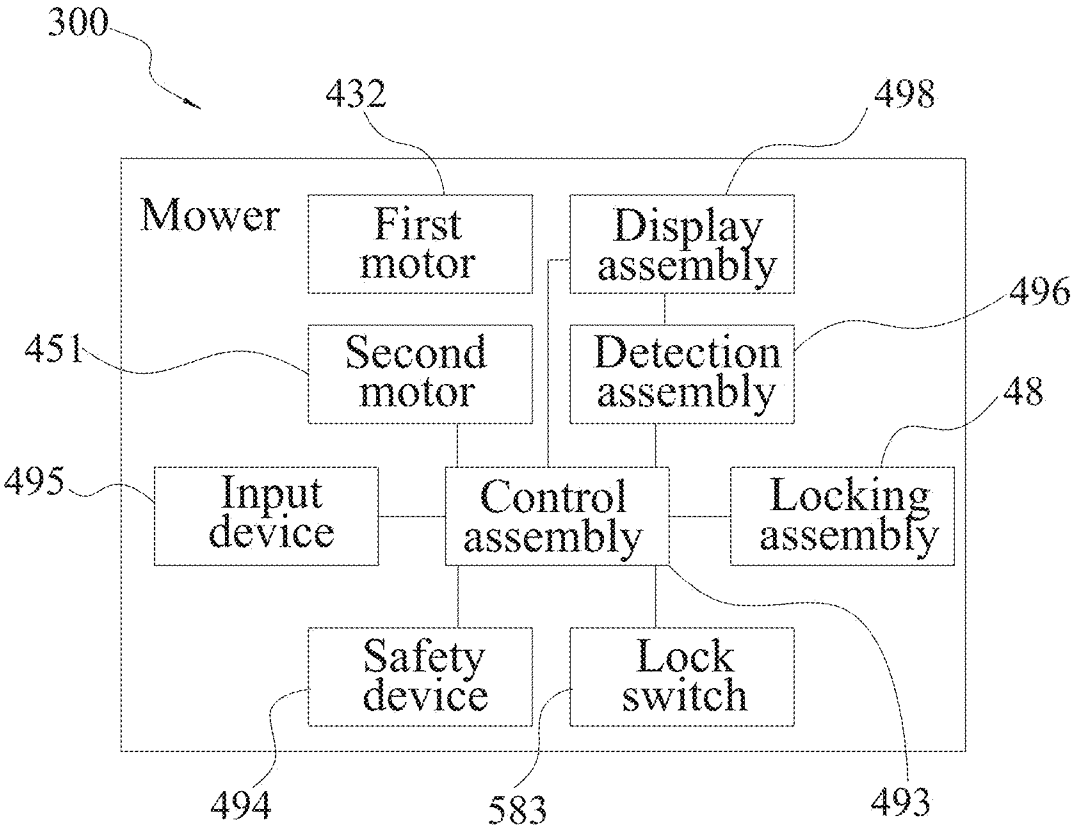
FIG. 17 is a control block diagram of the mower of FIG. 10.
Figure 18:
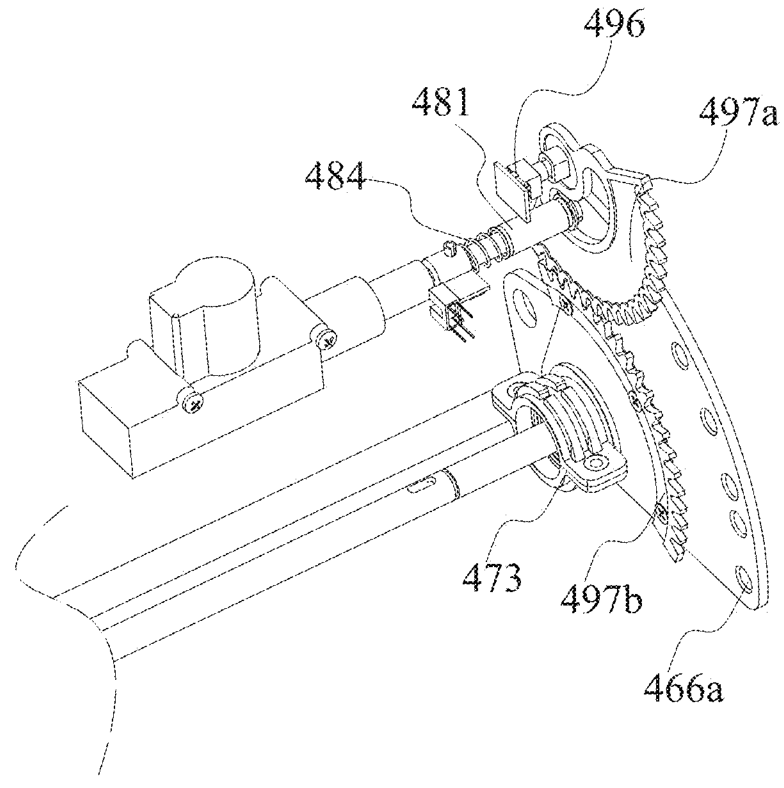
FIG. 18 is an enlarged view of a locking assembly, a conversion device and a gear member in FIG. 10.
Figure 19:
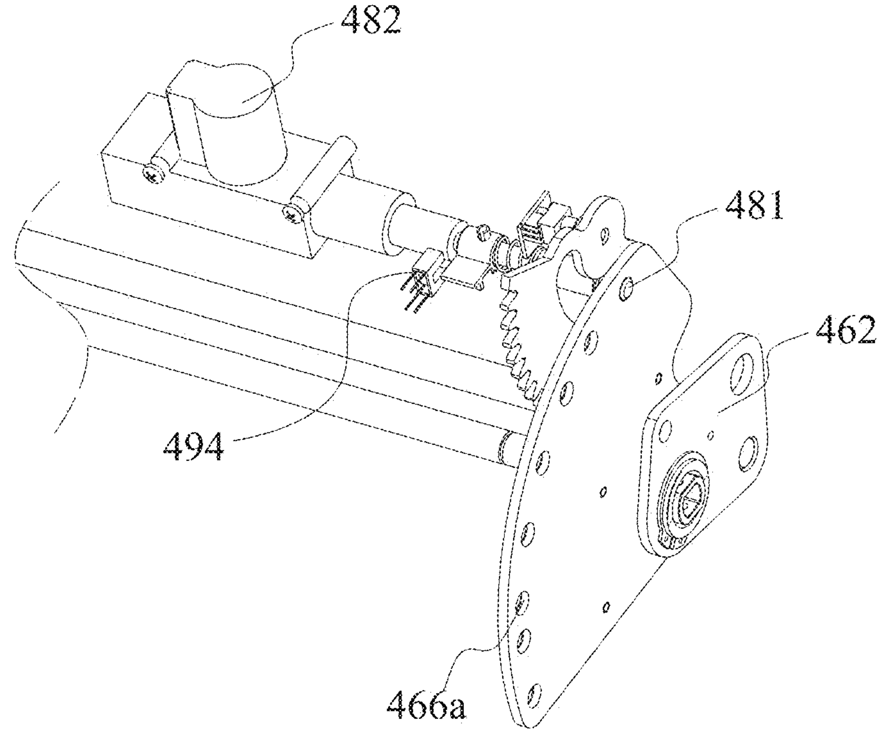
FIG. 19 is an enlarged view of a locking assembly, a conversion device and a gear member in FIG. 10 from another angle.

As shown in FIG. 17, the mower 300 further includes a control assembly 493 electrically or signally connected to the locking assembly 48 to control the locking assembly 48 to switch to the locking state or the unlocking state. In this manner, instead of directly and manually adjusting the locking assembly 48, the user inputs a signal to the control assembly 493, and the control assembly 493 outputs a control signal to the locking assembly 48 to drive the locking assembly 48 to switch to the locking state or the unlocking state.

In this example, the locking assembly 48 is mounted on the main housing 42*a*. As shown in FIGS. 15 to 19, the locking assembly 48 includes a door opener including a locking member 481 and an electromechanical drive element. The electromechanical drive element includes an electric motor or an electromagnet. In this example, the electromechanical drive element is an electric motor 482. The locking member 481 can make through its own motion the locking assembly 48 switch between the locking state and the unlocking state. The electric motor 482 is configured to drive the locking member 481 to move. The mower 300 includes a power supply device configured to supply power to the first motor 432 and the second motor 451. The control assembly 493 is also connected to the power supply device, and the control assembly 493 controls the power supply device to supply power to the electric motor 482 or not. Alternatively, in other examples, the control assembly 493 is connected to the electric motor 482 by means of wireless communications, and the control assembly 493 controls the electric motor 482 to start by outputting to the electric motor 482 a signal for allowing the start of the electric motor 482.

For example, in this example, the locking assembly 48 is mounted on the chassis 42 of the main housing 42*a*. The adjustment assembly 46 further includes a gear member 466 connected to the rear connector 462. When the mower 300 enters the height adjustment mode, the second motor 451 transmits power to the walking assembly 44 via the drive shaft 491. However, the external motion of the mower 300 is prevented, that is, the motion of the walking assembly 44 on the ground is prevented. Thus, the walking assembly 44 generates the reverse torque, and the reverse torque is transmitted to the rear connector 462 and drives the rear connector 462 to rotate so that the height of the main housing 42*a* relative to the walking assembly 44 changes. The gear member 466 is fixedly connected to the rear connector 462. When the rear connector 462 rotates, the gear member 466 rotates accordingly. The gear member 466 is provided with multiple gear holes 466*a*, and the locking member 481 is a pin that can be inserted into a gear hole 466*a*. When the pin is inserted into a different gear hole 466*a*, the main housing 42*a* has a different height relative to the ground so that the mower 300 is in a different height gear.

A friction force is generated between the pin inserted into the gear hole 466*a* and a hole wall of the gear hole 466*a*. When the friction force is relatively large, the electric motor 482 is hindered from driving the pin out of the gear hole 466*a*. In other words, when the friction force is relatively large, the pin is easily stuck in the gear hole 466*a*, and the electric motor 482 has difficulty in driving the pin out of the gear hole 466*a*. In this example, the control assembly 493 is further configured to control the second motor 451 to start and drive the adjustment assembly 46 within a preset time before the locking assembly 48 switches to the unlocking state. That is to say, when the locking assembly 48 is in the locking state, the external motion of the mower 300 is prevented, and the second motor 451 may be controlled by the control assembly 493 to start and drive the adjustment assembly 46. In this case, although the gear member 466 is in a locked state, the gear member 466 is driven by the second motor 451 to displace slightly due to a tolerance gap between the gear hole 466*a* and the pin so that the friction force between the pin and the gear hole 466*a* is reduced, and pin can conveniently exit the gear hole 466*a*.

The handle device 41 further includes a trigger 413 configured for the user to operate to start the mower 300. The handle device 41 further includes a mounting member 414 connected to two connecting rods 412, where various control elements for controlling the mower 300 are mounted on the mounting member 414. The mounting member 414 is connected to the connecting rods 412 and is a first preset distance away from the main machine 400*a* and a second preset distance away from the grip 411. That is to say, along an extension direction of the connecting rods 412, the mounting member 414 is disposed between the grip 411 and the main machine 400*a*. For example, the mower 300 includes a lock switch 583 for the user to operate, and the lock switch 583 is electrically or signally connected to the control assembly 493. The lock switch 583 is configured for the user to operate to switch the locking assembly 48 to the locking state or the unlocking state. In this example, the locking assembly 48 further includes a reset element 484 configured to generate a biasing force that can drive the locking member 481 to reset so that the locking assembly 48 resets to the locking state. The reset element 484 is, for example, a spring. Under the action of the biasing force of the reset element 484, the locking assembly 48 is in the locking state or has a tendency to switch to the locking state. When the user needs to adjust the cutting height of the mower 300, the user operates the lock switch 583, the lock switch 583 sends an unlocking signal to the control assembly 493, the control assembly 493 controls the electric motor 482 to start, and the electric motor 482 drives the locking member 481 to overcome the biasing force of the reset element 484 and move to a state of being out of the gear hole 466*a*. At this time, the locking assembly 48 is in the unlocking state. After the cutting height of the mower 300 is adjusted to a preset position, the control assembly 493 controls the electric motor 482 to stop, and the reset element 484 biases the locking member 481 into the gear hole 466*a* again to lock the gear member 466.

The lock switch 583 is disposed on the mounting member 414 of the handle device 41, and the lock switch 583 may be a button that can be pressed by the user. It is to be understood that in other examples, the lock switch 583 may be disposed on the main machine 400*a*.

In this example, after the locking assembly 48 switches to the unlocking state, the control assembly 493 controls the second motor 451 to start and enter the height adjustment mode. For example, the control assembly 493 is configured to control, after a preset time since the locking assembly 48 switches to the unlocking state, the second motor 451 to start. That is to say, in this example, after the preset time since the locking assembly 48 switches to the unlocking state, the control assembly 493 automatically starts the second motor 451 to enter the height adjustment mode.

Of course, it is to be understood that in other examples, a start switch for the user to operate may be disposed on the handle device 41. After the locking assembly 48 switches to the unlocking state, the user operates the start switch to control the second motor 451 to start and enter the height adjustment mode.

In this example, the mower 300 further includes a safety device 494 configured to detect whether the locking assembly 48 successfully locks or releases the height of the main housing 42*a* relative to the ground. For example, the safety device 494 is configured to detect whether the locking member 481 is successfully inserted into the gear hole 466*a* to determine whether the locking member 481 locks the gear member 466. In this example, the safety device 494 includes a photocoupler that detects whether the locking member 481 is inserted into the gear hole 466*a*. The photocoupler is electrically or signally connected to the control assembly 493. The photocoupler sends a detection result to the control assembly 493, and the control assembly 493 controls the electric motor 482 to start.

In other examples, the safety device 494 may be a microswitch. Alternatively, in other examples, the safety device may be a detection assembly 496 that detects a parameter of the electric motor 482, and the detection assembly 496 determines, by detecting the parameter of the electric motor 482, whether the locking member 481 is inserted into the gear hole 466*a*.

As described above, the gear member 466 has the multiple gear holes 466*a*, and when the locking member 481 is inserted into a different gear hole 466*a*, the main housing 42*a* is in a different height gear and has a different height relative to the ground so that the mower 300 has a different cutting height. Before height adjustment, the user needs to preset that the main housing 42*a* moves to a preset height, where the preset height corresponds to a preset height gear of the main housing 42*a*.

For example, the mower 300 further includes an input device 495 configured for the user to operate, and the user sets the preset height of the main housing 42*a* through the input device 495. The preset height may be a height value or a height gear corresponding to the height, which is input by the user. In this example, the user inputs the height gear corresponding to the height. Different height gears are set, and the drive assembly 45 drives the adjustment assembly 46 to move the main housing 42*a* to the height corresponding to the height gear. As described above, the gear member 466 is provided with eight gear holes 466*a*, and the user may input, through the input device 495, any one of 1 to 8 that represents the height gear. In this example, the height gear is a number. It is to be understood that the height gear is not limited to the number and may be any information that can reflect a change in the preset height. For example, the height gear may be a code or an image corresponding to a different preset height.

The input device 495 is disposed on the handle device 41 to be convenient for the user to operate. For example, in this example, the input device 495 includes an input member. The input member is rotatably connected to the mounting member 414, and the input member is a knob for the user to operate to be rotated to gear 1, gear 2, gear 3, gear 4, gear 5, gear 6, gear 7 or gear 8. The input member is disposed on the mounting member 414 so that the input member is relatively close to the lock switch 583 to be more convenient for the user to operate. For example, the distance between the input member and the lock switch 583 is less than or equal to 200 mm.

In other examples, the input member may be slidably connected to the mounting member 414. For example, the input member is a button for the user to operate. For example, the input member includes an increase key and a decrease key, and the user may increase or decrease a gear by operating the increase key or the decrease key.

Alternatively, in other examples, a display screen is disposed on the mounting member 414, and the input member is a touch element disposed on the display screen. In this case, the lock switch 583 may be a touch element disposed on the display screen.

The input device 495 is also electrically or signally connected to the second motor 451. For example, the input device 495 is electrically or signally connected to the control assembly 493, and the control assembly 493 includes a receiving module configured to receive information about an input gear of the input device 495. After the second motor 451 is started, the drive assembly 45 drives the adjustment assembly 46. When the adjustment assembly 46 moves to a preset height gear, the control assembly 493 controls the second motor 451 to stop.

In other examples, the input device is separated from the mower, and the input device has a separated state relative to the mower. For example, the input device is connected to the mower by means of wireless communications, such as Bluetooth or Wi-Fi. The input device may be a client device such as a mobile phone, a computer or a palmtop computer of the user. In fact, any device allowing the user to transmit input information to the mower may be understood as the input device.

In this example, the mower 300 further includes the detection assembly 496 that detects a parameter capable of reflecting a change in the height of the main housing 42*a* relative to the ground. In this example, the detection assembly 496 detects a motion of the main housing 42$a$ relative to the walking assembly 44 to indirectly determine whether the main housing 42$a$ moves to the preset height gear.

For example, the mower 300 further includes a conversion device 497. The conversion device 497 includes a rotary member 497$a$. The conversion device 497 can convert a height change of the main housing 42$a$ relative to the ground into a rotation change of the rotary member 497$a$. An angle of rotation of the rotary member 497$a$ corresponds to the height of the main housing 42$a$ relative to the ground, and the angle of rotation of the rotary member 497$a$ also corresponds to a change in the gear hole 466$a$ of the gear member 466. The detection assembly 496 detects the angle of rotation of the rotary member 497$a$ to determine whether the locking member 481 moves to a position corresponding to the gear hole 466$a$ of the gear member 466 or rather, the detection assembly 496 detects the angle of rotation of the rotary member 497$a$ to determine whether the main housing 42$a$ moves to the preset height gear.

The conversion device 497 further includes a conversion member 497$b$ fixedly connected to the gear member 466. The conversion member 497$b$ is formed with drive teeth and the rotary member 497$a$ is formed with mating teeth, where the mating teeth mesh with the drive teeth. When the gear member 466 rotates, the conversion member 497$b$ rotates along with the gear member 466, and the conversion member 497$b$ drives, through the drive teeth, the rotary member 497$a$ to rotate.

For example, the detection assembly 496 is electrically or signally connected to the control assembly 493. When the mower 300 requires height adjustment, the user inputs the preset height gear through the input device 495 and then operates the lock switch 583 to cause the locking assembly 48 to release the locking of the gear member 466 so that the height of the main housing 42$a$ can change, and the control assembly 493 controls the second motor 451 to start and enter the height adjustment mode. In the height adjustment mode, the detection assembly 496 detects the angle of rotation of the rotary member 497$a$ and determines whether the rotary member 497$a$ rotates to a preset angle corresponding to the preset height gear. When the rotary member 497$a$ rotates to the preset angle, the main housing 42$a$ reaches the preset height relative to the ground correspondingly, the control assembly 493 controls the second motor 451 to stop rotating, and after the second motor 451 stops rotating, the control assembly 493 controls the electric motor 482 of the locking assembly 48 to stop. At this time, the reset element 484 drives the locking member 481 to be inserted into a preset gear hole 466$a$ corresponding to the preset height gear.

In this example, the detection assembly 496 includes a sensor that detects the parameter capable of reflecting the change in the height of the main housing 42$a$ relative to the ground, where the sensor is a Hall sensor, and the parameter is the angle of the rotary member 497$a$. The Hall sensor includes a magnetic element and a magnetic sensor, the magnetic element is mounted to the rotary member 497$a$, and the magnetic sensor is mounted to the main housing 42$a$ so that the detection assembly 496 can have better accuracy and provide a more accurate result. Moreover, the magnetic sensor is mounted to the main housing 42$a$, ensuring that the Hall sensor has a longer service life.

It is to be understood that in other examples, the detection assembly 496 may be a potentiometer.

The mower 300 further includes a display assembly 498, where the display assembly 498 includes a display element that displays a current height or height gear of the main housing 42$a$ and the display assembly 498 is electrically or signally connected to the detection assembly 496. In this example, the display assembly 498 is configured to display the height gear of the main housing 42$a$. The detection assembly 496 detects the angle of the rotary member 497$a$, and the angle corresponds to a different height gear of the main housing 42$a$. The detection assembly 496 sends the detected angle to the display assembly 498, and the display assembly 498 displays the height gear corresponding to the angle. The display assembly 498 is disposed on the handle device 41. In other examples, the display assembly 498 may be disposed on the main machine 400$a$. The display assembly 498 includes a display screen disposed on the mounting member 414. The display screen may be a light-emitting diode (LED) display screen that displays a corresponding gear value. Alternatively, in other examples, the display screen is a liquid crystal display (LCD). Alternatively, in other examples, the display assembly 498 includes LED lamps that are the same as the gear holes 466$a$ in number, and the number of LED lamps that are on among multiple LED lamps is the same as a value of the height gear. In this example, the height gear displayed by the display assembly 498 is a number. It is to be understood that in other examples, the height gear displayed by the display assembly 498 may be a gear bar. Alternatively, in other examples, the content of the height gear displayed by the display assembly 498 may be an image.

In this example, the display assembly 498 is connected to the control assembly 493, and the control assembly 493 includes a processing module connected to the display assembly 498. The control assembly 493 is connected to the detection assembly 496. The detection assembly 496 sends the detected angle information of the rotary member 497$a$ to the processing module, the processing module converts the angle detected by the detection assembly 496 into a height gear and sends information about the height gear to the display assembly 498, and the display assembly 498 displays the value of the height gear.

Figure 20:
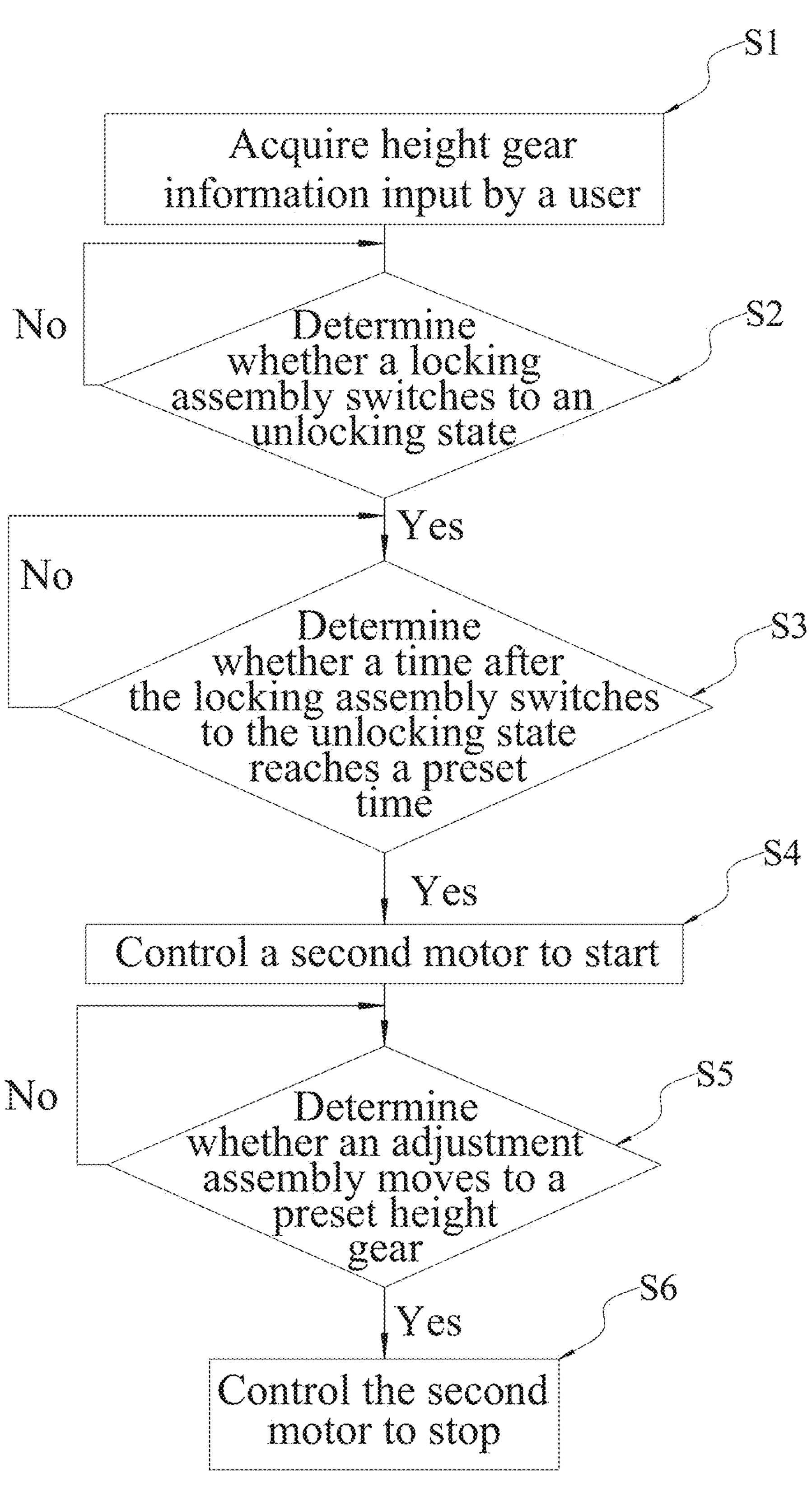
FIG. 20 is a flowchart of height adjustment of the mower in FIG. 10.

As shown in FIG. 20, an operation process and a control process for height adjustment of the mower 300 are described below.

In S1, height gear information input by the user is acquired.

The user inputs the height gear through the input device 495. The height gear may be a height value indicating the cutting height of the mower 300, another parameter value corresponding to the height value or a gear value corresponding to the height value. In this example, the height gear is the gear value corresponding to the height value, and each gear value corresponds to a height value within a preset range of the cutter 431.

In S2, it is determined whether the locking assembly switches to the unlocking state.

The user operates the lock switch 583 to drive the locking assembly 48 to switch to the unlocking state. After the user presses the lock switch 583, the control assembly 493 controls the electric motor 482 to start, and the electric motor 482 drives the locking member 481 to exit the gear hole 466$a$. At this time, the locking assembly 48 switches to the unlocking state. The detection assembly 496 detects whether the locking assembly 48 switches to the unlocking state. When the detection assembly 496 detects the switching of the locking assembly 48 to the unlocking state, step S3 is performed, and the second motor 451 is allowed to start. When the detection assembly 496 detects the unlocking assembly 48 fails to switch to the unlocking state, step S2 is repeated.

In S3, it is determined whether a time after the locking assembly switches to the unlocking state reaches a preset time.

The timing starts when the locking assembly 48 switches to the unlocking state. When the time after the locking assembly 48 switches to the unlocking state reaches the preset time, step S4 is performed.

In S4, the second motor is controlled to start.

When the time after the locking assembly 48 switches to the unlocking state reaches the preset time, the second motor 451 is controlled to start and enter the height adjustment mode. In S5, it is determined whether the adjustment assembly moves to the preset height gear.

The detection assembly 496 detects whether the angle of rotation of the rotary member 497*a* reaches the preset angle corresponding to the preset height gear. When the detection assembly 496 detects that the angle of the rotary member 497*a* does not reach the preset angle, the second motor 451 continues running and step S4 is repeated. When the detection assembly 496 detects that the angle of the rotary member 497*a* reaches the preset angle, step S5 is performed.

In S6, the second motor is controlled to stop.

When the rotary member 497*a* reaches the preset angle, the adjustment assembly 46 reaches the preset height gear, the main housing 42*a* moves to a preset cutting height, and the control assembly 493 controls the second motor 451 to stop.

In other examples, the following may be further included between step S1 and step S2: before the locking assembly 48 switches to the unlocking state, the second motor 451 is started and drives the adjustment assembly 46 to operate for a preset time. In this manner, the friction force between the locking member 481 and the gear hole 466*a* can be reduced, and the locking assembly 48 can conveniently switch to the unlocking state.

In other examples, step S3 may be modified to determining whether a start signal is received from the start switch. That is to say, after the locking assembly 48 switches to the unlocking state, the control assembly 493 does not automatically drive the second motor 451 to start, but the user needs to operate the start switch to drive the second motor 451 to start.

The present application further provides a mower in a third example. A mower 500 shown in FIG. 21 has basically the same structure as the mower 300 in the second example, and their difference mainly lies in that the mower 500 further includes an operating member 501, and the operating member 501 is detachably connected to a mounting member 514.

Figure 21:
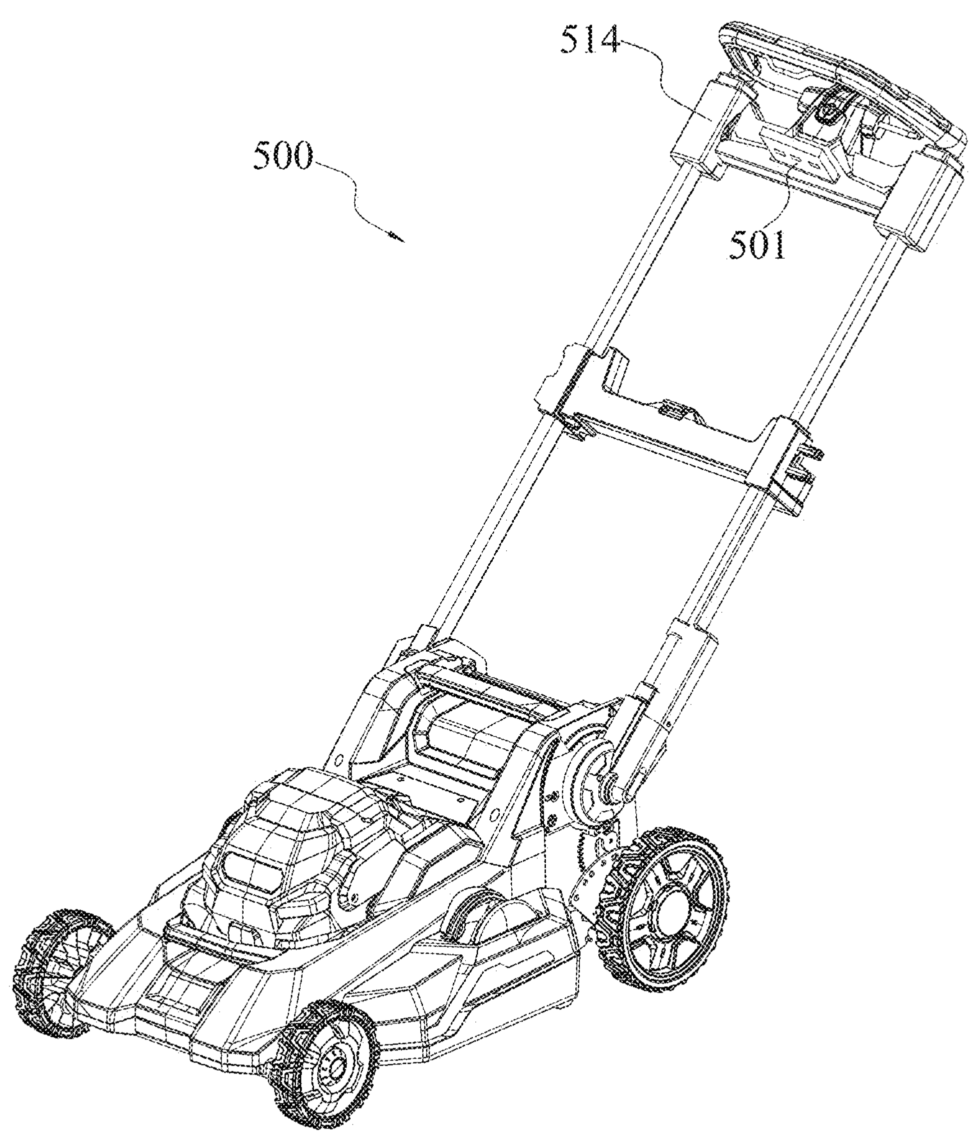
FIG. 21 is a perspective view of a mower according to a third example of the present application.
Figure 22:
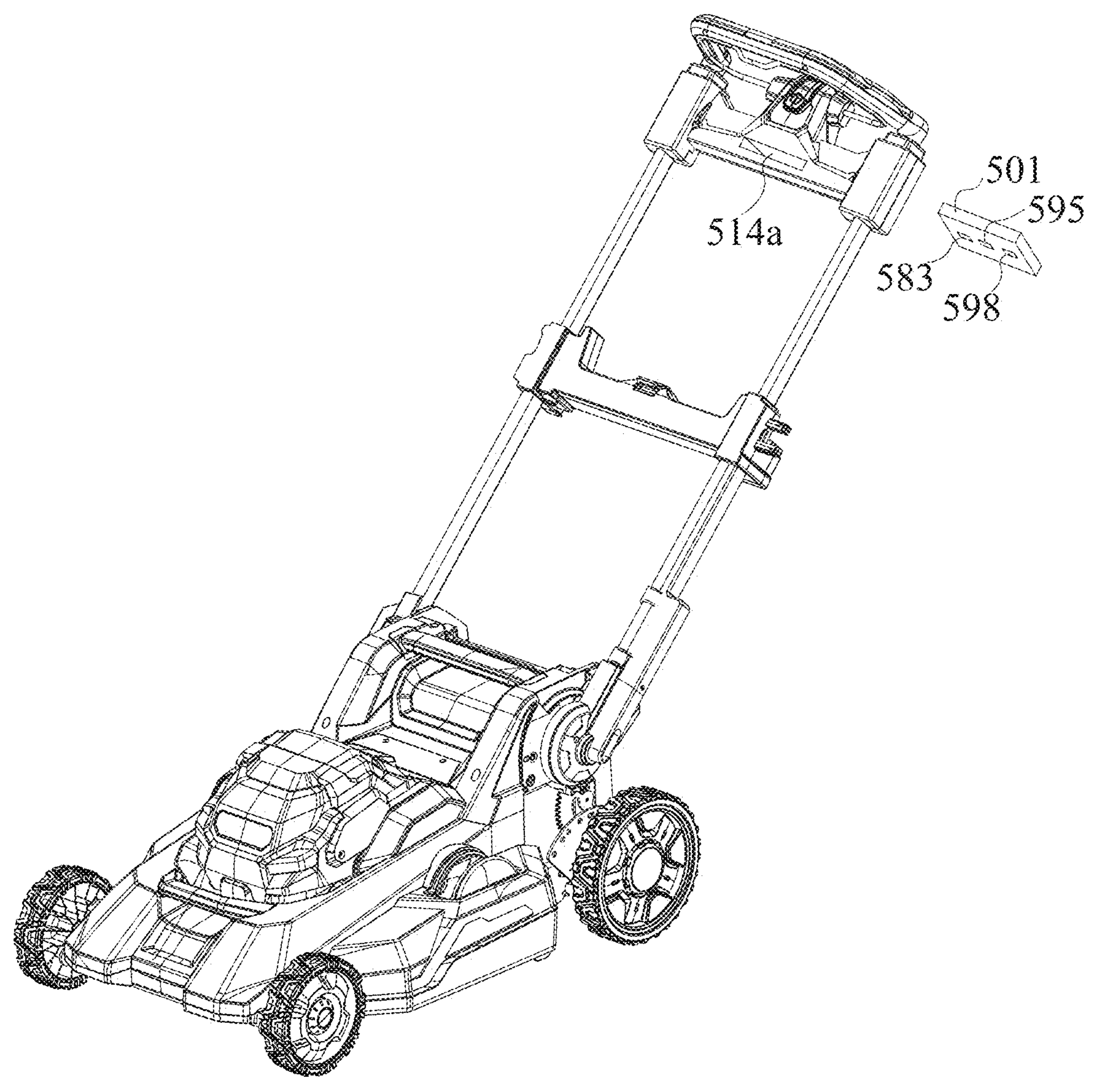
FIG. 22 is a perspective view of the mower of FIG. 21 with an operating member in a separated state.

As shown in FIGS. 21 and 22, the mounting member 514 is formed with a mounting portion 514*a* for mounting the operating member 501, the mounting portion 514*a* is a mounting slot, and the operating member 501 may be detachably connected to the mounting slot. An input device 595, a lock switch 583 and a display assembly 598 are all disposed on the operating member 501. In this manner, the operating member 501 has a separated state where the operating member 501 can be separated from the mounting member 514. In this case, the input device 595, the lock switch 583 and the display assembly 598 are also in the separated state. When the operating member 501 is in the separated state where the operating member 501 is separated from the mower 500, the input device 595 and the lock switch 583 can also be operated by a user. In this example, the operating member 501 is connected to the mower 500 by means of wireless communications so that the user can more conveniently separate the operating member 501 from the mower 500. In this example, a first electrical connection interface may be disposed in the mounting slot, and a corresponding second electrical connection interface is disposed on the operating member 501. When the operating member 501 is mounted into the mounting slot, the first electrical connection interface is connected to the second electrical connection interface.

It is to be understood that in other examples, the operating member 501 may be detachably connected to the mounting member 514 through one cable. When the operating member 501 is disengaged from the mounting slot to be in the separated state, the cable connects the mounting member 514 to the operating member 501.

Figure 23:
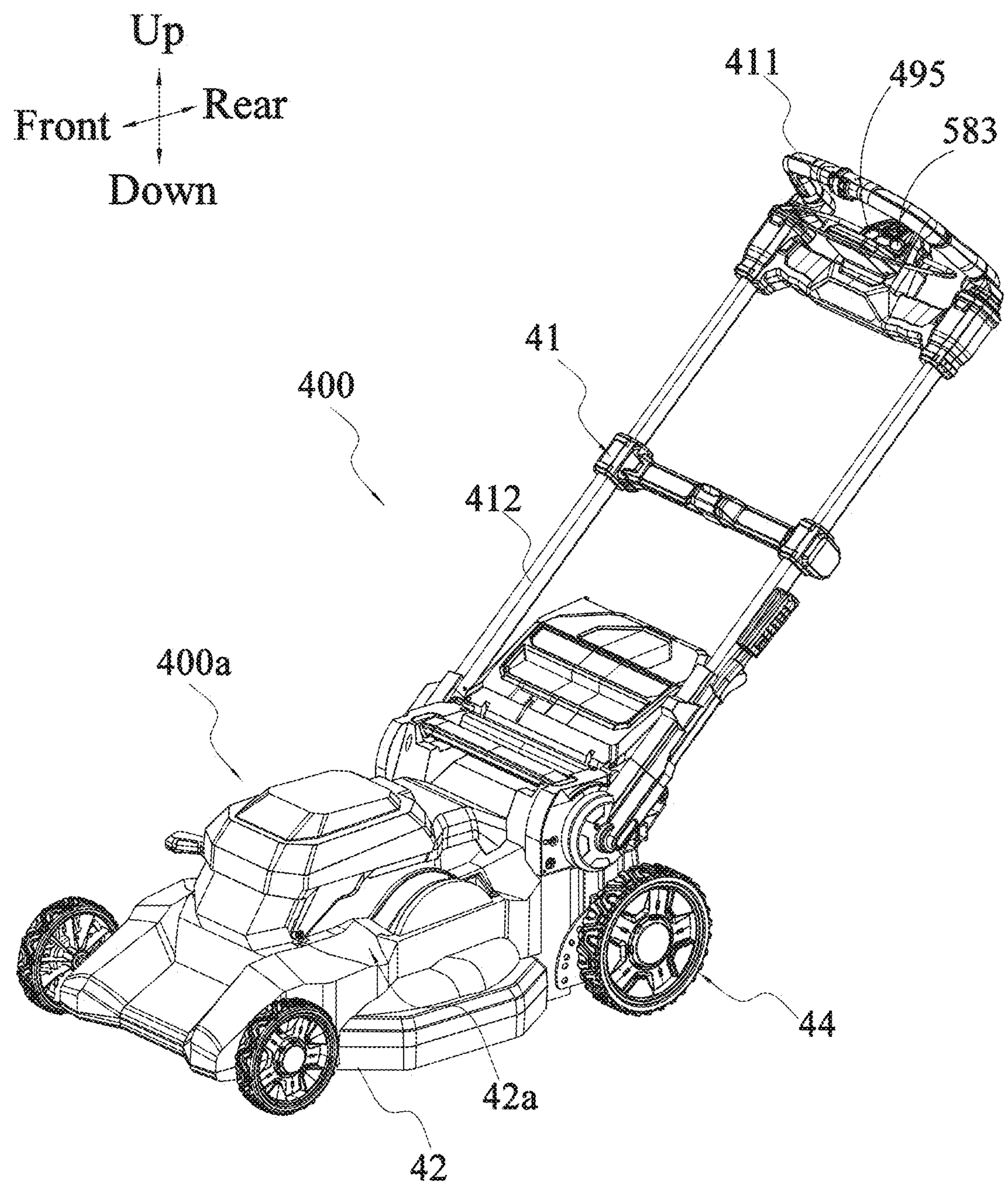
FIG. 23 is a perspective view of a mower according to a fourth example of the present application.

The present application further provides a mower in a fourth example. A mower 400 shown in FIG. 23 is configured for a user to cut grass in a lawn, such as a lawn of a garden, a park or a golf course. The grass in the lawn requires regular care and thus needs to be often cut with the mower 400. In this example, the mower 400 is a walk-behind mower. When the user operates the mower 400, the user stands behind the mower 400 and pushes or pulls the mower 400 to walk on the ground.

Figure 24:
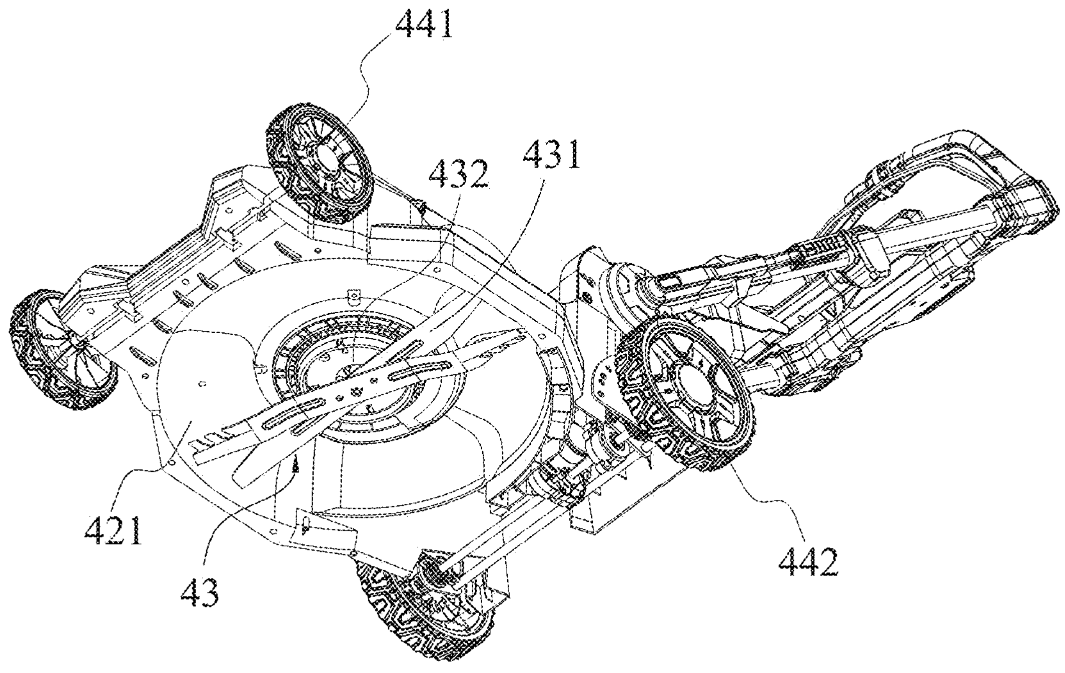
FIG. 24 is a perspective view of the mower of FIG. 23 from another angle.
Figure 25:
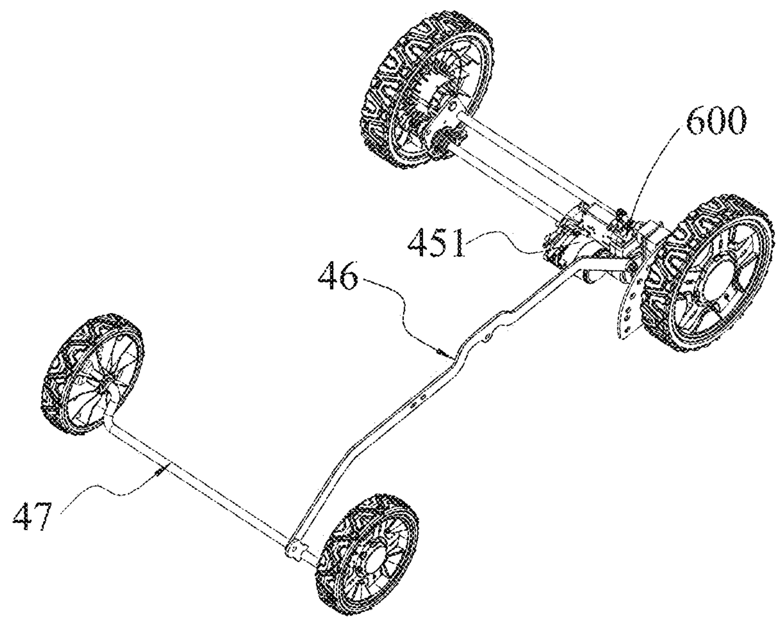
FIG. 25 is a perspective view of a walking assembly, an adjustment assembly, a support assembly, an activation assembly, a clutch and a locking assembly in the mower of FIG. 23.

As shown in FIGS. 23 to 25, the mower 400 includes a main machine 400*a* and a handle device 41, where the handle device 41 is connected to the rear end of the main machine 400*a* and configured for the user to operate. The handle device 41 includes a grip 411 and connecting rods 412, the grip 411 is configured for the user to hold to push or support the mower 400, and the connecting rods 412 connect the grip 411 to the main machine 400*a*.

The main machine 400*a* includes a main housing 42*a*, a cutting assembly 43 and a walking assembly 44. The connecting rods 412 connect the main housing 42*a* to the handle device 41. The cutting assembly 43 is configured to implement a mowing function, and the cutting assembly 43 includes a cutter 431 and a first motor 432 for driving the cutter 431 to rotate. The main housing 42*a* includes a chassis 42 formed with an accommodation space 421 for accommodating at least part of the cutter 431. The accommodation space 421 is at least open downward, and the cutter 431 is disposed in the accommodation space 421 and can cut grass when the cutter 431 rotates at a high speed. The first motor 432 is mounted to the main housing 42*a*, and the cutter 431 is connected to the first motor 432. The cutter 431 is, for example, a blade disposed in the accommodation space 421.

The cutter 431 is mounted to the first motor 432, and the first motor 432 drives the cutter 431 to rotate at a high speed to cut the grass in the lawn. In this example, the first motor 432 is an electric motor. The walking assembly 44 can drive the mower 400 to walk on the ground, and the walking assembly 44 can at least drive the mower 400 to advance, retreat and turn on the ground. The walking assembly 44 includes multiple walking wheels. In this example, the walking assembly 44 includes two front walking wheels 441 and two rear walking wheels 442. The chassis 42 is configured to support the cutting assembly 43 and the walking assembly 44. The main housing 42*a* connects the handle device 41, the cutting assembly 43 and the walking assembly 44 into a whole.

As shown in FIG. 25, the mower 400 further includes a second motor 451 for driving the walking assembly 44 to move. In this example, the second motor 451 is configured to drive the rear walking wheels 442 to rotate so that the mower 400 walks on the ground. In other examples, the second motor 451 may be configured to drive the front walking wheels 441 to rotate. Alternatively, the mower 400 includes a front motor and a rear motor, the front motor drives the front walking wheels 441, and the rear motor drives the rear walking wheels 442.

The mower 400 has a self-propelled mode. When the mower 400 is in the self-propelled mode, the second motor 451 is in a first driving state. In this case, the second motor 451 is started, and the second motor 451 drives the walking assembly 44 to rotate to drive the mower 400 to walk on the ground. In this manner, when the user needs to mow the grass, the user just needs to stand on the rear side of the mower 400 and follow the mower 400 to walk. The mower 400 is driven by the second motor 451 to advance automatically, and the user does not need to manually push the mower 400 to walk on the ground. Such an operation manner saves the labor of the user and improves the working efficiency.

During the mowing of the mower 400, the grass in the lawn may be required to have a particular height after being cut, and thus the height of the cutter 431 relative to the ground needs to be adjusted. When the height of the cutter 431 relative to the ground is relatively low, the grass in the lawn is relatively low after being cut. Thus, the user may need to mow the lawn in a longer time. When the height of the cutter 431 relative to the ground is relatively high, the grass in the lawn is relatively high after being cut. Thus, the lawn better meets an aesthetic requirement of the user. Alternatively, the user may require grass in different regions of the lawn to have different heights. Thus, the user needs to frequently adjust the height of the cutter 431 relative to the ground.

The mower 400 further includes an adjustment assembly 46, the adjustment assembly 46 connects the chassis 42 to the walking assembly 44, and the adjustment assembly 46 can adjust a relative position between the chassis 42 and the walking assembly 44 to adjust the height of the main housing 42*a* relative to the ground. In this example, the cutting assembly 43 is mounted on the chassis 42, and the height of the walking assembly 44 relative to the ground is substantially unchanged. Therefore, when the adjustment assembly 46 changes the relative position between the chassis 42 and the walking assembly 44, the height of the main housing 42*a* relative to the ground changes, and the height of the cutter 431 is adjusted. In this manner, the adjustment assembly 46 can adjust the height of the cutter 431 relative to the ground. It is to be noted that the relative position reflects a position change of the chassis 42 relative to the walking assembly 44 in a vertical direction. In this manner, the height of the walking assembly 44 relative to the ground is fixed, but the height of the chassis 42 relative to the ground changes so that the height of a whole formed by the main housing 42*a* and the cutting assembly 43 changes. Alternatively, the relative position includes at least a position change of the chassis 42 relative to the walking assembly 44 in the vertical direction and may also include a position change of the chassis 42 relative to the walking assembly 44 in another direction. Alternatively, the relative position reflects a relative rotation between the chassis 42 and the walking assembly 44, and the relative rotation causes a position change of the chassis 42 relative to the walking assembly 44 in the vertical direction.

In this example, the mower 400 further has a height adjustment mode. When the mower 400 is in the height adjustment mode, the second motor 451 is in a second driving state and the second motor 451 drives the adjustment assembly 46 to adjust the height of the main housing 42*a*. For example, when the mower 400 is in the height adjustment mode, the second motor 451 drives the adjustment assembly 46, and the adjustment assembly 46 adjusts the relative position between the chassis 42 and the walking assembly 44 so that the height of the cutting assembly 43 mounted on the chassis 42 relative to the ground changes. The second motor 451 drives the adjustment assembly 46, and the user does not need to manually operate the adjustment assembly 46. In this manner, the user can quickly and effortlessly adjust the height of the cutter 431, greatly improving the working efficiency. Moreover, the second motor 451 may drive the walking assembly 44 to drive the mower 400 to walk on the ground. That is to say, the second motor 451 can not only implement a function of driving the mower 400 to walk on the ground but also implement a function of driving the adjustment assembly 46 to move to adjust the height of the cutter 431. The mower 400 utilizes the second motor 451 that drives the walking assembly 44, and an additional drive mechanism for driving the adjustment assembly 46 is not required, achieving a simpler structure and a lower cost and saving space on the chassis 42 of the mower 400.

When the height of the cutter 431 needs to be adjusted, the user starts the second motor 451. At this time, the second motor 451 can drive the adjustment assembly 46 to move, and the adjustment assembly 46 adjusts the relative position between the chassis 42 and the walking assembly 44. The mower 400 enters the height adjustment mode, and the height of the main housing 42*a* and the cutter 431 relative to the ground changes. In this manner, the second motor 451 electrically drives the adjustment assembly 46 to perform height adjustment, and the user can operate the mower 400 for height adjustment without applying an additional force. The entire operation process for height adjustment is easy and convenient. Additionally, relative to a height adjustment mechanism of the mower 400 in the related art, the height adjustment of the cutter 431 is implemented by using the second motor 451, and the user may gently put hands on the handle device 41 and does not need to bend down with the hands leaving the handle device 41 to operate the height adjustment mechanism, thereby improving the working efficiency.

The mower 400 further includes a support assembly 47 configured to support the chassis 42. The adjustment assembly 46 connects the support assembly 47 to the walking assembly 44. When driven by the second motor 451, the adjustment assembly 46 can adjust a relative position between the support assembly 47 and the walking assembly 44 to implement a position change of the chassis 42 relative to the walking assembly 44.

As shown in FIG. 25, in this example, when the mower 400 is in the height adjustment mode and the self-propelled mode, power transmission paths between the second motor 451 and the walking assembly 44 are different. The mower 400 further includes a clutch 600 disposed on a power transmission path between the second motor 451 and the walking assembly 44. The clutch 600 connects the second motor 451 to the adjustment assembly 46. The clutch is configured to selectively transmit power from the second motor 451 to the adjustment assembly 46. When the clutch 600 is engaged, the mower 400 is in the height adjustment mode, the power of the second motor 451 is transmitted to the walking assembly 44 and the adjustment assembly 46, and the adjustment assembly 46 adjusts the relative position between the chassis 42 and the walking assembly 44. When the clutch 600 is disengaged, the mower 400 is in the self-propelled mode, the power of the second motor 451 is transmitted to the walking assembly 44 rather than the adjustment assembly 46, and the relative position between the chassis 42 and the walking assembly 44 is not adjusted by the adjustment assembly 46.

When the mower 400 is in the height adjustment mode, the power of the second motor 451 is transmitted to the adjustment assembly 46 via the clutch 600 to drive the adjustment assembly 46 and the support assembly 47 to move, and the relative position between the support assembly 47 and the walking assembly 44 changes. That is to say, a power source of the adjustment assembly 46 in this example is transmitted from the second motor 451 via the clutch 600. On the power transmission path between the second motor 451 and the walking assembly 44, power is transmitted from the second motor 451 to the clutch 600, from the clutch 600 to the adjustment assembly 46, and from the adjustment assembly 46 to the support assembly 47. Meanwhile, another power is transmitted from the second motor 451 to the walking assembly 44. In this manner, the second motor 451 directly drives the adjustment assembly 46 and the support assembly 47 to move relative to the walking assembly 44, achieving stable and reliable power transmission. Power transmitted between the second motor 451 and the walking assembly 44 can be divided by the clutch 600, reducing a power loss in the power transmission process so that the user can easily and conveniently implement the height adjustment function.

Figure 26:
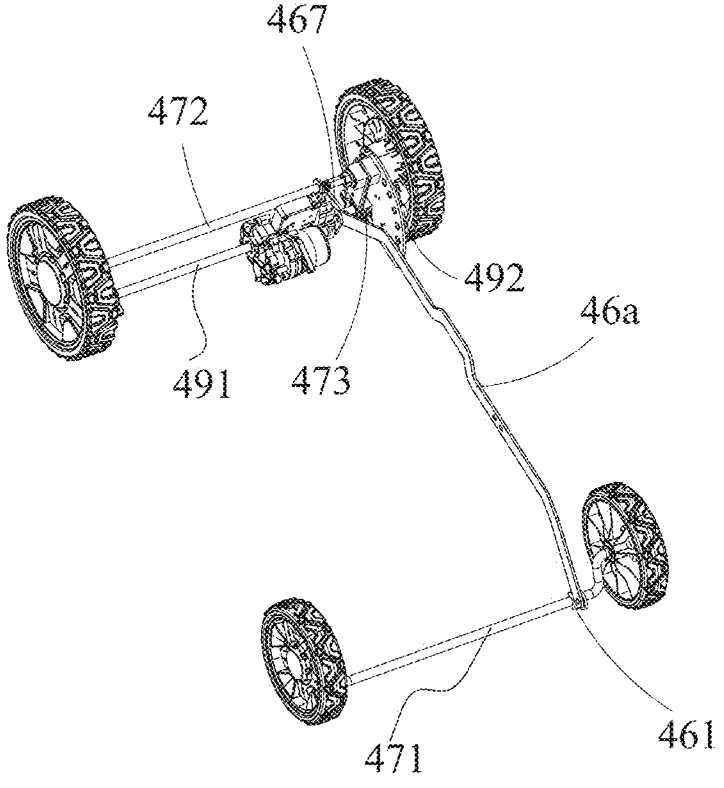
FIG. 26 is a perspective view of the structure shown in FIG. 25 from another angle.

As shown in FIGS. 25 and 26, the support assembly 47 includes a front crankshaft 471 and a rear crankshaft 472. The front end of the chassis 42 is supported by the front crankshaft 471, and the front crankshaft 471 is connected to the front end of the chassis 42. The rear end of the chassis 42 is supported by the rear crankshaft 472, and the rear crankshaft 472 is connected to the rear end of the chassis 42. The support assembly 47 further includes a support member 473. The support member 473 is connected to the chassis 42 and supports the rear end of the chassis 42. The mower 400 further includes a drive shaft 491 configured to drive the walking assembly 44 to rotate, the drive shaft 491 is connected to the second motor 451, and the drive shaft 491 is also connected to the walking assembly 44. The second motor 451 drives the drive shaft 491 to rotate, and the drive shaft 491 transmits power to the walking assembly 44. The drive shaft 491 is parallel to the rear crankshaft 472, and the drive shaft 491 is also parallel to the front crankshaft 471. The support member 473 is rotatably mounted onto the drive shaft 491 through a bearing.

Figure 29:
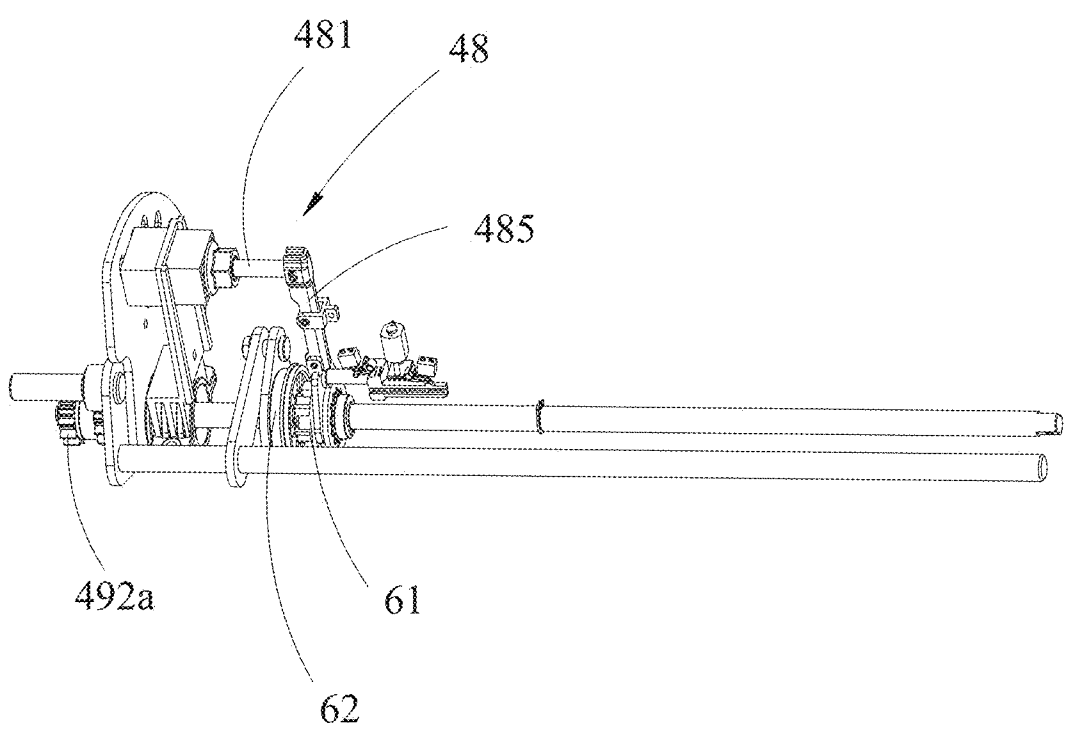
FIG. 29 is a perspective view of part of an adjustment assembly, a support assembly, an activation assembly, a clutch and a locking assembly in the mower of FIG. 23 when the clutch is disengaged.

The mower 400 further includes a gear assembly 492 that transmits power output from the drive shaft 491 to a rear walking wheel 442, and the gear assembly 492 is at least partially disposed in the rear walking wheel 442. When the mower 400 is in the self-propelled mode, the second motor 451 drives the drive shaft 491 to rotate, the drive shaft 491 drives the gear assembly 492 to rotate, the gear assembly 492 drives the rear walking wheel 442 to rotate, and the mower 400 may walk on the ground. As shown in FIG. 29, the gear assembly 492 includes a self-walking gear **492*a* and a rear wheel gear. When the mower 400 is in the height adjustment mode, the second motor 451 drives the self-walking gear 492*a* to rotate, and the self-walking gear 492*a* rotates relative to the rear wheel gear. The rear wheel gear is fixed relative to the ground, and the self-walking gear 492*a* moves relative to the ground. In this case, the position of the mower 400** on the ground remains unchanged.

When the mower 400 is in the height adjustment mode, the height of the chassis 42 may be increased through a forward rotation of the second motor 451, and the height of the chassis 42 may be decreased through a reverse rotation of the second motor 451. In some examples, when the mower 400 is in the height adjustment mode, the height of the chassis 42 may be decreased through a forward rotation of the second motor 451, and the height of the chassis 42 may be increased through a reverse rotation of the second motor 451. In some examples, the mower 400 includes a commutation gearset. When the mower 400 is in the height adjustment mode, the height of the chassis 42 may be decreased or increased through a forward rotation of the second motor 451.

Figure 27:
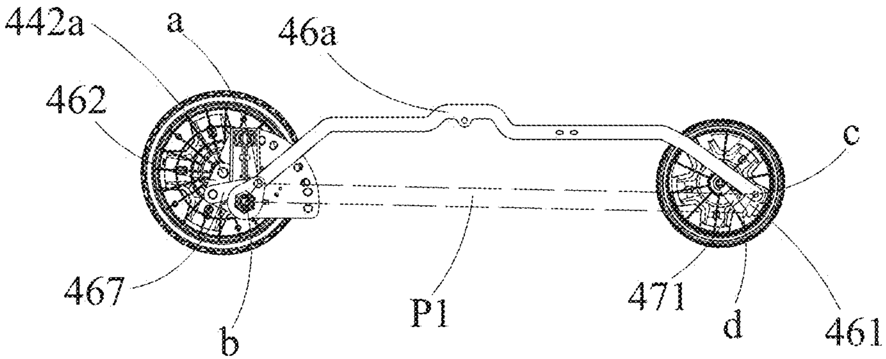
FIG. 27 is a plan view of part of a walking assembly, an adjustment assembly and a support assembly in the mower of FIG. 23.
Figure 28:
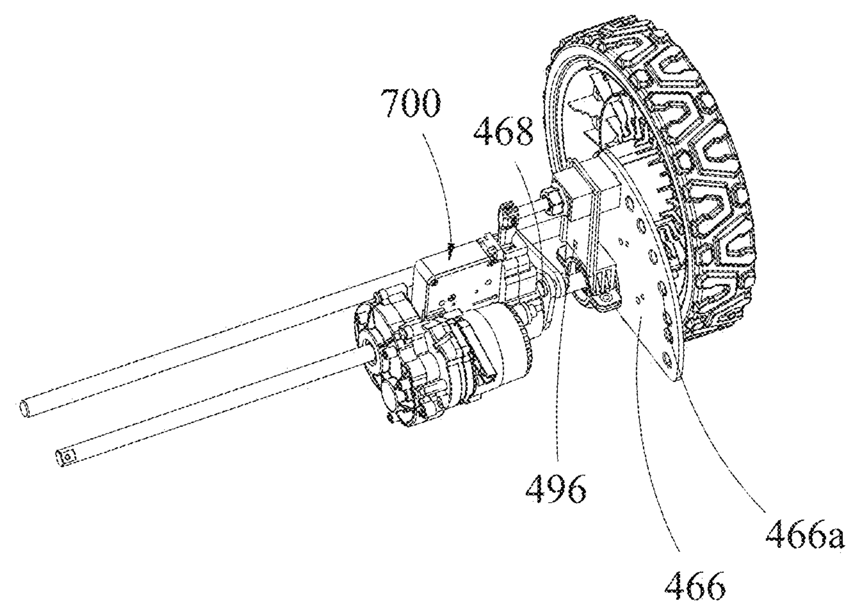
FIG. 28 is an enlarged view of part of the structure in FIG. 26.

As shown in FIGS. 26 to 28, the adjustment assembly 46 includes a connecting rod **46*a*, a front connector 461, a synchronizer 467, a bolt 468 and a rear connector 462. The rear connector 462 is configured to rotate about a rear axle 442*a*. The connecting rod 46*a* connects the front connector 461 to the rear connector 462. The front connector 461 is connected to the front crankshaft 471 and the rear connector 462 is connected to the rear crankshaft 472. The rear connector 462 and the rear crankshaft 472 may be two separate parts or may be a part integrated through welding. The connecting rod 46*a* may be composed of one rod or multiple rods. In this example, the connecting rod 46*a* is composed of one rod. The front end of the connecting rod 46*a* is connected to the front connector 461 and the rear end of the connecting rod 46*a* is connected to the bolt 468. The bolt 468 connects the synchronizer 467 to the connecting rod 46*a*. The synchronizer 467 is connected to the rear crankshaft 472. When the synchronizer 467 rotates, the synchronizer 467 drives the rear crankshaft 472 to rotate. The synchronizer 467 is configured to make the connecting rod 46*a* and the rear crankshaft 472 move simultaneously. The synchronizer 467 and the rear crankshaft 472 may be two separate parts or may be a part integrated through welding. In this example, the synchronizer 467, the rear crankshaft 472 and the rear connector 462** are a part integrated through welding.

The connecting rod **46*a*, the synchronizer 467 and the bolt 468 are connected and intersect at a first connection point a, the drive shaft 491 has a second connection point b, the connecting rod 46*a* and the front connector 461 are connected and intersect at a third connection point c, and the front connector 461 and the front crankshaft 471 are connected and intersect at a fourth connection point d. The first connection point a, the second connection point b, the third connection point c and the fourth connection point d form a parallelogram P1. When the user performs height adjustment, the parallelogram P1 deforms with the second connection point b and the fourth connection point d as pivot points. In the height adjustment mode, the second motor 451 transmits power to the second connection point b via the drive shaft 491. Since the position of the drive shaft 491 remains unchanged, the position of the second connection point b remains unchanged. The power is then transmitted from the second connection point b to the first connection point a, and the first connection point a rotates about the second connection point b under the action of torque. The positions of the connecting rod 46*a*, the synchronizer 467 and the bolt 468 change relative to the second connection point b, the position of the first connection point a changes, and meanwhile the connecting rod 46*a* and the synchronizer 467 pivot around the bolt 468. The synchronizer 467 drives the rear connector 462 to pivot around the rear axle 442*a*. A side ab changes in inclination, and the position of the first connection point a changes. The connecting rod 46*a* is connected to the front connector 461 by a bolt. The connecting rod 46*a* pivots around the bolt relative to the front connector 461. Meanwhile, the positions of the connecting rod 46*a* and the front connector 461 change, and the position of the third connection point c changes. The front connector 461 and the front crankshaft 471 are fixed relative to each other, and the position of the fourth connection point d remains unchanged. In this manner, when the parallelogram P1 deforms, a relative position of the chassis 42 relative to the walking assembly 44 changes. In this case, since the height of the walking assembly 44 relative to the ground is actually unchanged, a change in the relative position reflects a change in the position of the chassis 42 relative to the ground, and finally the height of the cutter 431 is adjusted. That is to say, when the parallelogram P1 deforms, the absolute positions of the first connection point a, the second connection point b, the third connection point c and the fourth connection point d relative to the ground change, thereby implementing the height adjustment of the cutter 431**.

As shown in FIGS. 29 to 33, the clutch 600 includes a first clutch portion 61 and a second clutch portion 62. When the first clutch portion 61 is engaged with the second clutch portion 62, the first clutch portion 61 and the second clutch portion 62 move synchronously, and the clutch 600 is engaged. When the first clutch portion 61 is disengaged from the second clutch portion 62, the first clutch portion 61 and the second clutch portion 62 have different motion states, and the clutch 600 is disengaged. The clutch 600 may be an operated clutch such as an embedded clutch or may be an automatic clutch such as a centrifugal clutch. In this example, the clutch 600 is an embedded clutch. The first clutch portion 61 includes teeth and the second clutch portion 62 includes slots for being engaged with the teeth. When the teeth are at least partially inserted into the slots, the first clutch portion 61 is engaged with the second clutch portion 62 so that the first clutch portion 61 can drive the second clutch portion 62 to rotate. When the teeth are not inserted into the slots, the first clutch portion 61 is disengaged from the second clutch portion 62, the motion state of the second clutch portion 62 is not affected by the first clutch portion 61, and a power transmission path from the second motor 451 to the adjustment assembly 46 is interrupted by the clutch 600. In this manner, the power transmission path from the second motor 451 to the adjustment assembly 46 can be changed by the clutch 600. During use of the mower 400, the user can operate the mower 400 to switch between the height adjustment mode and the self-propelled mode by simply controlling the clutch 600 to be engaged or disengaged and does not need to perform another manual operation on the mower 400, which is convenient and fast and can save labor.

The clutch 600 further includes a mating member 63, a first plate 64 and a second plate 65. The mating member 63 is configured to guide the first clutch portion 61. The mating member 63 is connected to the drive shaft 491 and formed with teeth in an outer circumferential direction. The first clutch portion 61 is sleeved on the mating member 63 and formed with teeth in an inner circumferential direction. The first clutch portion 61 is guided by the teeth to move axially along the mating member 63. The first plate 64 is connected to the first clutch portion 61 and configured to drive the first clutch portion 61 to move. A connection end 641 between the first plate 64 and the first clutch portion 61 is arc-shaped, the first clutch portion 61 is cylindrical, and a fixing slot 611 is formed around the first clutch portion 61 in an outer circumferential direction. The first plate 64 is sleeved around the fixing slot 611 so that the first clutch portion 61 can rotate circumferentially in the first plate 64, and the first plate 64 can drive through the fixing slot 611 the first clutch portion 61 to move stably along the drive shaft 491. The second plate 65 is connected to the second clutch portion 62, and the second plate 65 is driven by the second clutch portion 62 to rotate around the drive shaft 491. The second plate 65 is formed with a plate hole 651. The second clutch portion 62 is formed with a protrusion 621 inserted into the plate hole 651 to drive the second plate 65 to rotate. In this example, the plate hole 651 and the protrusion 621 are polygonal so that the plate hole 651 can mate with the protrusion 621 more stably. The second plate 65 is connected to the synchronizer 467 through the bolt 468. When the second plate 65 rotates, the second plate 65 drives the bolt 468 and the synchronizer 467 to rotate.

The mower 400 further includes an activation assembly 700. The activation assembly 700 is disposed on a power transmission path between the second motor 451 and the clutch 600. The activation assembly 700 is configured to selectively disengage or engage the clutch 600. The activation assembly 700 includes a housing, an activation member 71 and an electromechanical drive element for driving the activation member 71 to move. The electromechanical drive element includes an electric motor or an electromagnet. In this example, the electromechanical drive element is an electric motor 72. The electric motor 72 drives the activation member 71 to move. The electric motor 72 is fixedly mounted in the housing. The activation assembly 700 includes an output gear 721 and a rack 722, and the output gear 721 transmits power from the electric motor 72 to the rack 722. The rack 722 is movably disposed in the housing and configured to mesh with the output gear 721. The rack 722 includes a push portion **722*a* connected to the activation member 71. When the output gear 721 rotates, the rack 722 moves in the housing and the push portion 722*a* drives the activation member 71 to move. In this example, the output gear 721 rotates clockwise or counterclockwise, and the push portion 722*a* drives the activation member 71 to move towards or away from the clutch 600 along a direction parallel to the drive shaft 491. The activation member 71 is fixedly connected to the first plate 64. When the electric motor 72 drives the activation member 71 to move towards the clutch 600, the first plate 64 drives the first clutch portion 61 to move towards the second clutch portion 62 to engage the clutch 600. The second clutch portion 62 is driven by the first clutch portion 61, and the power of the second motor 451 is transmitted to the adjustment assembly 46. When the electric motor 72 drives the activation member 71 to move away from the clutch 600, the first plate 64 drives the first clutch portion 61 to move away from the second clutch portion 62 to disengage the clutch 600. The second clutch portion 62 is not driven by the first clutch portion 61, and the power from the second motor 451 to the adjustment assembly 46 is interrupted after transmitted to the first clutch portion 61. In this example, the clutch 600 is driven by the activation assembly 700 to be engaged or disengaged. In other examples, for example, when the clutch 600 is a centrifugal clutch, the clutch 600 may be engaged or disengaged without relying on the activation assembly 700**.

The mower 400 further includes a locking assembly 48 for locking the height of the main housing **42*a* relative to the ground, and the locking assembly 48 is mounted to the main housing 42*a*. For example, the locking assembly 48 is configured to lock the relative rotation between the chassis 42 and the walking assembly 44. The locking assembly 48 includes a locking state and an unlocking state. When the locking assembly 48 is in the locking state, the locking assembly 48 locks the height of the main housing 42*a* relative to the ground. In this case, the position of the chassis 42 relative to the walking assembly 44 is fixed, and the mower 400 enters the self-propelled mode. When the locking assembly 48 is in the locking state and the mower 400 is in the self-propelled mode, the second motor 451 enters the first driving state after started, and the second motor 451 drives the walking assembly 44 to walk on the ground. When the locking assembly 48 is in the unlocking state, the locking assembly 48 allows a change in the height of the main housing 42***a*. In this case, the position of the chassis 42 relative to the walking assembly 44 may change, and the mower 400 enters the height adjustment mode. When the locking assembly 48 is in the unlocking state and the mower 400 is in the height adjustment mode, the second motor 451 may drive the adjustment assembly 46 to adjust the relative position between the chassis 42 and the walking assembly 44 to adjust the height of the main housing 42*a*, thereby changing the mowing height of the cutter 431.

The locking assembly 48 includes a locking member 481 and a connecting rod mechanism 485. The connecting rod mechanism 485 connects the locking member 481 to the activation assembly 700. The activation assembly 700 drives through the connecting rod mechanism 485 the locking member 481 to switch between the locking state and the unlocking state. The connecting rod mechanism 485 may be composed of one rod or multiple rods. In this example, the connecting rod mechanism 485 is composed of one rod. The connecting rod mechanism 485 includes an activated end 485*a* and a locking end 485*b*. The activated end 485*a* is connected to the activation member 71 and the locking end 485*b* is connected to the locking member 481. The activated end 485*a* may be pivotally mounted to the first plate 64 and the locking end 485*b* may be pivotally mounted to the locking member 481. When the electric motor 72 drives the first plate 64, the first plate 64 moves axially along the drive shaft 491 and drives the activated end 485*a* to move axially along the direction parallel to the drive shaft 491. The connecting rod mechanism 485 rotates about an axis x1, and the locking end 485*b* and the activated end 485*a* move in opposite directions. The locking end 485*b* drives the locking member 481 to move along the direction parallel to the drive shaft 491. In this example, the activation assembly 700 drives the clutch 600 to be engaged or disengaged and drives the locking assembly 48 to switch between the locking state and the unlocking state. In other examples, the activated end 485*a* may be directly connected to the activation member 71 instead of being connected through the first plate 64, or the activated end 485*a* may be connected to another activation assembly 700.

The locking assembly 48 includes a guide member 483. The locking member 481 includes a guided portion 481*a*. The guide member 483 is fixed to the main housing 42*a* and guides the guided portion 481*a* to move. In this example, the guide member 483 is fixedly connected to the support member 473, and the support member 473 supports the guide member 483. The guide member 483 is sleeved on the outside of the guided portion 481*a* and guides the guided portion 481*a* to slide in the gear member 466. The locking member includes a flexible portion 481*b* that can buffer a force transmitted from the electric motor 72 to the locking member 481 to prevent the locking member 481 from being damaged, improve the reliability of height locking, and optimize the experience of use.

Figure 30:
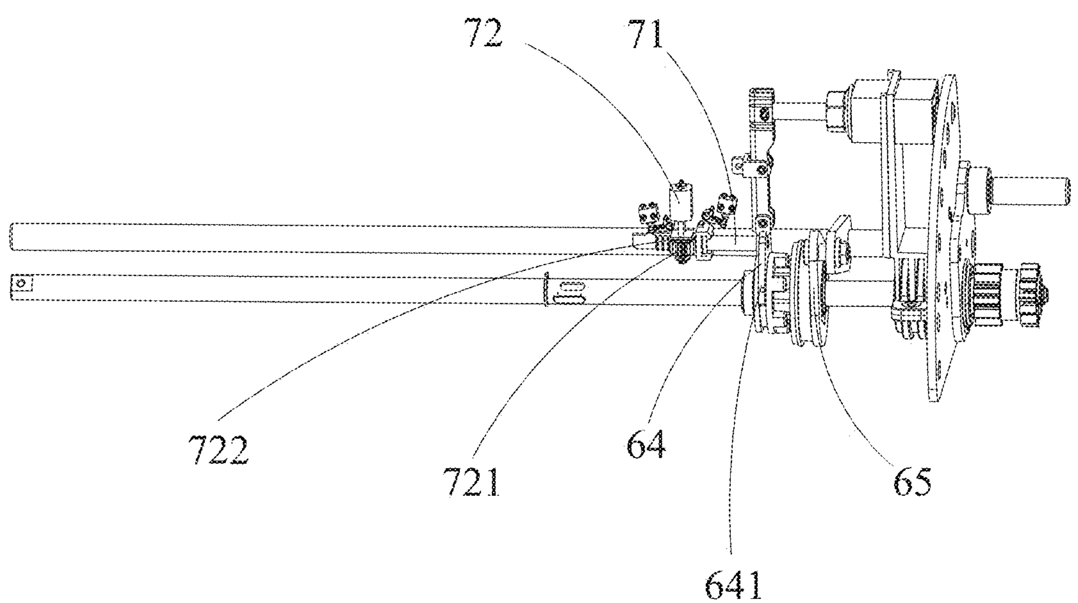
FIG. 30 is a perspective view of part of an adjustment assembly, a support assembly, an activation assembly, a clutch and a locking assembly in the mower of FIG. 29 from another angle when the clutch is disengaged.
Figure 31:
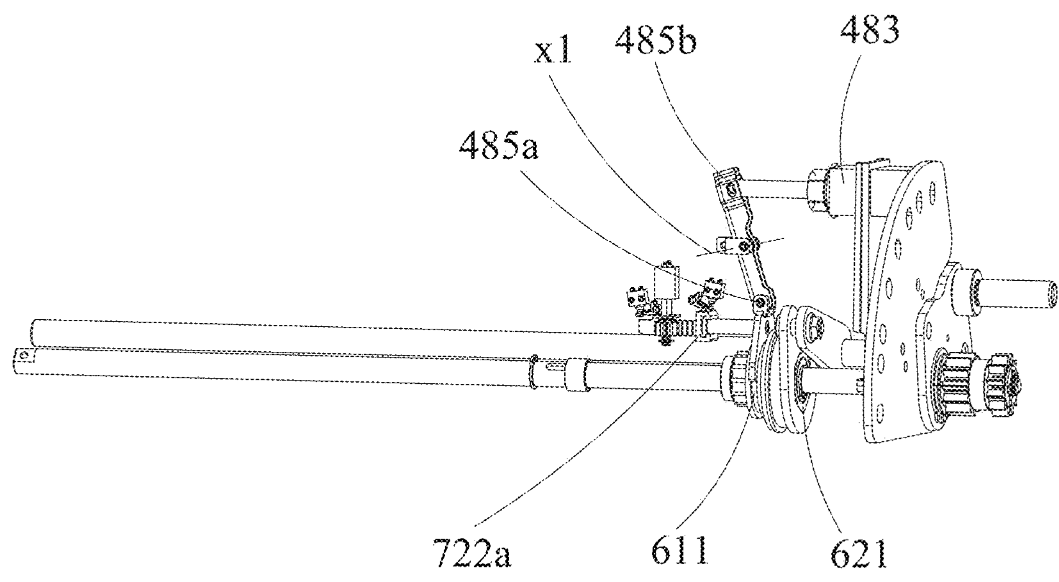
FIG. 31 is a perspective view of part of an adjustment assembly, a support assembly, an activation assembly, a clutch and a locking assembly in the mower of FIG. 29 when the clutch is engaged.
Figure 32:
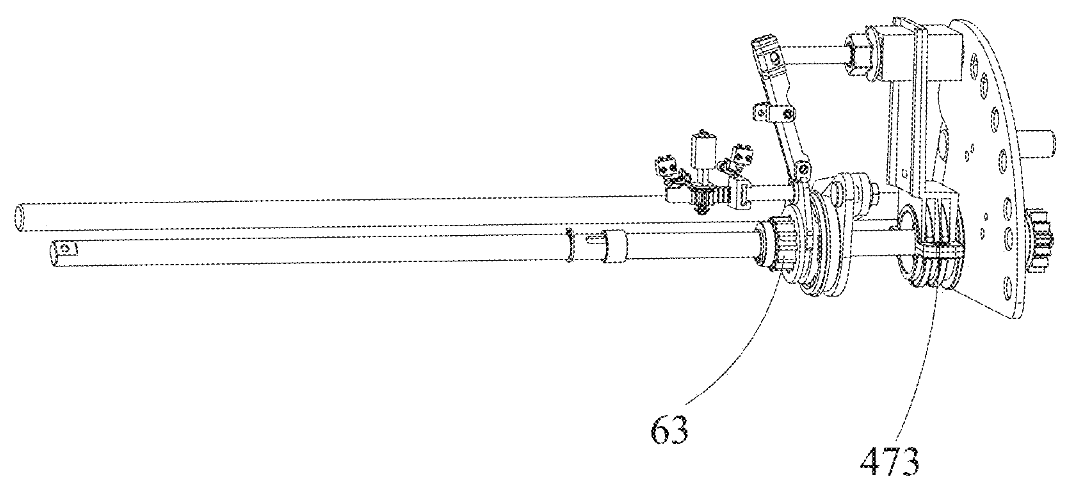
FIG. 32 is a perspective view of part of an adjustment assembly, a support assembly, an activation assembly, a clutch and a locking assembly in the mower of FIG. 29 from another angle when the clutch is engaged.
Figure 33:
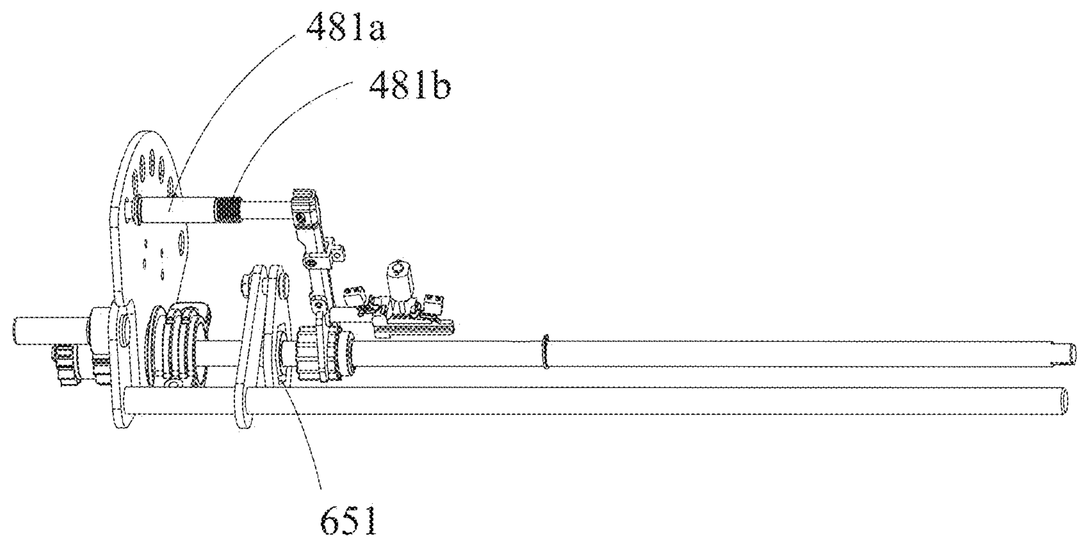
FIG. 33 is a perspective view of part of an adjustment assembly, a support assembly, an activation assembly, a clutch and a locking assembly in the mower of FIG. 29 with a guide member, a first clutch portion and a second clutch portion removed.
Figure 34:
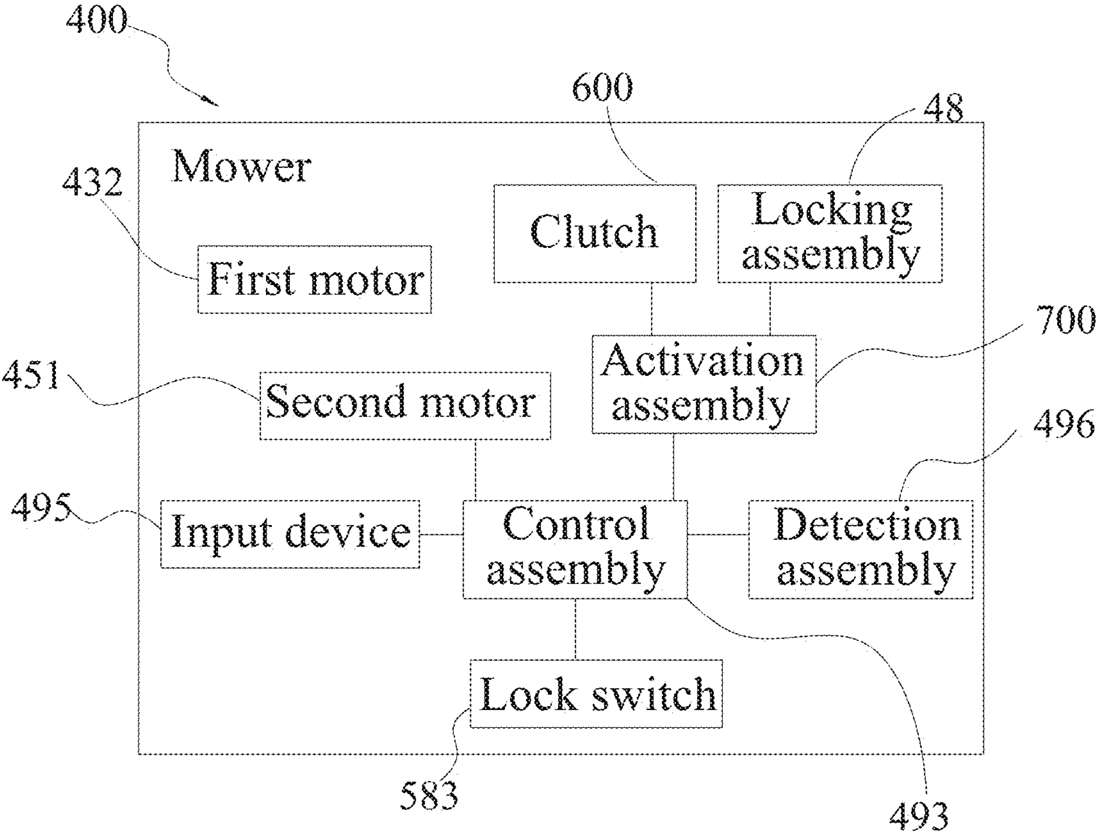
FIG. 34 is a control block diagram of the mower of FIG. 23.

As shown in FIGS. 30 and 34, the mower 400 further includes a control assembly 493 electrically or signally connected to the activation assembly 700 to control the activation assembly 700 to selectively disengage or engage the clutch 600. In this example, the control assembly 493 is electrically or signally connected to the activation assembly 700 to control the activation assembly 700 to selectively disengage or engage the clutch 600 and control the activation assembly 700 to switch the locking assembly 48 to the locking state or the unlocking state. In this manner, instead of directly and manually adjusting the activation assembly 700, the user inputs a signal to the control assembly 493, and the control assembly 493 outputs a control signal to the activation assembly 700 to drive the clutch 600 to be disengaged or engaged and to drive the locking assembly 48 to switch to the locking state or the unlocking state. The clutch 600 is disengaged and the locking assembly 48 switches to the locking state. The clutch 600 is engaged and the locking assembly 48 switches to the unlocking state. The mower 400 includes a power supply device configured to supply power to the first motor 432 and the second motor 451. The control assembly 493 is also connected to the power supply device, and the control assembly 493 controls the power supply device to supply power to the electric motor 72 or not. Alternatively, in other examples, the control assembly 493 is connected to the electric motor 72 by means of wireless communications, and the control assembly 493 controls the electric motor 72 to start by outputting to the electric motor 72 a signal for allowing the start of the electric motor 72.

As shown in FIG. 28, the adjustment assembly 46 further includes a gear member 466 connected to the rear connector 462. When the mower 400 enters the height adjustment mode, the second motor 451 transmits power to the adjustment assembly 46 via the drive shaft 491, and the height of the main housing 42*a* relative to the walking assembly 44 changes. The gear member 466 is fixedly connected to the rear connector 462. When the rear connector 462 rotates around the rear axle 442*a*, the gear member 466 also rotates around the rear axle 442*a*. The gear member 466 is provided with multiple gear holes 466*a*, and the locking member 481 is a pin that can be inserted into a gear hole 466*a*. When the pin is inserted into a different gear hole 466*a*, the main housing 42*a* has a different height relative to the ground so that the mower 400 is in a different height gear. As shown in FIGS. 23 and 34, the mower 400 includes a lock switch 583 for the user to operate, and the lock switch 583 is electrically or signally connected to the control assembly 493. The lock switch 583 is configured for the user to operate to control the activation assembly 700 to selectively disengage or engage the clutch 600 and control the activation assembly 700 to switch the locking assembly 48 to the locking state or the unlocking state. When the user needs to adjust the cutting height of the mower 400, the user operates the lock switch 583, the lock switch 583 sends an unlocking signal to the control assembly 493, the control assembly 493 controls the electric motor 72 to start, and the electric motor 72 drives the clutch 600 to be engaged and drives the locking member 481 to move to a state of being out of the gear hole 466*a*. At this time, the locking assembly 48 is in the unlocking state. After the cutting height of the mower 400 is adjusted to a preset position, the control assembly 493 controls the electric motor 72 to rotate reversely, and the electric motor 72 drives the clutch 600 to be disengaged and drives the locking member 481 to move to a state of being inserted into the gear hole 466*a*. At this time, the locking assembly 48 is in the locking state. The lock switch 583 is disposed on the handle device 41, and the lock switch 583 may be a button that can be pressed by the user. It is to be understood that in other examples, the lock switch 583 may be disposed on the main machine 400*a*.

In this example, after the user operates the lock switch 583, the control assembly 493 controls the activation assembly 700 to start. The control assembly 493 is configured to control, after a preset time since the activation assembly 700 is started, the second motor 451 to start. That is to say, in this example, after the activation assembly 700 is started, the control assembly 493 automatically starts the second motor 451 to enter the height adjustment mode. Of course, it is to be understood that in other examples, a start switch for the user to operate may be disposed on the handle device 41. After the preset time since the activation assembly 700 is started, the user operates the start switch to control the second motor 451 to start and enter the height adjustment mode.

After the activation assembly 700 is started, if the first clutch portion 61 is just engaged with the second clutch portion 62, the clutch 600 is engaged, the locking assembly 48 switches to the unlocking state, and the second motor 451 starts in the preset time to enter the height adjustment mode. After the activation assembly 700 is started, if the first clutch portion 61 is staggered from the second clutch portion 62 and the first clutch portion 61 fails to be smoothly engaged with the second clutch portion 62, the activation assembly 700 maintains a driving force, and the second motor 451 starts after the preset time and drives the first clutch portion 61 to rotate a preset angle. Under the driving force of the activation assembly 700, the first clutch portion 61 is engaged with the second clutch portion 62, the clutch 600 is engaged, the locking assembly 48 switches to the unlocking state, and the second motor 451 enters the height adjustment mode. In some examples, the preset angle the first clutch portion 61 rotates is less than or equal to 40°. In some examples, the preset angle the first clutch portion 61 rotates is less than or equal to 30°. In some examples, the preset time after which the second motor 451 starts is less than or equal to 2 s. In some examples, the preset time after which the second motor 451 starts is about 1 s. In some examples, the preset time after which the second motor 451 starts is about 0.5 s.

As shown in FIG. 28, in this example, the mower 400 further includes a detection assembly 496 that detects a parameter capable of reflecting a change in the height of the main housing **42*a* relative to the ground. In this example, the detection assembly 496 detects a motion of the chassis 42 relative to the walking assembly 44 to indirectly determine whether the main housing 42*a* moves to a preset height gear. In this example, the detection assembly 496 includes a sensor that detects the parameter capable of reflecting the change in the height of the main housing 42*a* relative to the ground, where the sensor is a Hall sensor, and the parameter is the position of the adjustment assembly 46. The Hall sensor includes a magnetic element and a magnetic sensor, and the magnetic element is mounted to the adjustment assembly 46 or the support assembly 47. In the height adjustment mode, when the Hall sensor detects in real time that the adjustment assembly 46 or the support assembly 47 approaches a preset height, the activation member 71 moves. The locking member 481 moves to the state of being out of the gear hole 466*a* and slides in the proximity of the gear member 466 until the preset height is reached. The activation member 71 moves again, the clutch 600 continues transmitting power in the process of being gradually disengaged until the locking member 481 moves to the state of being inserted into the gear hole 466*a*, the clutch 600 is disengaged, and the mower 400 switches to the self-propelled mode. The magnetic sensor is mounted to the main housing 42*a* so that the detection assembly 496 can have better accuracy and provide a more accurate result. Moreover, the magnetic sensor is mounted to the main housing 42*a*, ensuring that the Hall sensor has a longer service life. In other examples, the detection assembly 496** may be a potentiometer.

As shown in FIGS. 23 and 34, the mower 400 further includes an input device 495 configured for the user to operate, and the user sets the preset height of the main housing **42*a* through the input device 495. The input device 495 is disposed on the handle device 41 to be convenient for the user to operate. The preset height may be a height value or a height gear corresponding to the height, which is input by the user. In this example, the user inputs the height gear corresponding to the height. Different height gears are set, and the second motor 451 drives the adjustment assembly 46 to move the main housing 42*a* to the height corresponding to the height gear. The gear member 466 is provided with eight gear holes 466*a*, and the user may select, through the input device 495**, any one of 1 to 8 that represents the height gear. In this example, the height gear is a number. It is to be understood that the height gear is not limited to the number and may be any information that can reflect a change in the preset height. For example, the height gear may be a code or an image corresponding to a different preset height.

The input device 495 is also electrically or signally connected to the second motor 451. For example, the input device 495 is electrically or signally connected to the control assembly 493, and the control assembly 493 includes a receiving module configured to receive information about an input gear of the input device 495. When the adjustment assembly 46 is driven and the preset height set by the user is reached, the control assembly 493 controls the second motor 451 to stop.

Figure 35:
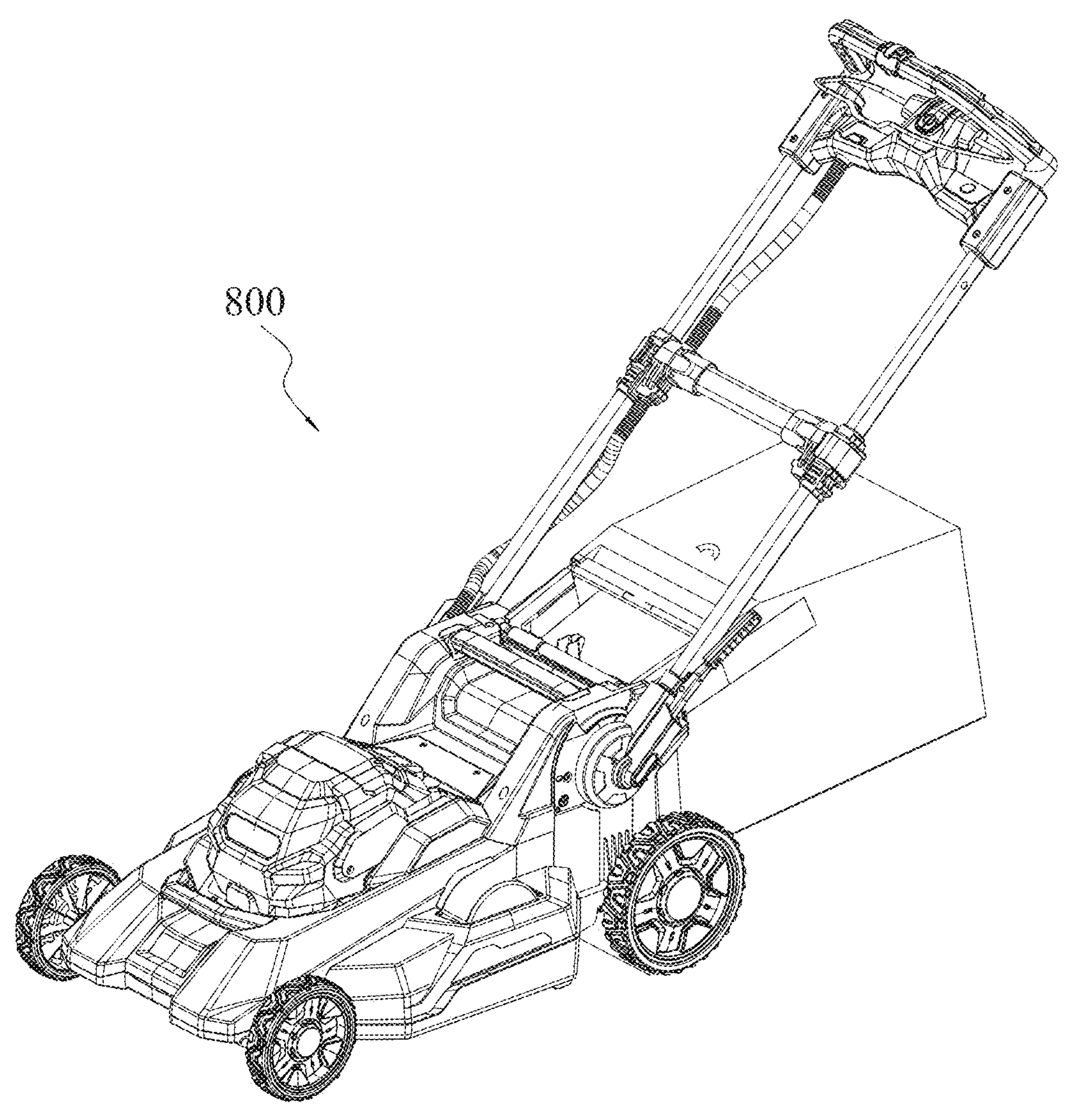
FIG. 35 is a perspective view of a mower according to a fifth example of the present application.
Figure 36:
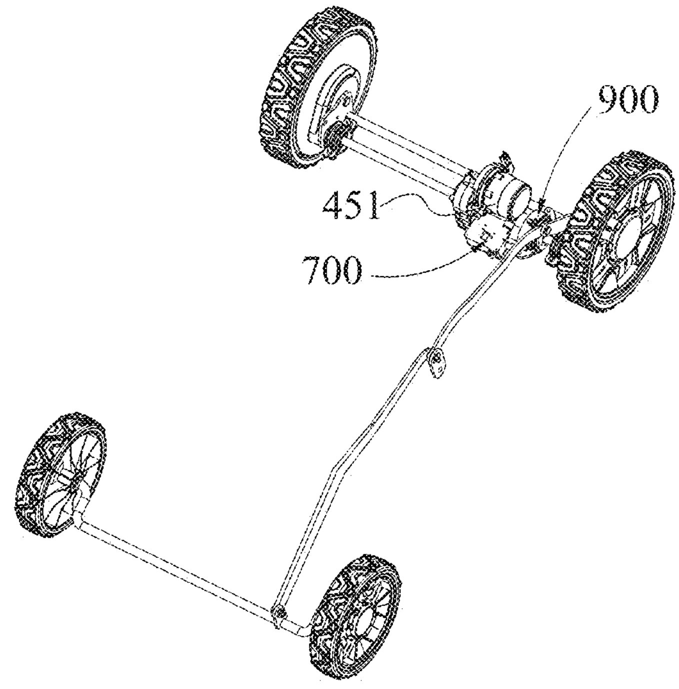
FIG. 36 is a perspective view of a walking assembly, an adjustment assembly, a support assembly, an activation assembly, a clutch and a locking assembly in the mower of FIG. 35.
Figure 37:
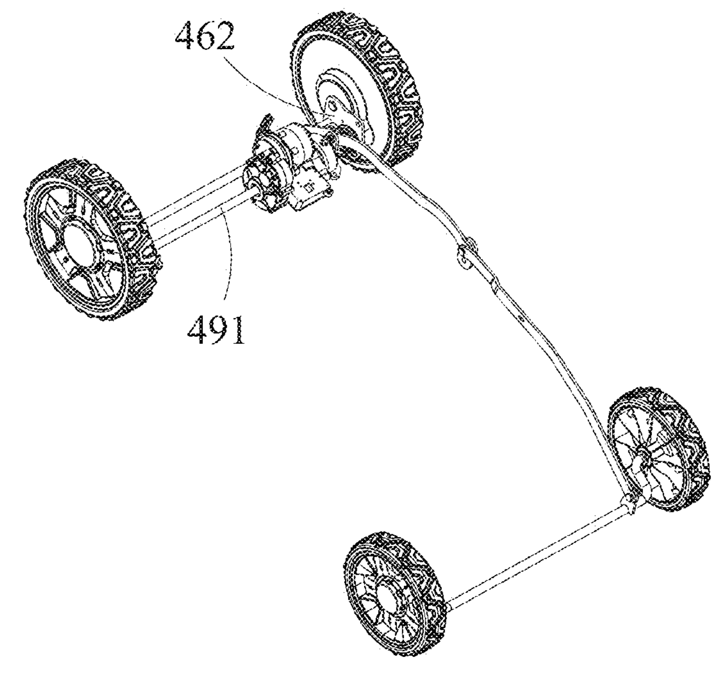
FIG. 37 is a perspective view of the structure shown in FIG. 36 from another angle.
Figure 38:
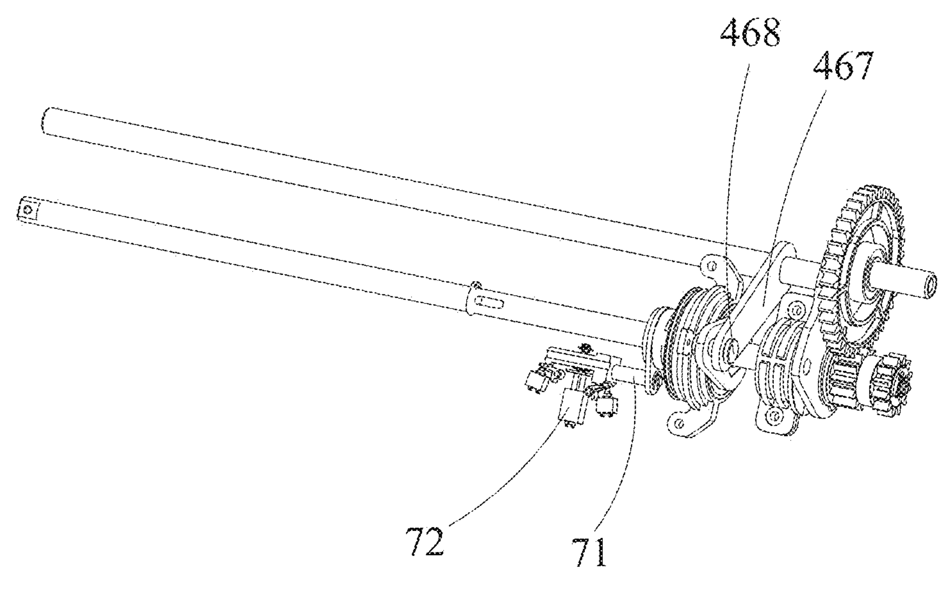
FIG. 38 is a perspective view of part of an adjustment assembly, a support assembly, an activation assembly, a clutch and a locking assembly in the mower of FIG. 35 when the clutch is disengaged.
Figure 39:
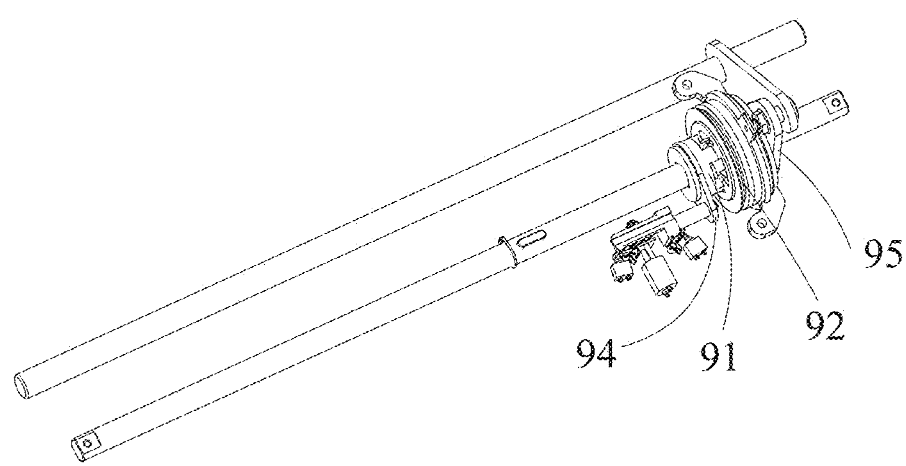
FIG. 39 is a perspective view of the structure shown in FIG. 38 with a gear assembly uninstalled.

The present application further provides a mower in a fifth example. A mower 800 shown in FIG. 35 has basically the same structure as the mower 400 in the first example, and their difference mainly lies in that the mower 800 has no gear member 466 and includes a clutch 900, where the clutch 900 is an overrunning clutch. The clutch 900 implements the locking and unlocking functions of a locking assembly 48. That is to say, the locking assembly 48 is the clutch 900.

As shown in FIGS. 36 to 39, the clutch 900 includes a first clutch portion 91 and a second clutch portion 92. When the first clutch portion 91 is engaged with the second clutch portion 92, the first clutch portion 91 and the second clutch portion 92 move synchronously, and the clutch 900 is engaged. When the first clutch portion 91 is disengaged from the second clutch portion 92, the first clutch portion 91 and the second clutch portion 92 have different motion states, and the clutch 900 is disengaged. The first clutch portion 91 includes teeth and the second clutch portion 92 includes slots for being engaged with the teeth. When the teeth are at least partially inserted into the slots, the first clutch portion 91 is engaged with the second clutch portion 92 so that the first clutch portion 91 can drive the second clutch portion 92 to rotate. When the teeth are not inserted into the slots, the first clutch portion 91 is disengaged from the second clutch portion 92, the motion state of the second clutch portion 92 is not affected by the first clutch portion 91, and a power transmission path from a second motor 451 to an adjustment assembly 46 is interrupted by the clutch 900. In this manner, the power transmission path from the second motor 451 to the adjustment assembly 46 can be changed by the clutch 900. During use of the mower 800, a user can operate the mower 800 to switch between a height adjustment mode and a self-propelled mode by simply controlling the clutch 900 to be engaged or disengaged and does not need to perform another manual operation on the mower 800, which is convenient and fast. In the height adjustment mode, on a power transmission path between the second motor 451 and a walking assembly 44, power is transmitted from the second motor 451 to the clutch 900, from the clutch 900 to the adjustment assembly 46, and from the adjustment assembly 46 to a support assembly 47. Meanwhile, another power is transmitted from the second motor 451 to the walking assembly 44. In this manner, the second motor 451 directly drives the adjustment assembly 46 and the support assembly 47 to move relative to the walking assembly 44, achieving stable and reliable power transmission. Power transmitted between the second motor 451 and the walking assembly 44 can be divided by the clutch 900, reducing a power loss in the power transmission process so that the user can easily and conveniently implement the height adjustment function.

The adjustment assembly 46 includes a synchronizer 467 and a bolt 468. The rear end of a connecting rod assembly **46*a* is rotatably connected to the bolt 468. A second plate 65 is connected to the synchronizer 467 through the bolt 468. The synchronizer 467 is pivotable relative to the bolt 468. When the second plate 65 rotates, the second plate 65 drives the bolt 468 and the synchronizer 467 to rotate. The position of the bolt 468 changes. The adjustment assembly 46 moves along with the bolt 468**, and the mowing height is adjusted.

The mower 800 further includes an activation assembly 700. The activation assembly 700 is disposed on a power transmission path between the second motor 451 and the clutch 900. The activation assembly 700 is configured to selectively disengage or engage the clutch 900. The activation assembly 700 includes a housing, an activation member 71 and an electric motor 72, and the electric motor 72 drives the activation member 71 to move. The electric motor 72 is fixedly mounted in the housing. The clutch 900 includes a first plate 94 and a second plate 95. The activation member 71 is fixedly connected to the first plate 94. When the electric motor 72 drives the activation member 71 to move towards the clutch 900, the first plate 94 drives the first clutch portion 91 to move towards the second clutch portion 92 to engage the clutch 900. The second clutch portion 92 is driven by the first clutch portion 91, and the power of the second motor 451 is transmitted to the adjustment assembly 46. When the electric motor 72 drives the activation member 71 to move away from the clutch 900, the first plate 94 drives the first clutch portion 91 to move away from the second clutch portion 92 to disengage the clutch 900. The second clutch portion 92 is not driven by the first clutch portion 91, and the power from the second motor 451 to the adjustment assembly 46 is interrupted after transmitted to the first clutch portion 91.

Figure 40:
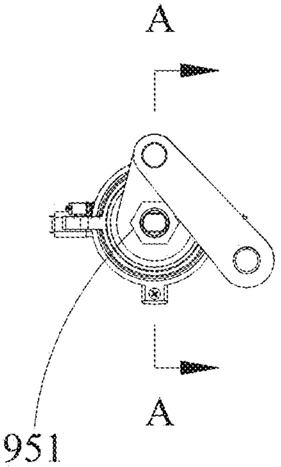
FIG. 40 is a side view of the structure shown in FIG. 39.
Figure 41:
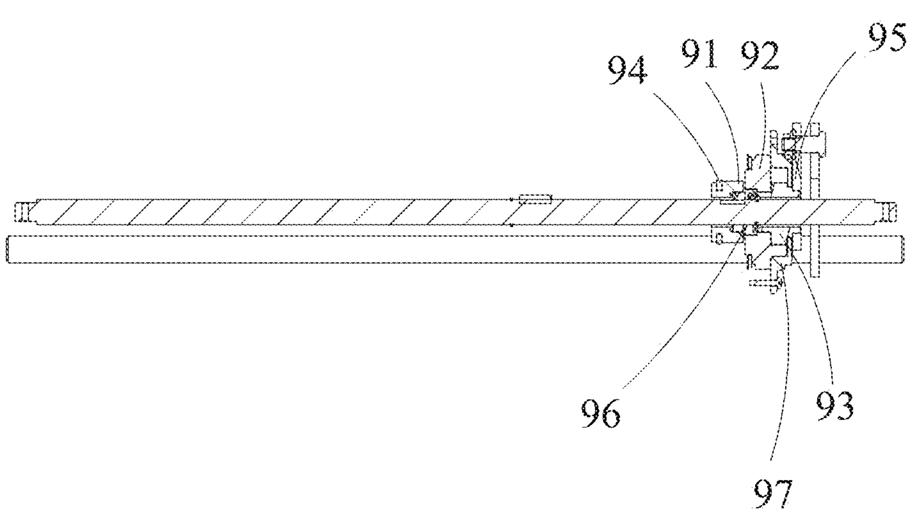
FIG. 41 is a sectional view of the structure shown in FIG. 39 along A-A.
Figure 42:
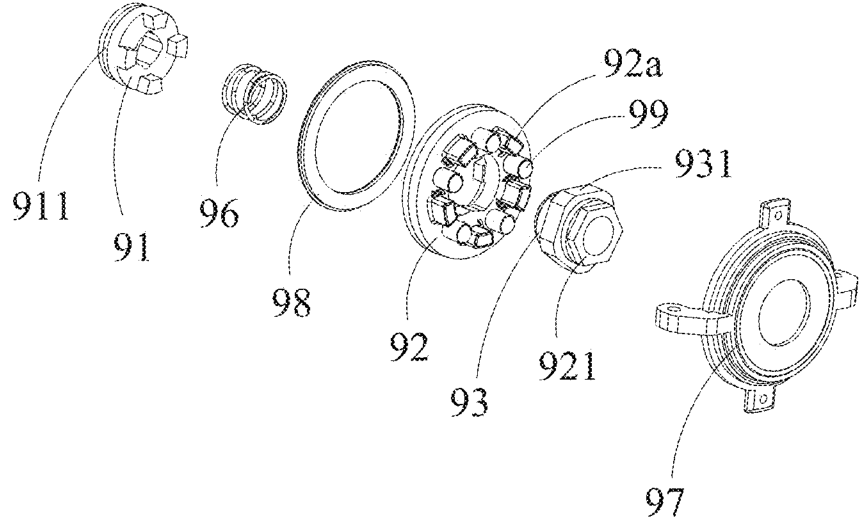
FIG. 42 is an exploded view of some parts of a clutch in the mower of FIG. 35.

As shown in FIGS. 40 to 42, the clutch 900 further includes a mating member 93. The mating member 93 is configured to drive the second plate 95. The mating member 93 is connected to a drive shaft 491. The first clutch portion 91 is sleeved on the drive shaft 491. The first plate 94 is connected to the first clutch portion 91 and configured to drive the first clutch portion 91 to move. A connection end 941 between the first plate 94 and the first clutch portion 91 is arc-shaped, the first clutch portion 91 is cylindrical, and a fixing slot 911 is formed around the first clutch portion 91 in an outer circumferential direction. The first plate 94 is sleeved around the fixing slot 911 so that the first clutch portion 91 can rotate circumferentially in the first plate 94, and the first plate 94 can drive through the fixing slot 911 the first clutch portion 91 to move stably along the drive shaft 491. The second plate 95 is connected to the mating member 93, and the second plate 95 is driven by the mating member 93 to rotate around the drive shaft 491. The second plate 95 is formed with a plate hole 951. The mating member 93 is formed with a protrusion 921 inserted into the plate hole 951 to drive the second plate 95 to rotate. In this example, the plate hole 951 and the protrusion 921 are polygonal so that the plate hole 951 can mate with the protrusion 921 more stably.

The clutch 900 has a locking state and an unlocking state. When the clutch 900 is in the locking state, the clutch 900 locks the height of a main housing **42*a* relative to the ground. In this case, the position of a chassis 42 relative to the walking assembly 44 is fixed, and the mower 800 enters the self-propelled mode. When the clutch 900 is in the locking state and the mower 800 is in the self-propelled mode, the second motor 451 enters a first driving state after started, and the second motor 451 drives the walking assembly 44 to walk on the ground. When the clutch 900 is in the unlocking state, the clutch 900 allows a change in the height of the main housing 42*a*. In this case, the position of the chassis 42 relative to the walking assembly 44 may change, and the mower 800 enters the height adjustment mode. When the clutch 900 is in the unlocking state and the mower 800 is in the height adjustment mode, the second motor 451 may drive the adjustment assembly 46 to adjust a relative position between the chassis 42 and the walking assembly 44 to adjust the height of the main housing 42*a*, thereby changing the mowing height of a cutter 431**.

The clutch 900 further includes a fixing member 97, an elastic element 96, pins 99 and a gasket 98. The fixing member 97 is fixedly connected to the main housing **42*a*. The fixing member 97 is formed with a hole, and at least part of the second clutch portion 92 and the mating member 93 pass through the hole of the fixing member 97 and are supported by the fixing member 97. Multiple pins 99 are provided. The second clutch portion 92 includes columns 92*a*. Multiple columns 92*a* are provided. The multiple columns 92*a* are circumferentially arranged at equal intervals on a face of the second clutch portion 92 facing the multiple pins 99. The multiple pins 99 are movably arranged between the multiple columns 92*a*. The multiple pins 99 are configured to be in contact with the mating member 93. The gasket 98 is mounted on a face of the second clutch portion 92 facing the first clutch portion 91. The elastic element 96 is disposed between the first clutch portion 91 and the second clutch portion 92. The elastic element 96 is configured to generate a biasing force that can drive the first clutch portion 91 to reset to disengage the clutch 900. When the electric motor 72 drives the first clutch portion 91 to move towards the second clutch portion 92, the elastic element 96 is compressed. When the electric motor 72 drives the first clutch portion 91 to move away from the second clutch portion 92, the elastic element 96 assists the electric motor 72 in disengaging the clutch 900. In this example, the elastic element 96** is a spring.

When the mower 800 is in the height adjustment mode, the clutch 900 is engaged, the drive shaft 491 drives the first clutch portion 91 to rotate, and the first clutch portion 91 drives the second clutch portion 92 to rotate along a first rotation direction. The multiple columns **92*a* drive the multiple pins 99 to rotate. The mating member 93 includes a contact portion 931, and an outer circumference of the contact portion is wedge-shaped. The multiple pins 99 abut against the contact portion 931 and apply a force to the contact portion 931 along the first rotation direction to drive the mating member 93 to rotate. The mating member 93 drives the second plate 95 to rotate, the adjustment assembly 46 moves, and the mowing height is adjusted. When the mower 800 is in the self-propelled mode, the clutch 900 is disengaged, and the mating member 93 rotates a certain angle along a second rotation direction under the action of gravity. The second rotation direction is opposite to the first rotation direction. The multiple pins 99 abut against the contact portion 931 and apply a force to the contact portion 931 along the second rotation direction. Since the contact portion 931 is wedge-shaped, the mating member 93 is locked so that the second plate 95 is locked, that is, the adjustment assembly 46 is locked, and the mowing height is locked by the clutch 900. The locking assembly 48 is the clutch 900 and the clutch 900 is the overrunning clutch so that the locking assembly 48 is simple and compact in structure and the mower 800 is lighter in weight. The switching of the clutch 900 between the locking state and the unlocking state is automatically implemented by relying on the gravity instead of being driven by the electric motor 72**, achieving a simple structure and saving energy.

Figure 43:
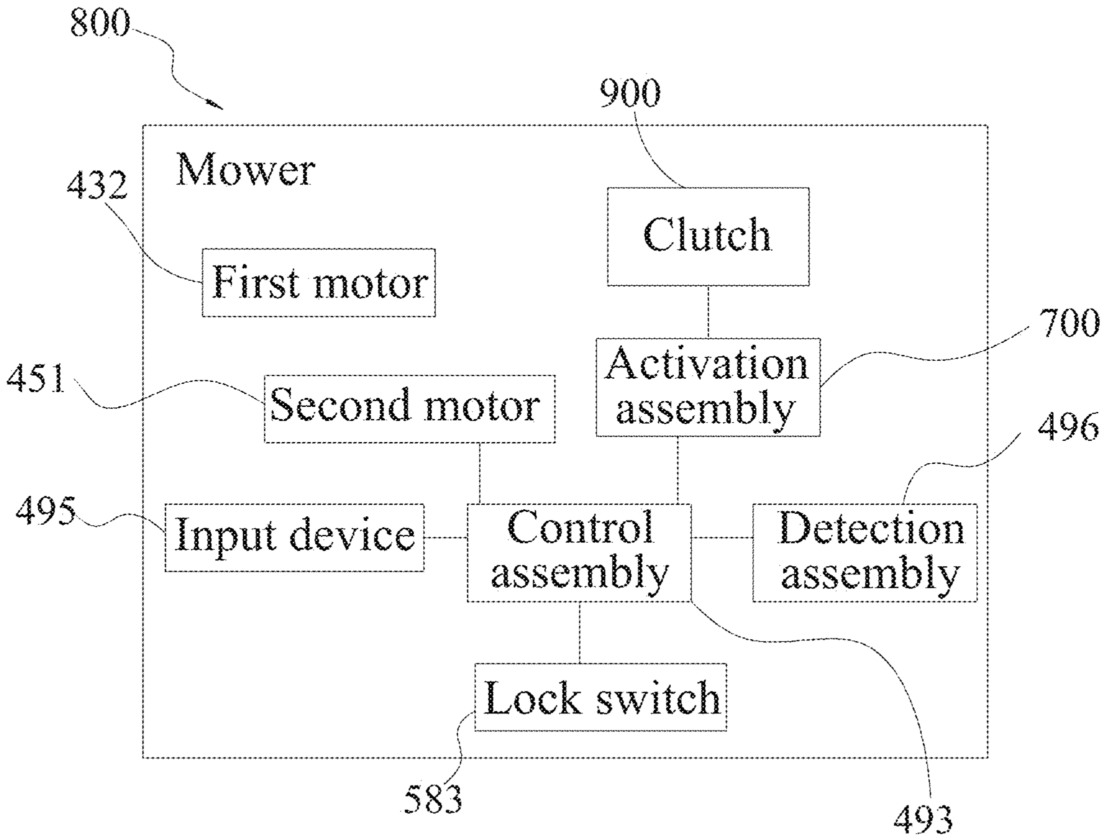
FIG. 43 is a control block diagram of the mower of FIG. 35.

As shown in FIG. 43, the mower 800 further includes a control assembly 493 electrically or signally connected to the activation assembly 700 to control the activation assembly 700 to selectively disengage or engage the clutch 900. In this manner, instead of directly and manually adjusting the activation assembly 700, the user inputs a signal to the control assembly 493, and the control assembly 493 outputs a control signal to the activation assembly 700 to drive the clutch 900 to be disengaged or engaged. The clutch 900 is disengaged and the clutch 900 (that is, the locking assembly 48) switches to the locking state. The clutch 900 is engaged and the clutch 900 (that is, the locking assembly 48) switches to the unlocking state. The mower is simple in structure, and the working efficiency of the user can be improved.

Figure 44:
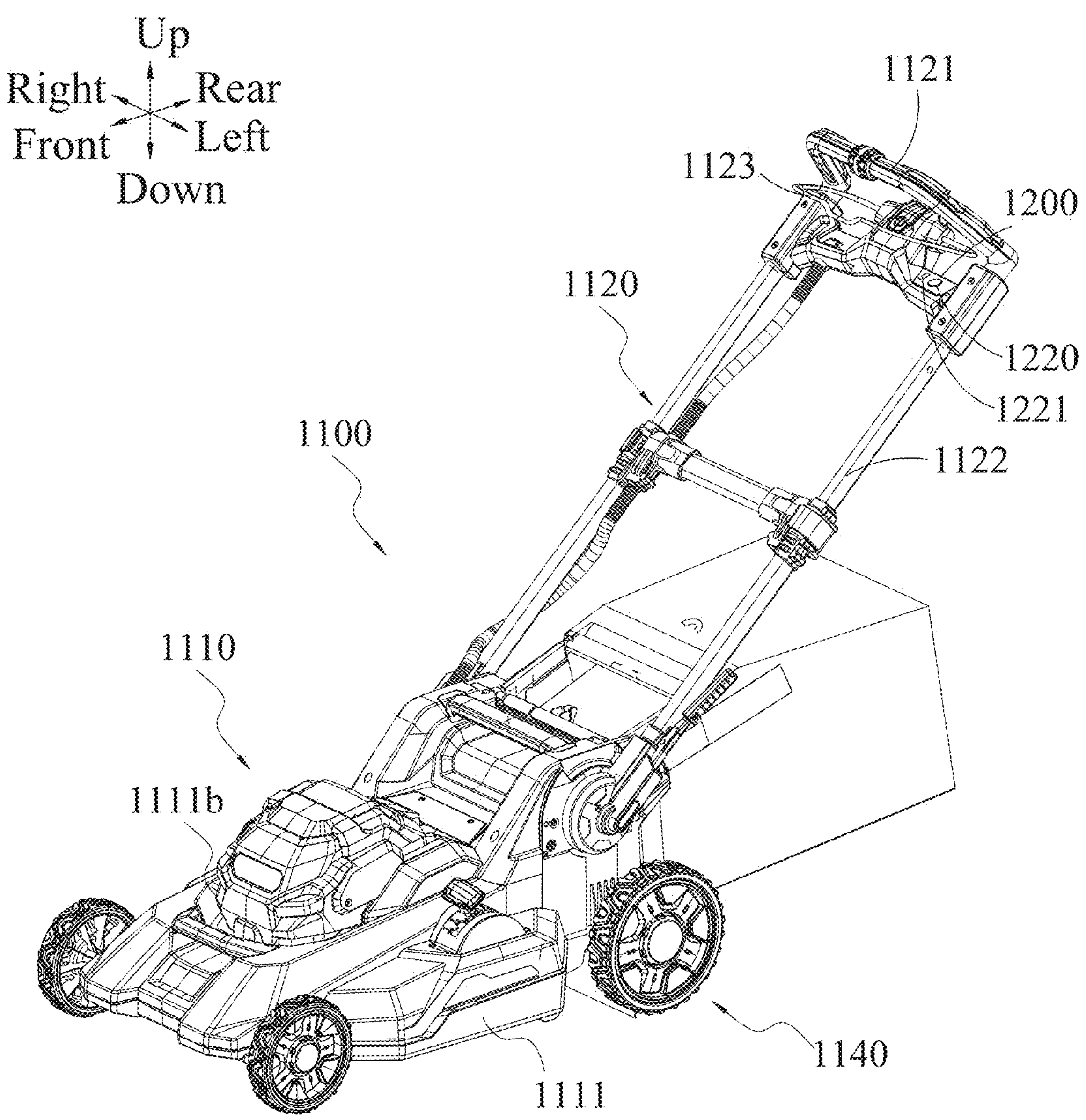
FIG. 44 is a perspective view of a walk-behind power tool according to a sixth example of the present application.

The present application further provides a mower in a sixth example. A walk-behind power tool shown in FIG. 44 is configured for a user to cut grass in a lawn, such as a lawn of a garden or a golf course. The grass in the lawn requires regular care and thus needs to be often cut with the walk-behind power tool. In this example, the walk-behind power tool is a mower 1100. In some examples, the walk-behind power tool may be a snow thrower, etc. When the user operates the mower 1100, the user stands behind the mower 1100 to push the mower 1100 to walk on the ground.

Figure 45:
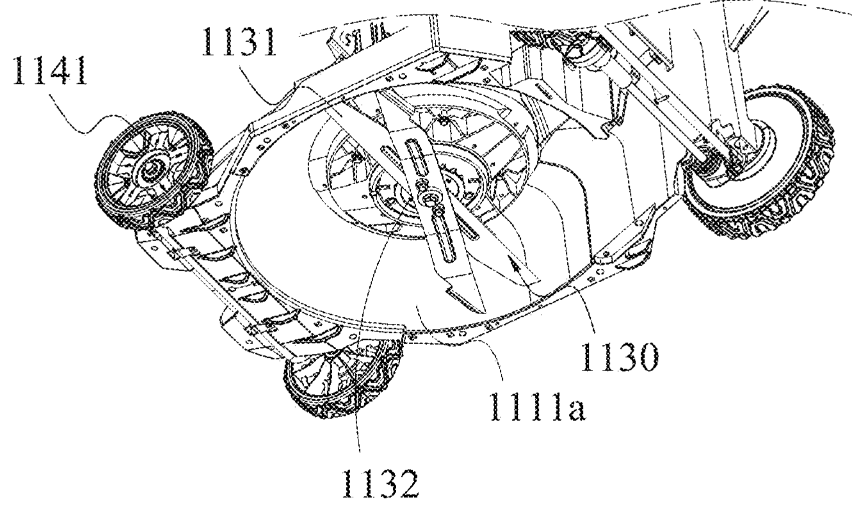
FIG. 45 is a perspective view of part of the structure of the walk-behind power tool of FIG. 44 from another angle.

As shown in FIGS. 44 and 45, the mower 1100 includes a main machine 1110, a handle device 1120, a working assembly 1130 and a walking assembly 1140. The main machine 1110 includes a chassis 1111. The chassis 1111 accommodates at least part of the working assembly 1130. The working assembly 1130 includes a working member 1131 and a first motor 1132, and the first motor 1132 drives the working member 1131 to move. The chassis 1111 is formed with an accommodation space **1111*a* for accommodating at least part of the working member 1131. The accommodation space 1111*a* is at least open downward, and the working member 1131 is disposed in the accommodation space 1111*a*. The first motor 1132 is mounted to the chassis 1111, and the working member 1131 is mounted to the first motor 1132 to be driven by the first motor 1132. The working member 1131 may be a blade. One or more blades may be provided. The first motor 1132 may be an electric motor. The electric motor drives the blade to rotate at a high speed to mow the grass. The handle device 1120 may be pivotally connected to the main machine 1110. In some examples, the handle device 1120 is fixedly connected to the main machine 1110. The handle device 1120 is configured for the user to operate. The handle device 1120 includes a grip 1121 and connecting rods 1122, the grip 1121 is configured for the user to hold to push or support the mower 1100, and the connecting rods 1122 connect the grip 1121 to the main machine 1110. The handle device 1120 further includes a trigger 1123 disposed on the grip 1121. The trigger 1123 is configured for the user to press to control the mower 1100** to mow the grass.

The walking assembly 1140 includes walking wheels 1141. In this example, the walking assembly 1140 includes two front walking wheels 1141 and two rear walking wheels 1141. The walking assembly 1140 can at least drive the mower 1100 to advance, retreat and turn on the ground. The walking assembly 1140 supports the main machine 1110 and the handle device 1120, and the main machine 1110 supports the working assembly 1130. The main machine 1110 connects the walking assembly 1140, the working assembly 1130 and the handle device 1120 into a whole. The main machine 1110 further includes a coupling portion **1111*b* for connecting an energy device. The energy device is a battery pack configured to provide a power source for the mower 1100. In other examples, the coupling portion 1111*b* may be connected to a cable, and the cable may be connected to a utility grid. In other examples, the coupling portion 1111*b* may be connected to another energy device. For example, the coupling portion 1111*b* may be connected to a fuel tank, and fuel in the fuel tank may provide energy for the mower 1100**.

During the mowing of the mower 1100, the grass in the lawn may be required to have a particular height after being cut, and thus the height of the working member 1131 relative to the ground needs to be adjusted. When the height of the working member 1131 relative to the ground is relatively low, the grass in the lawn is relatively low after being cut. Thus, the user may need to mow the lawn in a longer time. When the height of the working member 1131 relative to the ground is relatively high, the grass in the lawn is relatively high after being cut. Thus, the lawn better meets an aesthetic requirement of the user. The user may require grass in different regions of the lawn to have different heights. Thus, the user needs to frequently adjust the height of the working member 1131 relative to the ground.

Figure 46:
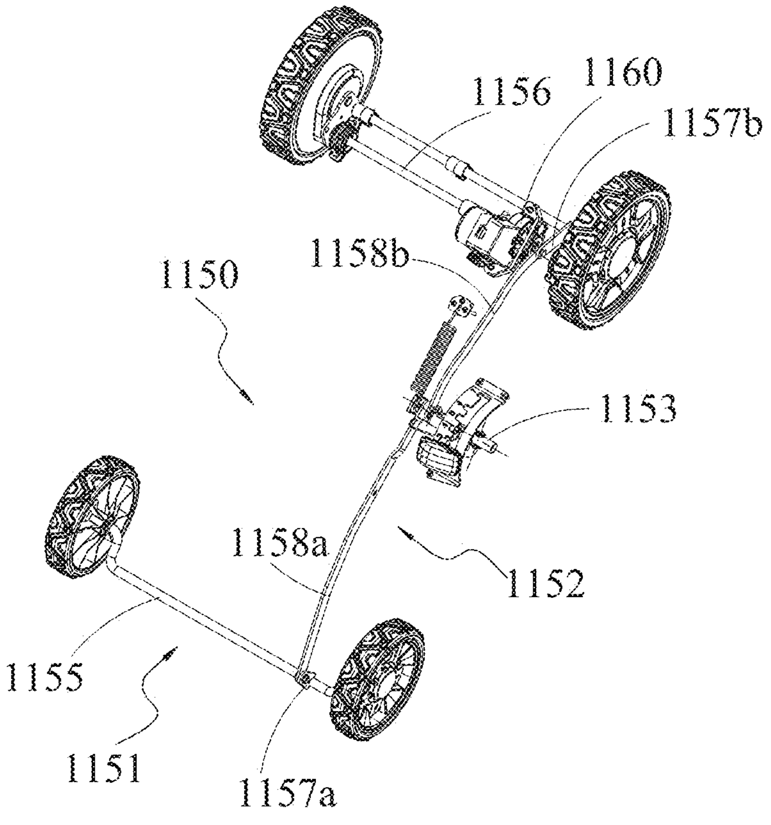
FIG. 46 is a perspective view of a walking assembly, a second motor, an adjustment device, an operating device and a locking assembly in the walk-behind power tool of FIG. 44.

As shown in FIG. 46, the mower 1100 further includes an adjustment device 1150, where the adjustment device 1150 connects the chassis 1111 to the walking assembly 1140. The adjustment device 1150 can adjust a relative position between the chassis 1111 and the ground to adjust the mowing height. The working assembly 1130 is mounted on the chassis 1111, and the height of the walking assembly 1140 relative to the ground is substantially unchanged. Therefore, when the adjustment device 1150 changes a relative position between the chassis 1111 and the walking assembly 1140, the position of the working assembly 1130 mounted on the chassis 1111 relative to the walking assembly 1140 also changes, and the height of the working assembly 1130 relative to the ground changes. In this manner, the adjustment device 1150 can adjust the height of the working member 1131 relative to the ground. It is to be noted that the relative position reflects a position change of the chassis 1111 relative to the walking assembly 1140 in a vertical direction. In this manner, the height of the walking assembly 1140 relative to the ground is fixed, but the height of the chassis 1111 relative to the ground changes. Alternatively, the relative position includes at least a position change of the chassis 1111 relative to the walking assembly 1140 in the vertical direction and may also include a position change of the chassis 1111 relative to the walking assembly 1140 in another direction. Alternatively, the relative position reflects a relative rotation between the chassis 1111 and the walking assembly 1140, and the relative rotation causes a position change of the chassis 1111 relative to the walking assembly 1140 in the vertical direction.

The mower 1100 has a manual height adjustment mode and an electric height adjustment mode for adjusting the height of the chassis 1111 relative to the ground. In the manual height adjustment mode, the adjustment device 1150 may be driven by manpower. In the electric height adjustment mode, the adjustment device 1150 may be driven by electric power. The adjustment device 1150 is configured to be selectively driven by manpower or electric power. The user may select one from the two height adjustment modes so that the user can adjust the height manually and electrically. The mower 1100 further includes a second motor 1160. The second motor 1160 drives the adjustment device 1150 in the electric height adjustment mode to adjust the height of the chassis 1111 relative to the ground. When the user selects the manual height adjustment mode, the user drives the adjustment device 1150 by a hand or another part of the body to adjust the height of the chassis 1111 relative to the ground. This adjustment mode is reliable and saves electric power. When the user selects the electric height adjustment mode, the user drives the adjustment device 1150 by the second motor 1160 to adjust the height of the chassis 1111 relative to the ground. The second motor 1160 drives the adjustment device 1150 to move to adjust the mowing height. This adjustment mode is easy, effortless, convenient and fast. The user may select one from the two height adjustment modes freely and has high autonomous selectivity. When the same mower 1100 is used by users with different height adjustment requirements, the two height adjustment modes can separately satisfy different users. In some cases, when any one height adjustment mode fails, the other height adjustment mode may still be used by the user to adjust the mowing height with high reliability.

The adjustment device 1150 includes a connecting rod assembly 1151 and a support assembly 1152. In the manual height adjustment mode, the user drives the connecting rod assembly 1151 or the support assembly 1152 by manpower, and the connecting rod assembly 1151 or the support assembly 1152 adjusts the relative position between the chassis 1111 and the ground so that the height of the working assembly 1130 mounted on the chassis 1111 relative to the ground changes. In this example, the manpower refers to a force applied by the user to the mower 1100 by hand. In the electric height adjustment mode, the second motor 1160 outputs power to adjust the height of the working assembly 1130. The second motor 1160 drives the connecting rod assembly 1151 or the support assembly 1152, and the connecting rod assembly 1151 or the support assembly 1152 adjusts the relative position between the chassis 1111 and the ground so that the height of the working assembly 1130 mounted on the chassis 1111 relative to the ground changes.

The mower 1100 has a self-propelled mode. When the mower 1100 is in the self-propelled mode, the second motor 1160 drives the walking wheels 1141 to rotate to drive the mower 1100 to walk on the ground. In this manner, when the user needs to mow the grass, the user just needs to stand on the rear side of the mower 1100 and follow the mower 1100 to walk. The mower 1100 is driven by the second motor 1160 to advance automatically, and the user does not need to manually push the mower 1100 to walk on the ground. In this example, the second motor 1160 is configured to drive the rear walking wheels 1141 to rotate so that the mower 1100 walks on the ground. In some examples, the second motor 1160 may be configured to drive the front walking wheels 1141 to rotate. In some examples, the mower 1100 includes two second motors 1160, and the two second motors 1160 drive the front walking wheels 1141 and the rear walking wheels 1141 separately. In some examples, the self-propelled mode and the electric height adjustment mode are two independent modes. When the mower 1100 is in the self-propelled mode, the user may also perform electric height adjustment. In some examples, the self-propelled mode and the electric height adjustment mode are two interlocked modes. When the mower 1100 is in the self-propelled mode, the user cannot perform electric height adjustment, and vice versa.

Figures 47, 48:
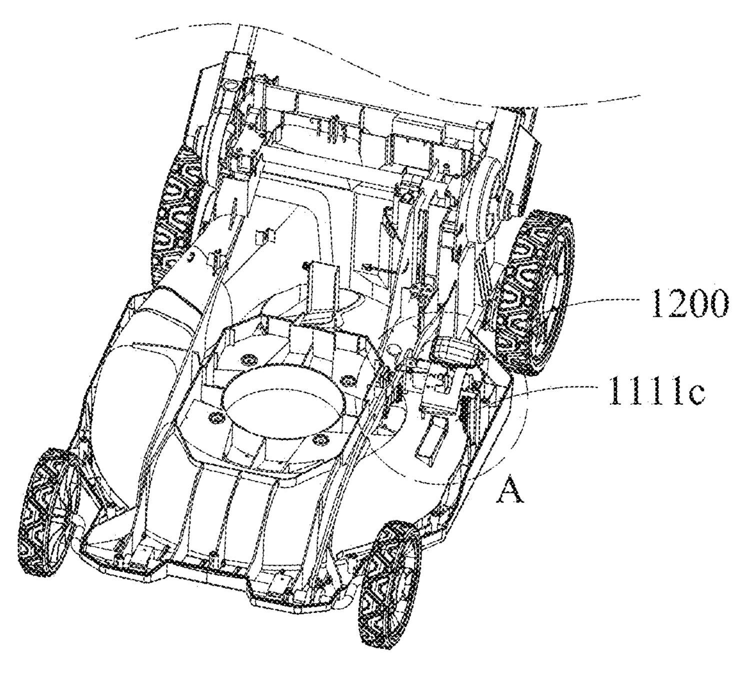
FIG. 47 is a perspective view of a chassis, an operating device and a locking assembly in the walk-behind power tool of FIG. 44.
FIG. 48 is an enlarged view of part A of FIG. 47.
Figure 49:
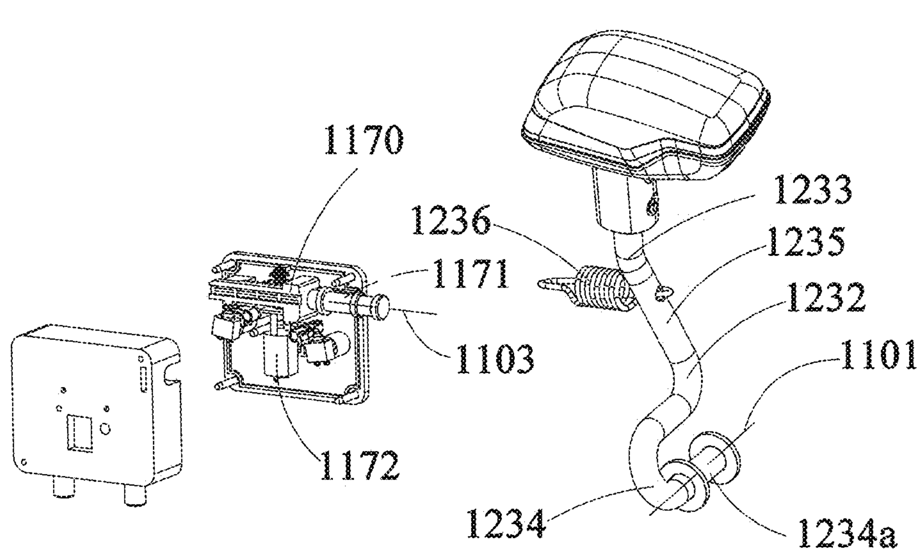
FIG. 49 is an exploded view of an operating device, a locking assembly, an activation assembly and a detection assembly in the walk-behind power tool of FIG. 44.
Figure 49:
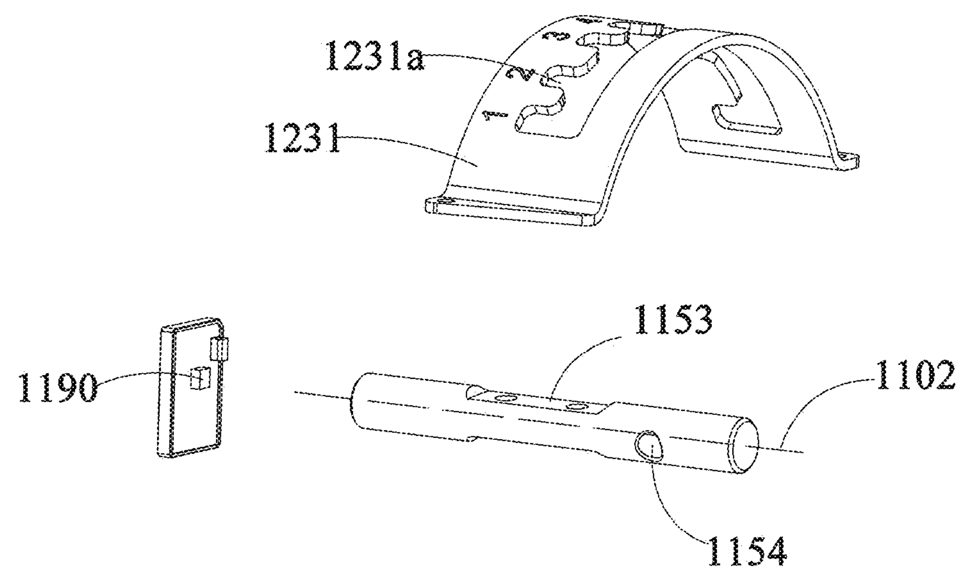
Figure 50:
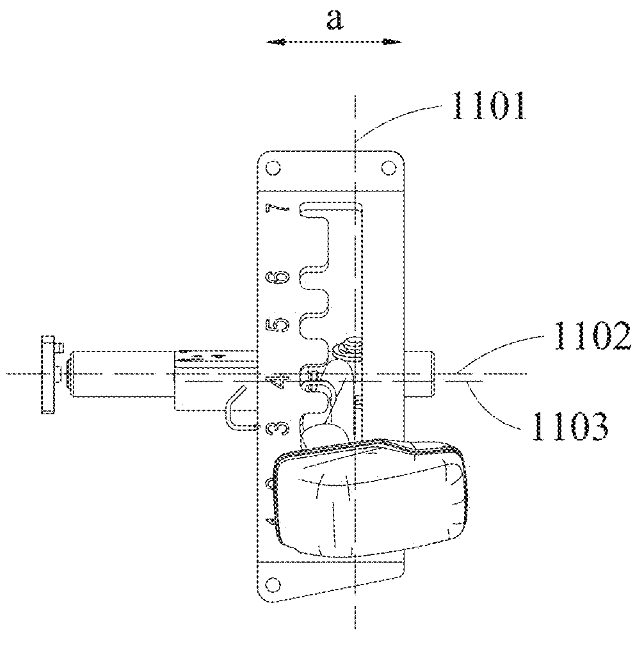
FIG. 50 is a top view of a locking assembly in the walk-behind power tool of FIG. 44, where the locking assembly is in a locking state.
Figure 51:
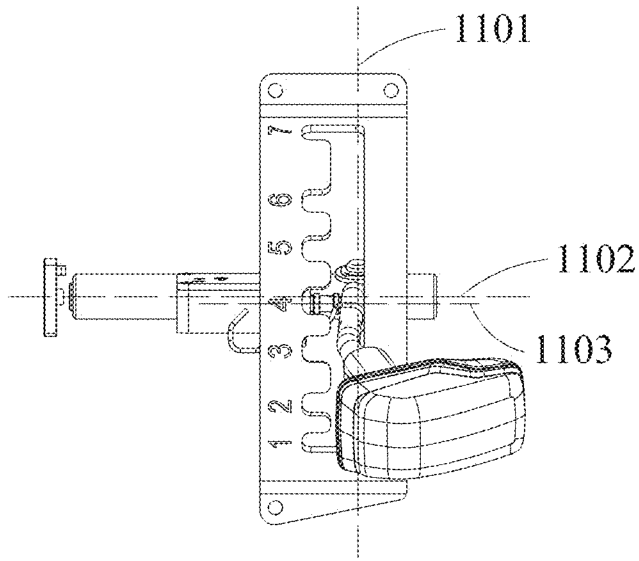
FIG. 51 is a top view of the locking assembly of FIG. 50 in an unlocking state.
Figure 52:
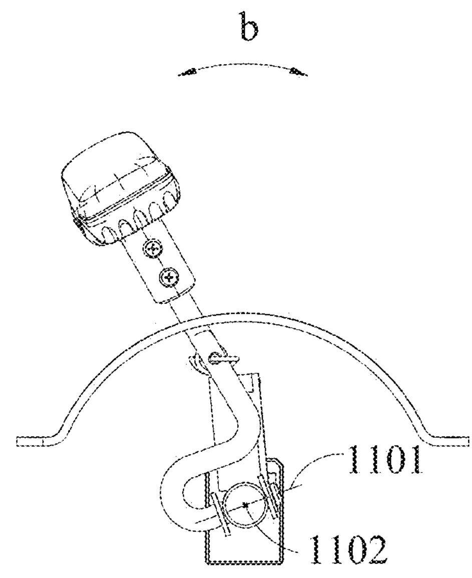
FIG. 52 is a side view of a locking assembly in the walk-behind power tool of FIG. 44, where the locking assembly is in a locking state.
Figure 53:
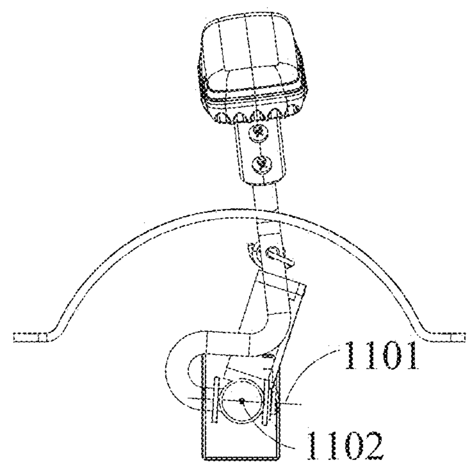
FIG. 53 is a side view of the locking assembly of FIG. 52 in an unlocking state.

As shown in FIGS. 47 to 49, the mower 1100 includes an operating device 1200, where the operating device 1200 includes a first operating member 1210 and a second operating member 1220. The first operating member 1210 is operated by the user so that the mower 1100 is in the manual height adjustment mode. The user needs to operate the first operating member 1210 to manually adjust the height of the chassis 1111 relative to the ground. The first operating member 1210 is used for the user to mechanically adjust the height of the chassis 1111 relative to the ground. The second operating member 1220 is used for the user to electrically adjust the height of the chassis 1111 relative to the ground. The first operating member 1210 is disposed on the chassis 1111 and is drivingly connected to the adjustment device 1150. The first operating member 1210 includes an operating portion 1211 for the user to operate. The operating portion 1211 may be a handle suitable for a palm size of the user.

The second operating member 1220 is disposed on the handle device 1120. In this example, the second operating member 1220 is disposed on the grip 1121. The second operating member 1220 may be a button that can be pressed, touched, rotated or slid by the user. The second operating member 1220 is located above the first operating member 1210. In this manner, when the user operates the second operating member 1220 in the electric height adjustment mode, the user does not need to bend down or bends down to a very small extent, which is convenient and fast to use. In some examples, the second operating member 1220 may be disposed at another position for the use to touch conveniently. The distance between the second operating member 1220 and the grip 1121 may be configured to be relatively small so that the user can operate the second operating member 1220 with the hand not leaving the handle device 1120. In some examples, the second operating member 1220 may be disposed on the main machine 1110. In some examples, the second operating member 1220 is used by the user to input a height gear corresponding to the mowing height. Different height gears are set for the mower 1100 to electrically adjust the mowing height. It is to be understood that the height gear is not limited to a number and may be any information that can reflect a change in a preset height. For example, the height gear may be a code or an image corresponding to a different preset height.

The mower 1100 includes a locking assembly 1230 configured to lock the height of the chassis 1111 relative to the ground. The locking assembly 1230 has a locking state and an unlocking state. The locking assembly 1230 in the locking state locks the height of the chassis 1111 relative to the ground, and the position of the chassis 1111 relative to the walking assembly 1140 is fixed. The locking assembly 1230 in the unlocking state allows a height change of the chassis 1111 relative to the ground, and the position of the chassis 1111 relative to the walking assembly 1140 may change. The locking assembly 1230 includes a gear member 1231 and a locking member 1232. The gear member 1231 is disposed on the main machine 1110. In this example, the gear member 1231 is fixedly mounted on the chassis 1111 by a screw. The gear member 1231 includes multiple gear slots 1231*a*. The locking member 1232 is a rod that can be moved to a gear slot 1231*a*. When the rod is moved to a different gear slot 1231*a*, the chassis 1111 has a different height relative to the ground so that the working member 1131 is at a different height to cut the grass to a different height. The locking member 1232 includes a first end 1233, a second end 1234 and an intermediate portion 1235. The locking member 1232 extends basically along an up and down direction, the first end 1233 is disposed on a side facing the user, and the second end 1234 is disposed on a side facing the chassis 1111. The intermediate portion 1235 is configured to fall into the gear slot 1231*a* and abut against the gear slot 1231*a*. The locking member 1232 is configured to pivot around a first axis 1101 and a second axis 1102. The first operating member 1210 is sleeved on the first end 1233 of the locking member 1232.

As shown in FIGS. 49 to 53, in the manual height adjustment mode, when the user holds the first operating member 1210 and operates the first operating member 1210 along a direction a, the locking member 1232 pivots around the first axis 1101 along with the first operating member 1210. The intermediate portion 1235 is disengaged from the gear slot 1231*a*, and the locking assembly 1230 enters the unlocking state. In the unlocking state, the user operates the first operating member 1210 along a direction b, and the locking member 1232 pivots around the second axis 1102 along with the first operating member 1210 so that the user performs manual height adjustment.

The adjustment device 1150 includes a drive rod 1153, and the drive rod 1153 may be pivotally mounted on the chassis 1111 around the second axis 1102. The chassis 1111 includes a mounting portion 1111*c* formed with a rib for accommodating the drive rod 1153. The drive rod 1153 includes a hole 1154, and the second end 1234 of the locking member 1232 penetrates through the hole 1154. The second end 1234 includes a clamping portion 1234*a*, and the clamping portion 1234*a* is drivingly connected to the hole 1154.

When the user operates the first operating member 1210 along the direction a around the first axis 1101, the locking member 1232 rotates around the first axis 1101, the second end 1234 pivots in the hole 1154, the position of the drive rod 1153 remains unchanged, and the locking assembly 1230 switches the state. When the user operates the first operating member 1210 along the direction b around the second axis 1102, the locking member 1232 rotates around the second axis 1102, and the locking member 1232 drives the drive rod 1153 to rotate around the second axis 1102. An end of the drive rod 1153 facing away from the hole 1154 is drivingly connected to the support assembly 1152. The connecting rod assembly 1151 includes a front connecting rod 1155 and a rear connecting rod 1156. The support assembly 1152 includes a first support member 1157*a*, a first support rod 1158*a*, a second support rod 1158*b* and a second support member 1157*b* that are connected in sequence. The first support member 1157*a* is mounted on the front connecting rod 1155 and the second support member 1157*b* is mounted on the rear connecting rod 1156. When the user manually drives the drive rod 1153 to rotate around the second axis 1102, one or more parts of the first support rod 1158*a*, the second support rod 1158*b*, the first support member 1157*a*, the second support member 1157*b*, the front connecting rod 1155 and the rear connecting rod 1156 move relative to the ground so that the height of the chassis 1111 relative to the ground changes. Which part or which parts move along with the drive rod 1153 is not limited here as long as the height of the chassis 1111 relative to the ground can be changed. When the user operates the first operating member 1210 along the direction b around the second axis 1102, the position of the first axis 1101 changes, but the user may still operate the first operating member 1210 along the direction a around the first axis 1101.

The locking assembly 1230 includes a reset member 1236. The intermediate portion 1235 of the locking member 1232 is connected to the reset member 1236. The reset member 1236 is specifically a tension spring. An end of the tension spring is fixedly connected to the intermediate portion 1235, and the other end of the tension spring is fixedly connected to the first support rod 1158*a*. In some examples, the other end of the tension spring is fixedly connected to the second support rod 1158*b*. In some examples, the other end of the tension spring is fixedly connected to the chassis 1111. During height adjustment of the user, the user drives the locking member 1232 to overcome a biasing force of the reset member 1236, and the locking assembly 1230 switches to the unlocking state. After the height adjustment of the user, the tension spring helps the user through the biasing force to make the locking member 1232 fall into a desired gear slot 1231*a* of the user. After the locking assembly 1230 switches back to the locking state, manual height adjustment is completed. In this manner, the height adjustment process is safer and more effortless.

Figure 54:
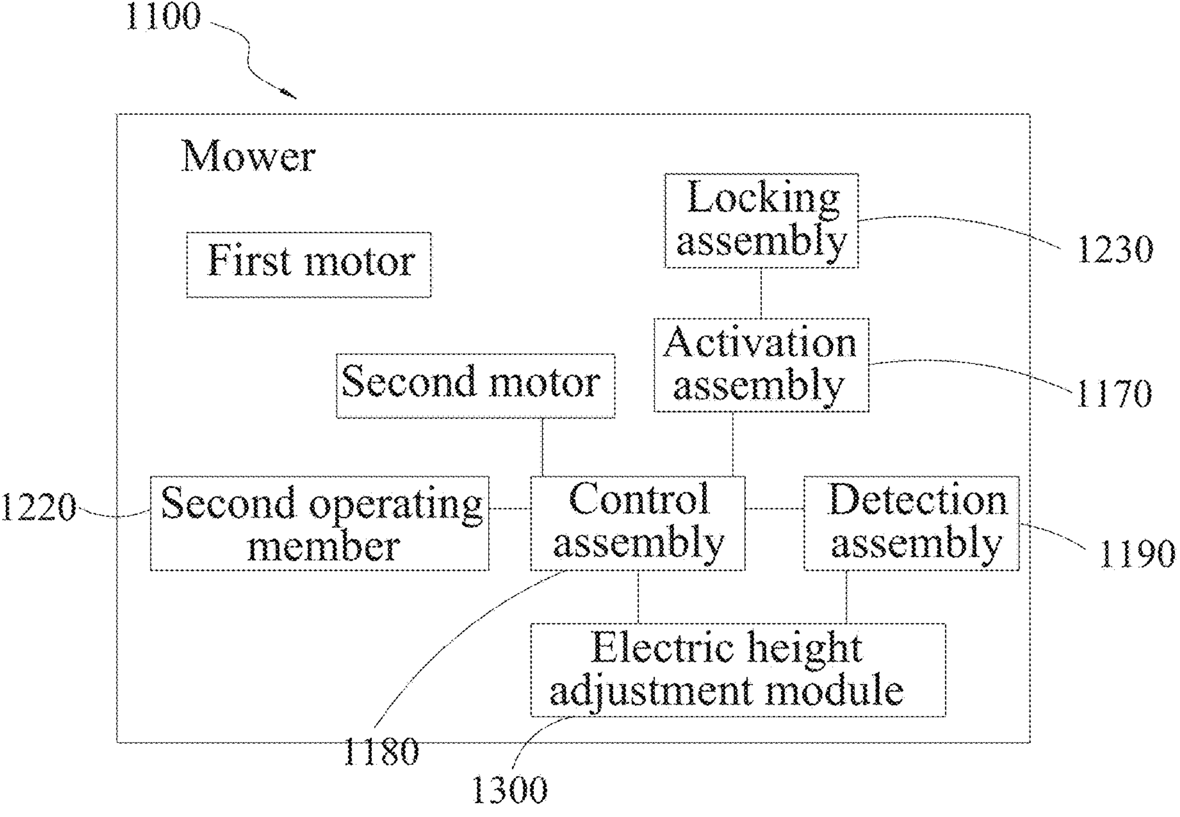
FIG. 54 is a control block diagram of the walk-behind power tool of FIG. 44.

As shown in FIGS. 46, 49 and 54, the mower 1100 includes an activation assembly 1170 and a control assembly 1180. In the electric height adjustment mode, the activation assembly 1170 electrically switches the locking assembly 1230 to the unlocking state. The control assembly 1180 is electrically or signally connected to the activation assembly 1170 to control the activation assembly 1170 to switch the locking assembly to the unlocking state. The activation assembly 1170 includes an activation member 1171 and a third motor 1172, and the third motor 1172 drives, through a transmission mechanism such as a rack or a gear, the activation member 1171 to move. The third motor 1172 is specifically a small electric motor. The control assembly 1180 is electrically or signally connected to the second operating member 1220. In this manner, when the user operates the second operating member 1220, the third motor 1172 drives the activation member 1171, and the activation member 1171 drives the locking assembly 1230 to switch to the unlocking state. The activation member 1171 is specifically a push rod, an end of the push rod is driven by the electric motor, and the other end of the push rod abuts against the intermediate portion 1235. When the electric motor drives the push rod to move, the push rod moves along a third axis 1103 and drives the locking member 1232 to pivot along the direction a around the first axis 1101, and the locking assembly 1230 switches to the unlocking state. The mower 1100 exits the self-propelled mode, and the second motor 1160 drives the adjustment device 1150 to move to adjust the mowing height. When the second motor 1160 electrically drives the adjustment device 1150 to move, one or more parts of the first support rod 1158*a*, the second support rod 1158*b*, the first support member 1157*a*, the second support member 1157*b*, the front connecting rod 1155 and the rear connecting rod 1156 move relative to the ground so that the height of the chassis 1111 relative to the ground changes. Which part or which parts are driven by the second motor 1160 is not limited here as long as the height of the chassis 1111 relative to the ground can be changed. When the adjustment device 1150 moves, the drive rod 1153 rotates around the second axis 1102 and drives the locking member 1232 and the first operating member 1210 to rotate along the direction b around the second axis 1102. In some examples, the push rod may move along the direction b with the locking member 1232. In some examples, the activation assembly 1170 may move along the direction b with the locking member 1232.

The mower 1100 further includes a detection assembly 1190. The detection assembly 1190 detects at least one parameter that reflects a change in the position of the chassis 1111 relative to the ground. The detection assembly 1190 includes a sensor configured to detect the parameter. The sensor is a Hall sensor, potentiometer or photocoupler. The detection assembly 1190 may detect the height of the working member 1131 directly. In some examples, the detection assembly 1190 may detect the height of the working member 1131 indirectly. In this example, the sensor is a Hall sensor. The detection assembly 1190 includes a mounting plate fixed to the chassis 1111, and the Hall sensor is fixed to the mounting plate. The drive rod 1153 is cylindrical. The Hall sensor corresponds to an end of the drive rod 1153 facing away from the locking member 1232 to detect an angle of rotation of the drive rod 1153 around the second axis 1102. In this manner, the height of the working member 1131 can be adjusted more accurately. The detection assembly 1190 may detect the height of the chassis 1111 relative to the ground. Alternatively, the detection assembly 1190 may detect the position of the support assembly 1152 relative to the walking assembly 1140 to detect the height of the working member 1131. In fact, the detection assembly 1190 may detect a position of any part that can reflect a change in the height of the working member 1131 to detect the height of the working member 1131 indirectly.

When the detection assembly 1190 detects that the height of the working member 1131 reaches a set height, that is, when the desired mowing height of the user is reached, the control assembly 1180 controls the push rod to move away from the locking member 1232 along the third axis 1103. The reset member 1236 assists the push rod through the biasing force in making the locking member 1232 fall into the desired gear slot 1231*a* of the user. After the locking assembly 1230 switches back to the locking state, electric height adjustment is completed. The height of the chassis 1111 relative to the ground is locked. The working member 1131 is stably maintained at the set height. In this manner, the height adjustment process is more convenient, faster and more effortless.

As shown in FIG. 54, the mower 1100 includes an electric height adjustment module 1300. In the manual height adjustment mode, the parameter detected by the detection assembly 1190 is fed back to the electric height adjustment module 1300. In this manner, the parameter in the manual height adjustment mode may be synchronized in real time to the electric height adjustment mode. After the user mechanically adjusts the mowing height, the mowing height in the manual height adjustment mode may be synchronized to the electric height adjustment module 1300, thereby facilitating the consistency with the mowing height in the electric height adjustment mode during the subsequent use of the user.

In this example, the manual height adjustment mode and the electric height adjustment mode are independent of each other and have no interlock logic. The user can select a height adjustment mode autonomously without other operations. In some examples, an interlock logic and a mode locking member 221 are set so that the manual height adjustment mode and the electric height adjustment mode may be interlocked. In some examples, the mower includes a mode selector 1221. The mode selector 1221 is used by the user to switch between the manual height adjustment mode and the electric height adjustment mode. The mode selector 1221 is configured to be operated to forbid the operation in one of the manual height adjustment mode and the electric height adjustment mode that is not selected by the user. When the user selects any one of the manual height adjustment mode and the electric height adjustment mode, no operation or no height adjustment may be performed in the other mode. After the user switches the mower 1100 to the manual height adjustment mode through the mode selector 1221, the control assembly 1180 sends a signal to the second motor 1160 to prevent the second motor 1160 from driving the adjustment device 1150. The mode selector 1221 may be a button, switch or trigger for the user to press, touch, rotate or slide. The mode selector 1221 may be disposed on the grip 1121 to be convenient for the user to operate. The mode selector 1221 may be disposed on the main machine 1110. In some examples, the electric height adjustment mode may serve as an auxiliary of the manual height adjustment mode to help the user to perform height adjustment. For example, after the user manually switches the locking assembly 1230 to the unlocking state, the second motor 1160 drives the adjustment device 1150 to perform height adjustment, saving the labor of the user.

Figure 55:
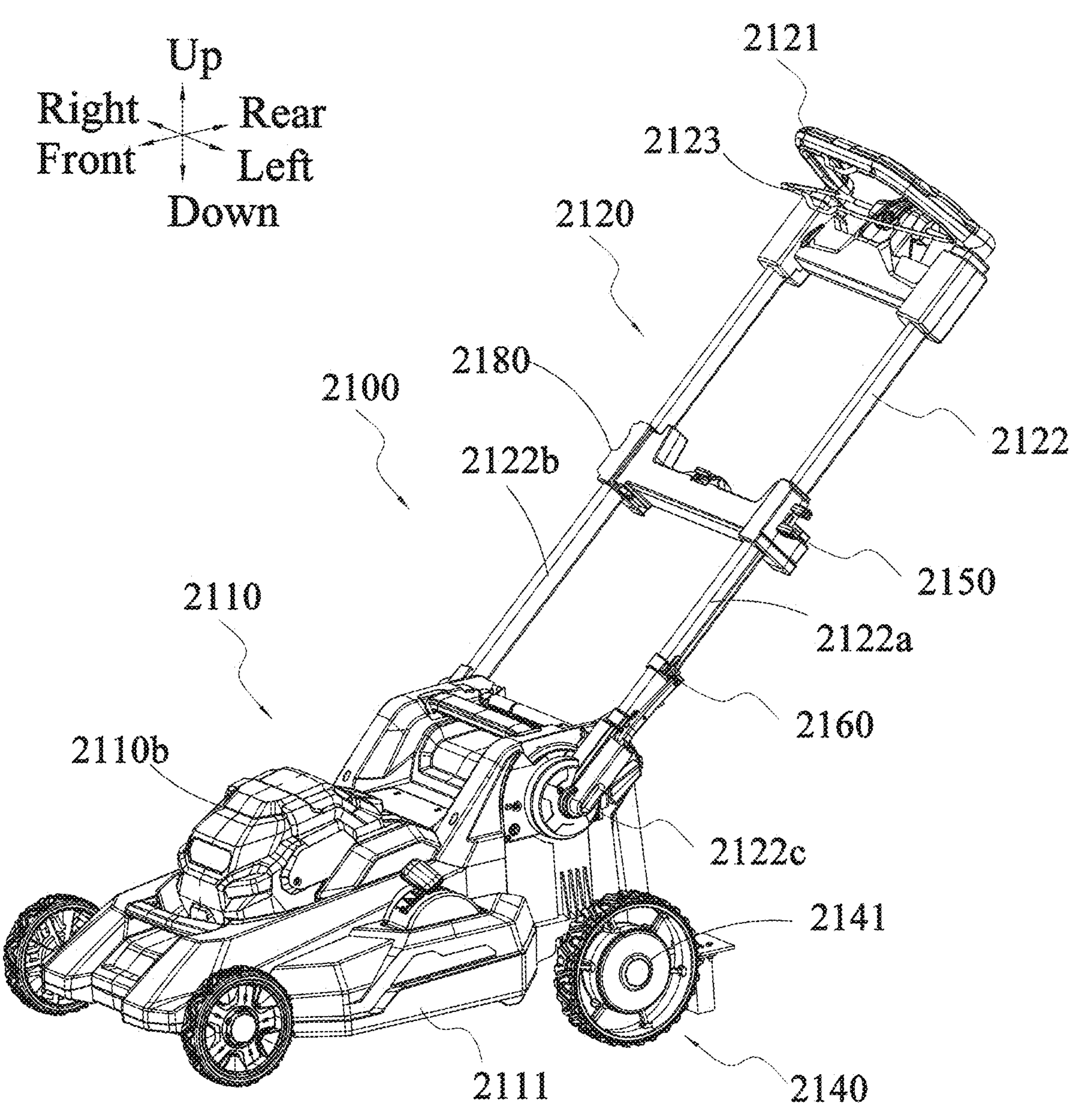
FIG. 55 is a perspective view of a walk-behind power tool according to a seventh example of the present application.

The present application further provides a mower in a seventh example. A walk-behind power tool shown in FIG. 55 is configured for a user to cut grass in a lawn, such as a lawn of a garden or a golf course. The grass in the lawn requires regular care and thus needs to be often cut with the walk-behind power tool. In this example, the walk-behind power tool is a mower 2100. In some examples, the walk-behind power tool may be a snow thrower, etc. When the user operates the mower 2100, the user stands behind the mower 2100 to push the mower 2100 to walk on the ground.

Figures 56, 57:
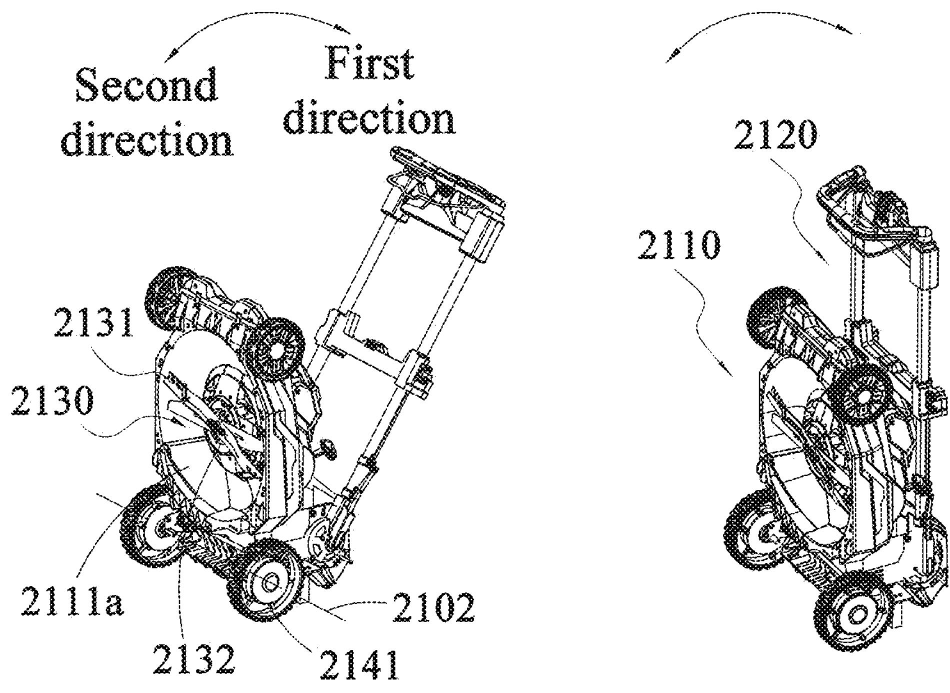
FIG. 56 is a perspective view of the walk-behind power tool of FIG. 55 in a moving state.
FIG. 57 is a perspective view of the walk-behind power tool of FIG. 55 at a folded position.

As shown in FIGS. 55 to 57, the mower 2100 includes a body 2110, a handle device 2120, a working assembly 2130 and a walking assembly 2140. The body 2110 accommodates at least part of the working assembly 2130. The working assembly 2130 includes a working member 2131 and a first motor 2132, and the first motor 2132 drives the working member 2131 to move. The body 2110 includes a chassis 2111. The chassis 2111 is formed with an accommodation space 2111*a* for accommodating at least part of the working member 2131. The accommodation space 2111*a* is open downward, and the working member 2131 is disposed in the accommodation space 2111*a*. The first motor 2132 is mounted to the chassis 2111, and the working member 2131 is mounted to the first motor 2132 to be driven by the first motor 2132. The working member 2131 may be a blade. One or more blades may be provided. The first motor 2132 may be an electric motor. The electric motor drives the blade to rotate at a high speed to mow the grass.

The walking assembly 2140 includes two front walking wheels and two rear walking wheels 2141. The walking assembly 2140 can at least drive the mower 2100 to advance, retreat and turn on the ground. The walking assembly 2140 supports the body 2110 and the handle device 2120, and the body 2110 supports the working assembly 2130. The body 2110 connects the walking assembly 2140, the working assembly 2130 and the handle device 2120 into a whole. The body 2110 further includes a coupling portion 2110*b* for connecting an energy device. The energy device is a battery pack configured to provide a power source for the mower 2100. In other examples, the coupling portion 2110*b* may be connected to a cable, and the cable may be connected to a utility grid. In other examples, the coupling portion 2110*b* may be connected to another energy device.

For example, the coupling portion 2110*b* may be connected to a fuel tank, and fuel in the fuel tank may provide energy for the mower 2100.

The handle device 2120 is connected to the body 2110. The mower 2100 has a moving state in which the body 2110 and at least part of the handle device 2120 move relatively. In a process of the body 2110 and at least part of the handle device 2120 moving relatively, the mower 2100 is in the moving state. In this example, the handle device 2120 may be pivotally connected to the body 2110. In the moving state, the handle device 2120 rotates relative to the body 2110. In some examples, the handle device 2120 is fixedly connected to the body 2110. The handle device 2120 is configured for the user to operate. The handle device 2120 includes a holding end 2121 and connecting rods 2122, the holding end 2121 is configured for the user to hold to push or support the mower 2100, and the connecting rods 2122 connect the holding end 2121 to the body 2110. The connecting rods 2122 include connection end 2122*c*, and the connection ends 2122*c* are mounted on the body 2110. The handle device 2120 further includes a trigger 2123 disposed on the holding end 2121. The trigger 2123 is configured for the user to press to control the mower 2100 to mow the grass.

When the user uses the mower 2100 for mowing and stores the mower 2100, the position of the handle device 2120 needs to be adjusted, that is, a relative position between the handle device 2120 and the body 2110 needs to be adjusted. The relative position between the handle device 2120 and the body 2110 includes a storage position and an unfolded position. The storage position is a position for the user to store the mower 2100 in a box, place the mower 2100 vertically at a corner of a wall, or park the mower 2100 on the ground. The unfolded position is a position for the user to easily push the mower 2100 through the handle device 2120. Multiple unfolded positions may exist. In a process of changing the relative position between the handle device 2120 and the body 2110 from the storage position to the unfolded position or in a process of changing the relative position between the handle device 2120 and the body 2110 from the unfolded position to the storage position, the mower 2100 is in the moving state.

The mower 2100 further includes an operating device 2150 for the user to operate to switch the mower 2100 to the moving state. When the user operates the operating device 2150, the relative position between the body 2110 and at least part of the handle device 2120 changes, and the mower 2100 is in the moving state. In this manner, after the user operates the operating device 2150, the relative position between the body 2110 and at least part of the handle device 2120 automatically changes. The user does not need to manually unfold or fold the handle device 2120 and can automatically unfold or fold the body 2110 and at least part of the handle device 2120 by operating the operating device 2150, thereby achieving operation convenience and improving the working efficiency. When the user rotates the handle device 2120 relative to the body 2110 through the operating device 2150, the rotation may have a first direction and a second direction. When the handle device 2120 rotates along the first direction relative to the body 2110, the body 2110 and the holding end 2121 move away from each other. When the handle device 2120 rotates along the second direction relative to the body 2110, the body 2110 and the holding end 2121 move towards each other. In some examples, multiple operating devices 2150 may be provided. The multiple operating devices 2150 control the handle device 2120 or the body 2110 to move in different directions. In some examples, the user may lengthen or shorten the handle device 2120 through the operating device 2150. A manner of motion of at least part of the handle device 2120 relative to the body 2110 is not limited here as long as the body 2110 and at least part of the handle device 2120 move relatively.

The mower 2100 has a locked state in which the body 2110 and at least part of the handle device 2120 are fixed relatively. The operating device 2150 is used for the user to operate to switch the mower 2100 from the locked state to the moving state. In this manner, after the user operates the operating device 2150, the body 2110 and at least part of the handle device 2120 are out of the locked state, and then the relative position between the body 2110 and at least part of the handle device 2120 automatically changes. High safety is achieved, and the user operates more conveniently.

The mower 2100 includes a locking assembly 2160 configured to lock the relative position between the body 2110 and at least part of the handle device 2120. The locking assembly 2160 makes the mower 2100 out of the locked state in response to an operation of the operating device 2150 by the user. The mower 2100 includes a drive assembly 2170, and the drive assembly 2170 drives the body 2110 and at least part of the handle device 2120 to move relatively. After the user operates the operating device 2150, the locking assembly 2160 unlocks the body 2110 from at least part of the handle device 2120 in response to the operation of the operating device 2150 by the user so that the body 2110 and at least part of the handle device 2120 are out of the locked state. Then, the drive assembly 2170 drives a change in the relative position between the body 2110 and at least part of the handle device 2120. It is to be noted that although the step of unlocking the body 2110 from at least part of the handle device 2120 and the step of the drive assembly 2170 driving a change in the relative position between the body 2110 and at least part of the handle device 2120 may have a sequence, for the user, the body 2110 and the handle device 2120 can automatically change positions almost at the instant of unlocking as long as the operating device 2150 is operated, and a manual operation of the user is not required, which is convenient and fast.

Figure 58:
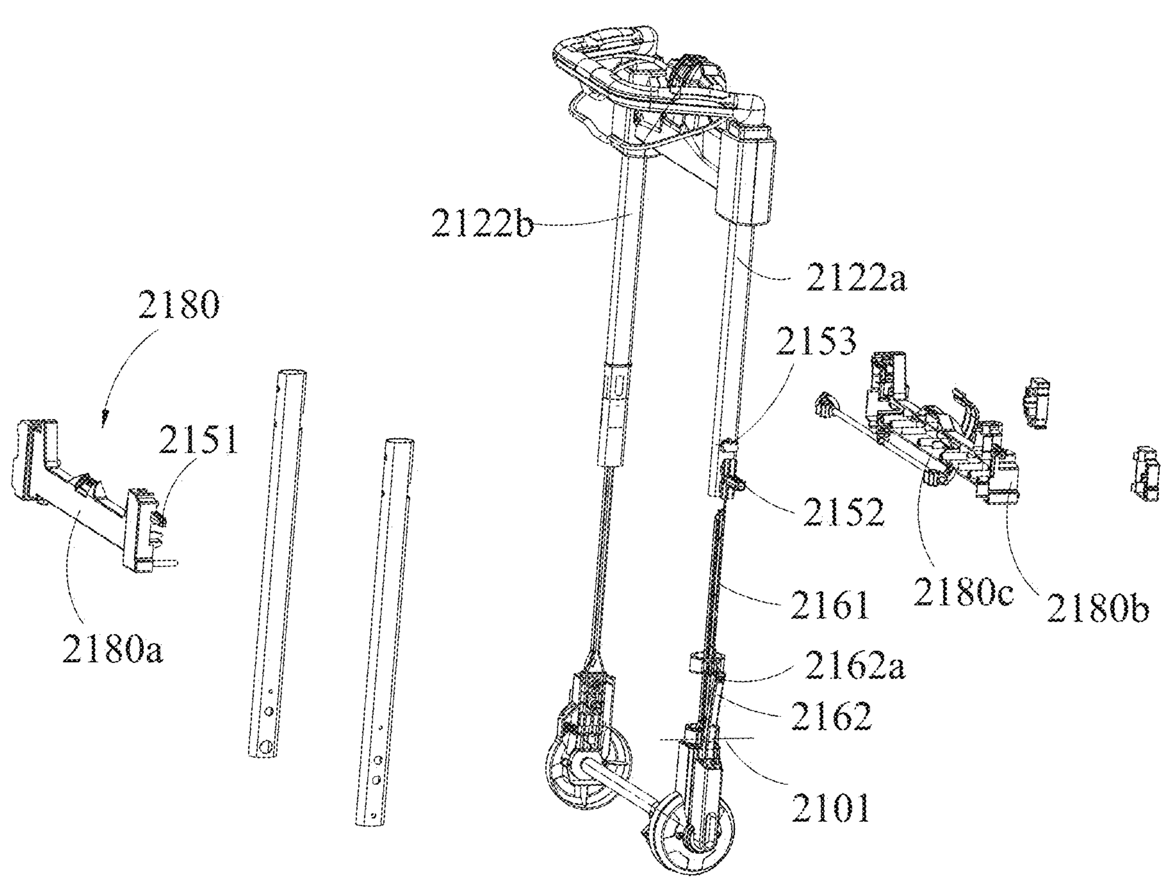
FIG. 58 is an exploded view of the walk-behind power tool of FIG. 55 from an angle.
Figure 59:
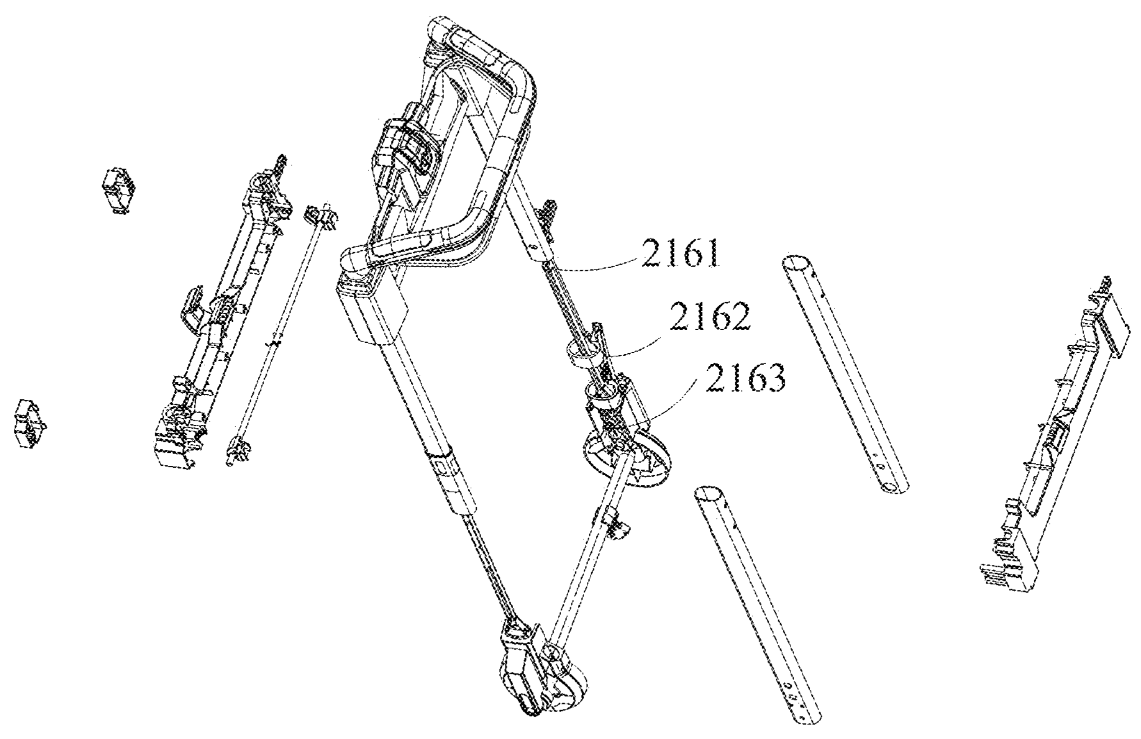
FIG. 59 is an exploded view of the walk-behind power tool of FIG. 55 from another angle.
Figure 60:
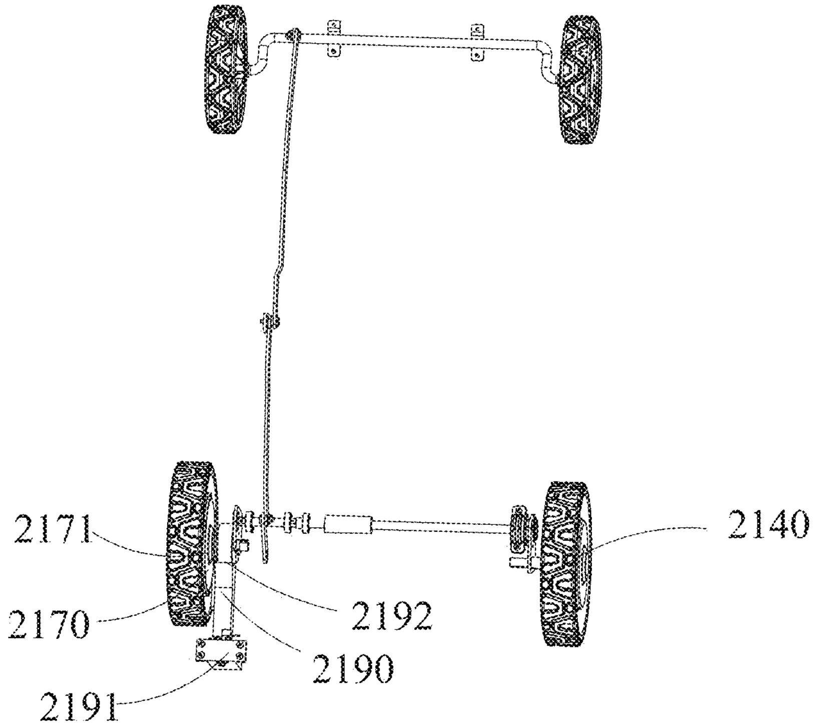
FIG. 60 is a perspective view of a walking assembly and a wheel lock in the walk-behind power tool of FIG. 55.

As shown in FIGS. 58 to 60, the locking assembly 2160 includes a lifting member 2161, a pivot member 2162 and a pin 2163. The pivot member 2162 includes a hole 2162*a*. The operating device 2150 includes a first operating member 2151 and a second operating member 2152. An end of the lifting member 2161 is connected to the second operating member 2152 and the other end of the lifting member 2161 is connected to the pivot member 2162 through the hole 162*a*. An end of the pin 2163 is disposed on the pivot member 2162 and the other end of the pin 2163 is engaged with the body 2110 so that the positions of the handle device 2120 and the body 2110 are locked. The pivot member 2162 is configured to rotate around a first axis 2101. The hole 162*a* and the pin 2163 are disposed on two sides of the first axis 2101 separately. When the user operates the operating device 2150, the second operating member 2152 drives the lifting member 2161 to move along an extension direction of the handle device 2120, and the lifting member 2161 drives the pivot member 2162 to rotate around the first axis 2101. The pivot member 2162 drives the pin 2163 to move, the pin 2163 is unlocked from the body 2110, the mower 2100 is out of the locked state, and the handle device 2120 may move relative to the body 2110.

In this example, the drive assembly 2170 includes a second motor 2171, where the second motor 2171 is an electric motor. The second motor 2171 also drives the walking assembly 2140 to automatically walk. The second motor 2171 is a hub motor disposed on the walking assembly 2140. In some examples, the second motor 2171 may be a separate motor that drives a change in the relative position between the body 2110 and the handle device 2120. The second motor 2171 may be an inrunner or an outrunner.

In this example, the position of the handle device 2120 remains unchanged, and the drive assembly 2170 drives the body 2110 to be lifted up or down relative to the handle device 2120. The operating device 2150 is disposed on the handle device 2120. The connecting rods 2122 include a first rod 2122_a_ and a second rod 2122_b_. The mower 2100 includes a connector 2180. The connector 2180 connects the first rod 2122_a_ to the second rod 2122_b_ and is sleeved on the first rod 2122_a_ and the second rod 2122_b_. The connector 2180 includes a first housing 2180_a_ and a second housing 2180_b_. An accommodation cavity 2180_c_ is formed between the first housing 2180_a_ and the second housing 2180_b_. The first operating member 2151 and the first housing 2180_a_ are integrally formed. The second operating member 2152 is disposed in the accommodation cavity 2180_c_. When the user operates the operating device 2150, the second operating member 2152 moves within the accommodation cavity 2180_c_ along the extension direction of the handle device 2120. The operating device 2150 further includes a first switch 2153. The second operating member 2152 is configured to trigger the first switch 2153. When the first switch 2153 is triggered, the second motor 2171 drives the body 2110 to rotate. When the body 2110 rotates along the first direction, the mower 2100 is unfolded. When the body 2110 rotates along the second direction, the mower 2100 is stored. When the body 2110 rotates to store the mower 2100, the mower 2100 can be placed vertically against the wall without the user bending down, which is convenient to use. In some examples, the operating device 2150 may be a key, knob, trigger or touch switch, which is not limited herein.

As shown in FIG. 60, the mower 2100 includes a wheel lock 2190. The wheel lock 2190 is disposed on the walking assembly 2140. The walking assembly 2140 includes the rear walking wheels 2141. The rear walking wheels 2141 are configured to rotate around an axle 2102. Before the user operates the operating device 2150, the rear walking wheels 2141 may be locked by the wheel lock 2190 to prevent the rear walking wheels 2141 from rotating. The wheel lock 2190 includes a treadle portion 2191 and a locking portion 2192. The treadle portion 2191 is configured for the user to step on so that the locking portion 2192 locks the walking assembly 2140. The locking portion 2192 is connected to the axle 2102 and configured to rotate around the axle 2102. When the user steps on the treadle portion 2191, the locking portion 2192 clamps the axle 2102 to prevent the rotation of the rear walking wheels 2141. In this manner, when the second motor 2171 drives the body 2110 to rotate, the rear walking wheels 2141 can stably park on the ground.

Figure 61:
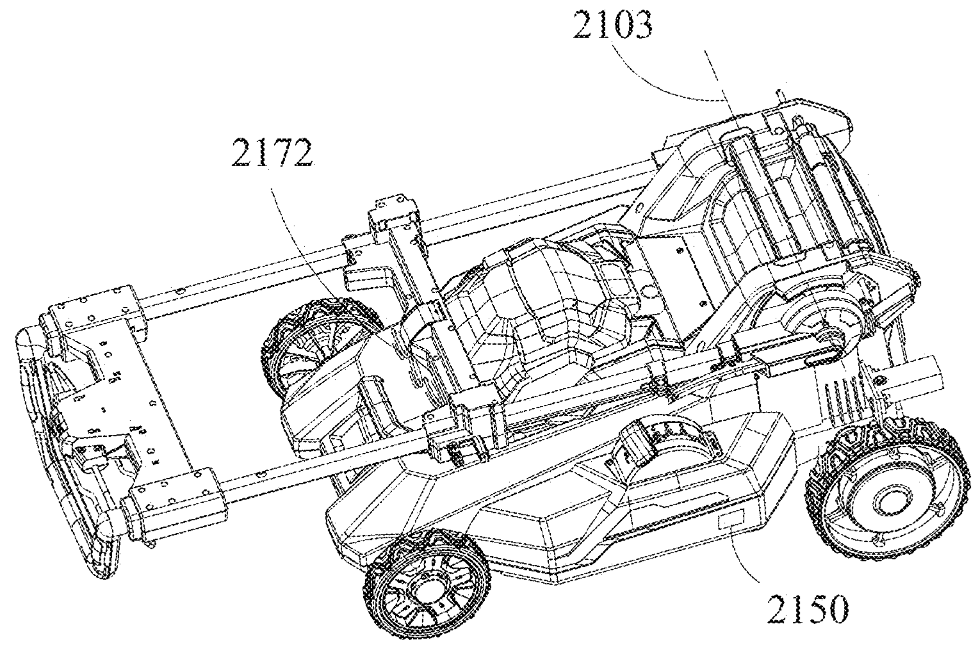
FIG. 61 is a perspective view of an example of the walk-behind power tool of FIG. 55.
Figure 62:
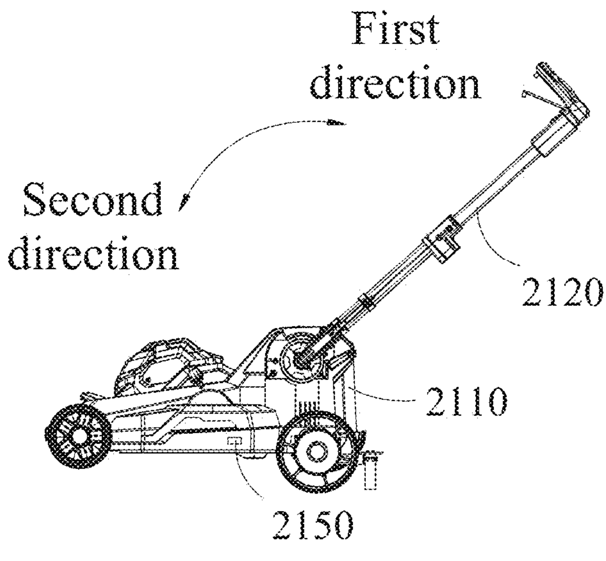
FIG. 62 is a side view of the walk-behind power tool of FIG. 61 at an unfolded position.
Figure 63:
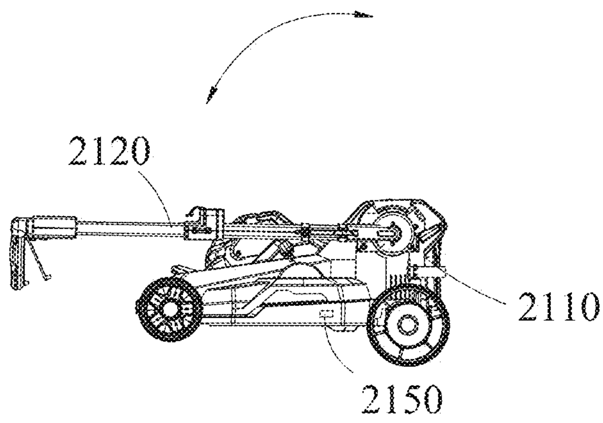
FIG. 63 is a side view of the walk-behind power tool of FIG. 61 at a folded position.

As shown in FIGS. 61 to 63, in some examples, the drive assembly 2170 drives a change in the relative position between the body 2110 and at least part of the handle device 2120 by not only electric power but also an elastic force. When folding or unfolding the mower 2100, the user desires that the position of the body 2110 be unchanged and the handle device 2120 be lifted up or down relative to the body 2110. The handle device 2120 rotates around a third axis 103 relative to the body 2110. The drive assembly 2170 includes an elastic member 2172. The elastic member 2172 is disposed on the body 2110 and configured to abut against the handle device 2120 when the mower 2100 is at a folded position. The operating device 2150 is disposed on the body 2110. The user may operate the operating device 2150 by foot without bending down so that the mower 2100 switches to the moving state. When the user desires to unfold the handle device 2120, the compressed elastic member 2172 converts the elastic force into power and drives the handle device 2120 to rotate along the first direction, and the relative position between the handle device 2120 and the body 2110 changes to the unfolded position. In some examples, the handle device 2120 is driven by the elastic force to move to a position for the user to reach without bending down, and then the user manually pulls the handle device 2120 to the unfolded position, which is safe and energy-saving. In some examples, the drive assembly 2170 further includes an electric motor. When the user desires to fold the handle device 2120, the electric motor drives the handle device 2120 to rotate along the second direction. In some examples, the user manually depresses the handle device 2120, the elastic member 2172 is compressed by the handle device, and the relative position between the handle device 2120 and the body 2110 changes to the folded position.

In some examples, the body 2110 and at least part of the handle device 2120 move relatively to an adjustable degree. When the drive assembly 2170 drives the body 2110 or the handle device 2120 to rotate, the body 2110 or the handle device 2120 may stop at a position adapting to the height of a different user, achieving convenience and safety of use.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A mower, comprising:

a cutting assembly comprising a first motor for driving a cutter to rotate;

a chassis supporting the cutting assembly;

a walking assembly comprising walking wheels; and a second motor capable of driving at least the walking assembly to drive the mower to walk on the ground;

wherein the mower has a height adjustment mode, and when the mower is in the height adjustment mode, the second motor outputs power to adjust a height of the cutting assembly.

2. The mower according to claim 1, further comprising a support assembly supporting the chassis and an adjustment assembly configured to adjust a relative position between the support assembly and the walking assembly to adjust the height of the cutting assembly, wherein the adjustment assembly connects the support assembly to the walking assembly, and the second motor drives the adjustment assembly or the support assembly to adjust the height of the cutting assembly.

3. The mower according to claim 1, wherein the mower further has a self-propelled mode, and, when the mower is in the self-propelled mode, the second motor drives the walking assembly to drive the mower to walk on the ground.

4. The mower according to claim 1, further comprising an operating member configured to, when operated, control the second motor to start or change in speed so that the mower enters the height adjustment mode.

5. The mower according to claim 1, wherein, when the mower is in the height adjustment mode, a rotational speed of the second motor is less than or equal to 2000 rpm.

6. The mower according to claim 2, wherein, when the mower is in the height adjustment mode, the power of the second motor is transmitted to the adjustment assembly or the support assembly via the walking assembly to drive the adjustment assembly to move.

7. The mower according to claim 3, further comprising an operating member, wherein, when the mower is in the self-propelled mode, the operating member is triggered to drive the mower to enter the height adjustment mode.

8. The mower according to claim 7, further comprising a controller, wherein, when the mower enters the height adjustment mode from the self-propelled mode, the controller controls a rotational speed of the second motor to change.

9. The mower according to claim 2, further comprising a locking assembly configured to lock a position of the support assembly relative to the walking assembly when the mower is out of the height adjustment mode.

10. The mower according to claim 1, further comprising a detection assembly configured to detect a height of the cutter directly or indirectly.

11. The mower according to claim 1, comprising a main machine, wherein the main machine comprises the cutting assembly and further comprises a main housing, an adjustment assembly configured to adjust a height of the main housing relative to the ground and a detection assembly configured to detect a parameter capable of reflecting a change in the height of the main housing relative to the ground.

12. The mower according to claim 11, further comprising a display assembly configured to display a current height or height gear of the main housing.

13. The mower according to claim 12, further comprising a processing module connected to the display assembly and configured to convert the parameter detected by the detection assembly into the height gear.

14. The mower according to claim 12, further comprising a handle device, wherein the display assembly is disposed on the handle device.

15. The mower according to claim 11, wherein the main machine further comprises a drive assembly and the walking assembly for supporting the main machine, the drive assembly comprises the second motor configured to drive the adjustment assembly to adjust the height of the main housing relative to the ground, and the second motor is further configured to drive the walking assembly to rotate to drive the mower to walk on the ground.

16. A mower, comprising:

a cutting assembly comprising a first motor for driving a cutter to rotate;

a chassis supporting the cutting assembly;

a walking assembly comprising walking wheels; and a second motor capable of driving at least the walking assembly to drive the mower to walk on the ground;

wherein the mower has a height adjustment mode, and, when the mower is in the height adjustment mode, the second motor outputs power to adjust a height of the cutter.

17. A mower, comprising:

a cutting assembly comprising a first motor for driving a cutter to rotate;

a chassis supporting the cutting assembly;

a walking assembly comprising walking wheels; and a second motor capable of driving at least the walking wheels to rotate;

wherein, when the second motor starts and an external motion of the mower is prevented, the second motor drives a change in a relative position between a support assembly and the walking assembly, and the mower is in a height adjustment mode.

18. The mower according to claim 17, further comprising the support assembly supporting the chassis and an adjustment assembly configured to adjust the relative position between the support assembly and the walking assembly to adjust a height of the cutting assembly, wherein the adjustment assembly connects the support assembly to the walking assembly, and the mower is in the height adjustment mode when the adjustment assembly adjusts the relative position between the support assembly and the walking assembly.

19. The mower according to claim 17, wherein the mower further has a self-propelled mode, and, when the mower is in the self-propelled mode, the second motor drives the walking assembly to drive the mower to walk on the ground.

20. The mower according to claim 17, further comprising an operating member configured to, when operated, control the second motor to start so that the mower enters the height adjustment mode.

* * * * *